US012423667B2

(12) United States Patent
Jakobsson et al.

(10) Patent No.: US 12,423,667 B2
(45) Date of Patent: Sep. 23, 2025

(54) SYSTEMS AND METHODS FOR THE FACILITATION OF BLOCKCHAINS

(71) Applicant: Artema Labs, Inc, Los Angeles, CA (US)

(72) Inventors: Bjorn Markus Jakobsson, New York, CA (US); Keir Finlow-Bates, Eura (FI); Stephen C. Gerber, Austin, TX (US); Guy Stewart, Olympia, WA (US); Kenneth Rosen, Portola Valley, CA (US)

(73) Assignee: Artema Labs, Inc, Los Angeles, CA (US)

( * ) Notice: Subject to any disclaimer, the term of this patent is extended or adjusted under 35 U.S.C. 154(b) by 103 days.

(21) Appl. No.: 18/179,884

(22) Filed: Mar. 7, 2023

(65) Prior Publication Data

US 2023/0281583 A1    Sep. 7, 2023

Related U.S. Application Data

(60) Provisional application No. 63/477,684, filed on Dec. 29, 2022, provisional application No. 63/385,921, (Continued)

(51) Int. Cl.
*G06Q 20/12*     (2012.01)
*G06Q 20/36*     (2012.01)
(Continued)

(52) U.S. Cl.
CPC .......... *G06Q 20/123* (2013.01); *G06Q 20/36* (2013.01); *H04L 67/1097* (2013.01); *H04L 67/306* (2013.01); *G06Q 2220/00* (2013.01)

(58) Field of Classification Search
CPC .. G06Q 20/123; G06Q 20/36; G06Q 2220/00; G06Q 30/0201; G06Q 30/0269;
(Continued)

(56) References Cited

U.S. PATENT DOCUMENTS

2006/0262910 A1* 11/2006 Molnar ................. G06V 10/95
                                                        379/88.17
2013/0293352 A1* 11/2013 Vargas ............... G06K 19/0723
                                                          340/10.1

(Continued)

*Primary Examiner* — Patrick McAtee
*Assistant Examiner* — Vincent I Idiake
(74) *Attorney, Agent, or Firm* — KPPB LLP

(57) ABSTRACT

Systems and techniques for enabling the automation of blockchain processes within an NFT platform, through structures and techniques for generating and maintaining descriptors of content and users, are illustrated. One embodiment includes a method for selecting personalized token-directed actions. The method determines a tag including metadata associated with a token. The method determines a profile associated with a user, wherein the user is at least one of an owner of the token and a content creator associated with the token. The method performs a clustering based at least one of the tag and the profile, wherein the clustering includes a collection of tokens sorted according to at least one of shared categories of tokens and shared categories of token users. The method identifies an action corresponding to the token, based on the clustering, wherein the action governs future token access by the user. The method initiates the action.

20 Claims, 48 Drawing Sheets

Related U.S. Application Data filed on Dec. 2, 2022, provisional application No. 63/380,739, filed on Oct. 24, 2022, provisional application No. 63/365,267, filed on May 24, 2022, provisional application No. 63/317,348, filed on Mar. 7, 2022.

(51) Int. Cl.
*H04L 67/1097* (2022.01)
*H04L 67/306* (2022.01)

(58) Field of Classification Search
CPC ............ G06Q 30/0631; H04L 67/1097; H04L 67/306
See application file for complete search history.

(56) References Cited

U.S. PATENT DOCUMENTS

| | | | |
|---|---|---|---|
| 2019/0236594 A1* | 8/2019 | Ehrlich-Quinn | G06Q 20/401 |
| 2020/0356739 A1* | 11/2020 | Jiang | G07G 1/0045 |
| 2022/0374888 A1* | 11/2022 | Lackey | G06Q 10/02 |
| 2023/0123993 A1* | 4/2023 | Meyers | H04L 9/3213 |
| | | | 705/69 |
| 2023/0206337 A1* | 6/2023 | Krishnamurthy | G06Q 20/389 |
| | | | 705/64 |
| 2023/0274245 A1* | 8/2023 | Quigley | G06Q 20/02 |
| | | | 705/65 |
| 2024/0281901 A1* | 8/2024 | Kamino | H04L 9/3239 |

\* cited by examiner

| Participant KYC Status | Required Stake |
|---|---|
| Anonymous | 32 tokens |
| Basic KYC | 16 tokens |
| Full KYC | 8 tokens |
| Escrow KYC | 12 tokens |

FIG. 32

| Participant KYC Status | Required Stake | Block Reward |
|---|---|---|
| Anonymous | 32 tokens | 1 tokens |
| Basic KYC | 32 tokens | 2 tokens |
| Full KYC | 32 tokens | 4 tokens |
| Escrow KYC | 32 tokens | 3 tokens |

FIG. 33

| KYC Indicator | Points | Participant score |
|---|---|---|
| Name | 5 | 5 |
| Location and jurisdiction | 8 | 8 |
| Photograph | 5 | 0 |
| Bank account details | 12 | 12 |
| Passport details | 8 | 0 |
| Signed list of public addresses | 2 | 2 |
| Second verified party attestation | 10 | 0 |
| Total: | 50 | 27 |

FIG. 35

SYSTEMS AND METHODS FOR THE FACILITATION OF BLOCKCHAINS

CROSS-REFERENCE TO RELATED APPLICATIONS

The current application claims the benefit of and priority under 35 U.S.C. § 119(e) to U.S. Provisional Patent Application No. 63/317,348, titled "Optimized Proof of Stake Technique," filed Mar. 7, 2022, U.S. Provisional Patent Application No. 63/365,267, titled "System and Method for Token-Based Tradable Proof of Work," filed May 24, 2022, U.S. Provisional Patent Application No. 63/380,739, titled "Consensus System for a Blockchain Based on 'Know Your Customer' Functionality," filed Oct. 24, 2022, U.S. Provisional Patent Application No. 63/385,921, titled "Replication-Based Blockchain Security," filed Dec. 2, 2022, and U.S. Provisional Patent Application No. 63/477,684, titled "Blockchain Based on Content Tagging," filed Dec. 29, 2022, the disclosures of which are hereby incorporated by reference in their entireties for all purposes.

FIELD OF THE INVENTION

The present invention generally relates to systems and techniques for enabling the automation of blockchain processes, through structures and techniques targeted to generating and maintaining descriptors of content and users.

BACKGROUND

Immutable ledgers and blockchains are frequently based on a variety of cryptographic methods. Transactions surrounding tokens (e.g., non-fungible tokens) are codified on blockchains. In some implementations of immutable ledgers and blockchains, mining is used to securely add information to blockchains and ledgers. Mining can include computer systems generating proofs based on computational challenges. Consensus systems for blockchains provide means for miners to submit updates and changes to the blockchain data structure through solving challenges through proofs. Generally, a proof can be an output of a function that conforms to one or more requirements defined by a challenge. Mining can also include the use of computer systems known as "verifiers" that perform processes to check and validate the generated proofs. In many instances, a proof can be easily verified based on providing successful inputs to a verifier.

Using consensus systems, verifiers may decide whether changes (e.g., proposed blocks) are to be accepted or rejected. Known consensus systems include variants of proof-of-work, proof-of-stake, proof-of-authority, proof-of-elapsed-time, etc. Consensus systems typically include incentivization systems, that provide rewards for submitting correct blocks of information to the blockchain and/or punishment components, where malicious participants lose assets for incorrect blocks of information.

SUMMARY OF THE INVENTION

Systems and techniques for enabling the automation of blockchain processes within an NFT platform, through structures and techniques for generating and maintaining descriptors of content and users, are illustrated. One embodiment includes a method for selecting personalized token-directed actions. The method determines a tag including metadata associated with a token. The method determines a profile associated with a user, wherein the user is at least one of an owner of the token and a content creator associated with the token. The method performs a clustering based at least one of the tag and the profile, wherein the clustering includes a collection of tokens sorted according to at least one of shared categories of tokens and shared categories of token users. The method identifies an action corresponding to the token, based on the clustering, wherein the action governs future token access by the user. The method initiates the action.

In a further embodiment, the metadata includes at the least one of a smart contract associated with the token; a consumer-based quality score associated with the token; and one or more user preferences associated with the token.

In another embodiment, the action concerns access to content selected from the group consisting of a content recommendation, an advertisement recommendation, and a product placement recommendation.

In still another embodiment, the tag is generated, at least in part, by a party corresponding to an entity selected from the group consisting of the content creator, a party mining the token, the owner, and a third-party appointed by the user.

In a further embodiment, the tag is associated with a weight indicative of a trust level of the party, wherein the trust level corresponds to a reputation, of the party, for generating accurate tags.

In another embodiment, the profile includes data describing at least one of a need of the user, an ability of the user, a reputation of the user, and a usage statistic associated with the user.

In still yet another embodiment, the profile is generated, at least in part: by an entity selected from the group including a wallet associated with the user; an aggregating entity associated with the user; and an automated component. The profile is generated based on input from at least one of the owner, the content creator, and an administrator.

In yet another embodiment, the profile is stored in at least one of a wallet associated with the owner, a public database, an enterprise gateway server, and an encrypted database.

In still another embodiment, the clustering is performed using an algorithm selected from the group consisting of a machine learning algorithm, an artificial intelligence algorithm, and a maximum likelihood assessment.

In yet another embodiment, the action governs the token from a first blockchain to a second blockchain, wherein the second blockchain is a level-two (L2) blockchain, and wherein the second blockchain is selected based on at least on of an optimization and a cost estimate.

One embodiment includes a non-transitory computer-readable medium storing instructions that, when executed by a processor, are configured to cause the processor to perform operations for selecting personalized token-directed actions. The processor determines a tag including metadata associated with a token. The processor determines a profile associated with a user, wherein the user is at least one of an owner of the token and a content creator associated with the token. The processor performs a clustering based at least one of the tag and the profile, wherein the clustering includes a collection of tokens sorted according to at least one of shared categories of tokens and shared categories of token users. The processor identifies an action corresponding to the token, based on the clustering, wherein the action governs future token access by the user. The processor initiates the action.

In a further embodiment, the metadata includes at the least one of a smart contract associated with the token; a consumer-based quality score associated with the token; and one or more user preferences associated with the token.

In another embodiment, the action concerns access to content selected from the group consisting of a content recommendation, an advertisement recommendation, and a product placement recommendation.

In still another embodiment, the tag is generated, at least in part, by a party corresponding to an entity selected from the group consisting of the content creator, a party mining the token, the owner, and a third-party appointed by the user.

In a further embodiment, the tag is associated with a weight indicative of a trust level of the party, wherein the trust level corresponds to a reputation, of the party, for generating accurate tags.

In another embodiment, the profile includes data describing at least one of a need of the user, an ability of the user, a reputation of the user, and a usage statistic associated with the user.

In still yet another embodiment, the profile is generated, at least in part: by an entity selected from the group including a wallet associated with the user; an aggregating entity associated with the user; and an automated component. The profile is generated based on input from at least one of the owner, the content creator, and an administrator.

In yet another embodiment, the profile is stored in at least one of a wallet associated with the owner, a public database, an enterprise gateway server, and an encrypted database.

In still another embodiment, the clustering is performed using an algorithm selected from the group consisting of a machine learning algorithm, an artificial intelligence algorithm, and a maximum likelihood assessment.

In yet another embodiment, the action governs the token from a first blockchain to a second blockchain, wherein the second blockchain is a level-two (L2) blockchain, and wherein the second blockchain is selected based on at least on of an optimization and a cost estimate.

BRIEF DESCRIPTION OF THE DRAWINGS

The description and claims will be more fully understood with reference to the following figures and data graphs, which are presented as exemplary embodiments of the invention and should not be construed as a complete recitation of the scope of the invention.

FIG. 32 illustrates a system of categorization of participants used by blockchain consensus mechanism configured in accordance with many embodiments of the invention.

FIG. 33 illustrates a system of reward allocation used by blockchain consensus mechanisms configured in accordance with certain embodiments of the invention.

FIG. 35 illustrates a system for scoring used by blockchain consensus mechanisms configured in accordance with a number of embodiments of the invention.

DETAILED DESCRIPTION

Figure 1:
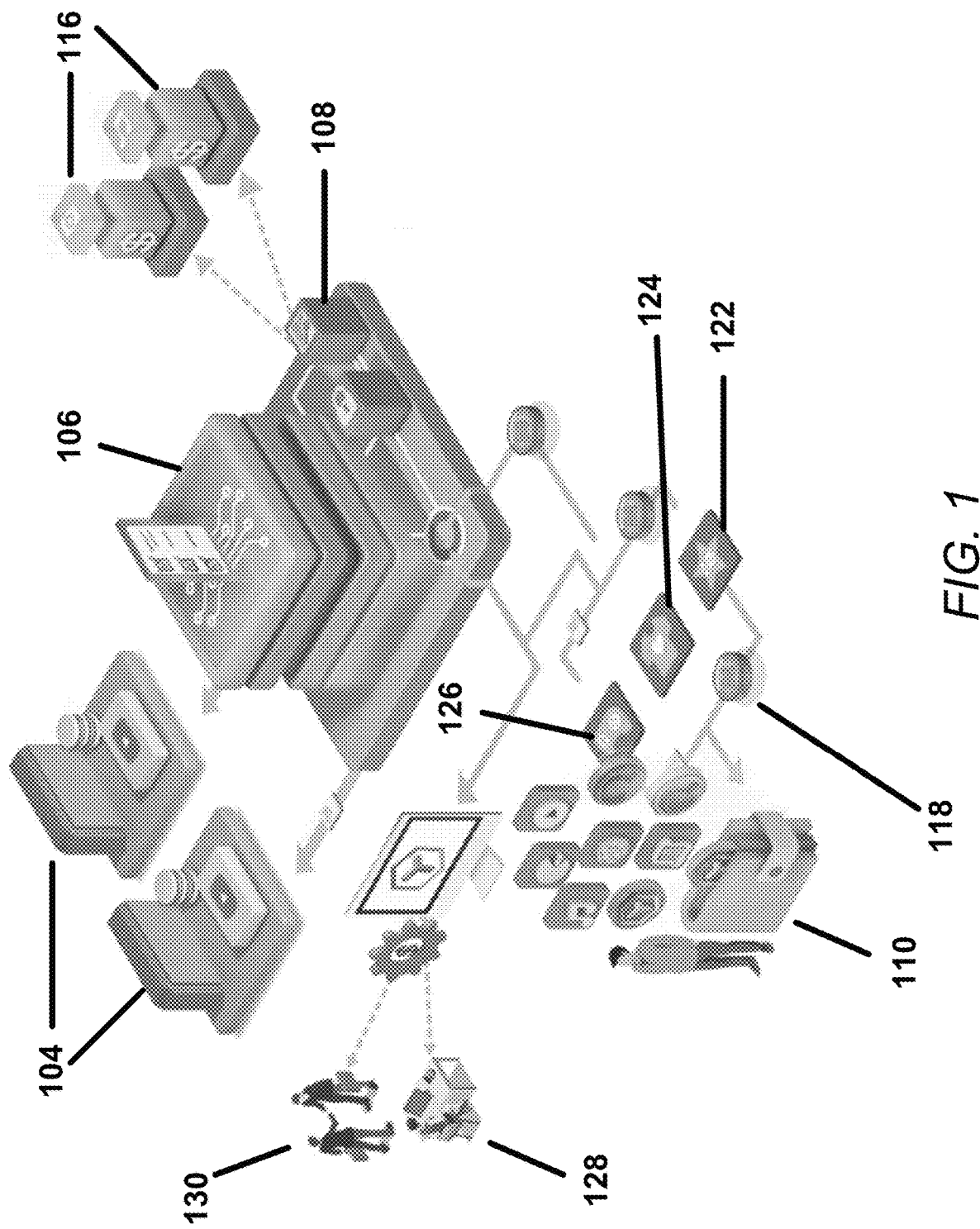
FIG. 1 is a conceptual diagram of an NFT platform in accordance with an embodiment of the invention.

Systems and methods for incorporating blockchain-directed functionalities into non-fungible token (NFT) platforms, in accordance with several embodiments of the invention, are described herein. Blockchain-directed functionality may include but is not limited to configurations enabling the capacity to tag specific tokens with various attributes, the implementation of consensus mechanism applications, and replicating token representations across blockchains.

NFT platforms in accordance with a number of embodiments of the invention may implement various identifying features for users and/or tokens. Tag mechanisms may enable systems and/or users to identify token characteristics including but not limited to expiration information, content type, and commercial applications. In accordance with numerous embodiments of the invention, tags and profiles may be used to access, through blockchains, metadata information about various tokens, transactions, and/or users. Profile mechanisms may identify various token-related entities while also providing means to keep track of information including but not limited to the needs, capabilities, reputation, and/or usage statistics of the entity. Systems and methods in accordance with some embodiments may utilize various representations of tokens (tokenettes) to establish ancillary records of ownership between multiple blockchains.

Systems in accordance with various embodiments of the invention may modify the operation of consensus mechanisms including but not limited to proof of stake, proof of work, and hybrid consensus mechanisms. In accordance with some embodiments, hybrid consensus mechanisms may offer various modified incentives for users including but not limited to the stake offered in proof of stake mechanisms. Systems in accordance with numerous embodiments may generate hash chains useful for determining relative orders of transactions through a number of consensus mechanisms. Such systems may, additionally or alternatively, incorporate the parallel generation and/or combination of multiple different blockchains. In accordance with several embodiments, tokens may be incorporated in order to form records generated and updated through consensus mechanisms including but not limited to proof of work protocols.

While various blockchain and token arrangement configurations are discussed above, recording functionalities that can be utilized within NFT platforms in accordance with various embodiments of the invention are discussed further below.

Non-Fungible Token (NFT) Platforms

Turning now to the drawings, systems and methods for implementing blockchain-based Non-Fungible Token (NFT) platforms in accordance with various embodiments of the invention are illustrated. In several embodiments, blockchain-based NFT platforms are platforms which enable content creators to issue, mint, and transfer Non-Fungible Tokens (NFTs) directed to content including, but not limited to, rich media content.

In a number of embodiments, content creators can issue NFTs to users within the NFT platform. NFTs can be created around a large range of real-world media content and intellectual property. Movie studios can mint digital collectibles for their movies, characters, notable scenes and/or notable objects. Record labels can mint digital collectibles for artists, bands, albums and/or songs. Similarly, official digital trading cards can be made from likeness of celebrities, cartoon characters and/or gaming avatars.

NFTs minted using NFT platforms in accordance with various embodiments of the invention can have multifunctional programmable use cases including rewards, private access to premium content and experiences, as discounts toward the purchase of goods, among many other value-added use cases.

In many embodiments, each NFT can have a set of attributes that define its unique properties. NFTs may therefore be classified based on which attributes are emphasized. Possible classifications may address, but are not limited to: NFTs as identifying entities, NFTs output by other NFTs, NFTs as content creation assets, and NFTs as evaluating entities. NFTs can be interpreted differently by various platforms in order to create platform-specific user experiences. The metadata associated with an NFT may also include digital media assets such as (but not limited to) images, videos about the specific NFT, and the context in which it was created (studio, film, band, company song etc.).

In many embodiments, NFT storage may be facilitated through mechanisms for the transfer of payment from users to one or more service providers. Through these mechanisms, a payment system for NFT maintenance can allow for incremental payment and ongoing asset protection. NFT storage may be additionally self-regulated through willing participants disclosing unsatisfactory NFT management in exchange for rewards.

In many embodiments, the NFT platform can include media wallet applications that enable users to securely store NFTs and/or other tokens on their devices. Furthermore, media wallets (also referred to as "digital wallets") can enable users to obtain NFTs that prove purchase of rights to access a particular piece of media content on one platform and use the NFT to gain access to the purchased content on another platform. The consumption of such content may be governed by content classification directed to visual user interface systems.

In several embodiments, users can download and install media wallet applications to store NFTs on the same computing devices used to consume streamed and/or downloaded content. Media wallet applications and NFTs can disseminate data concerning media consumption on the computing devices on which the media wallet applications are installed and/or based upon observations indicative of media consumption independently of the device. Media consumption data may include, but is not limited to, data reporting the occurrence of NFT transactions, data reporting the occurrence of NFT event interactions data reporting the content of NFT transactions, data reporting the content of media wallet interactions, and/or data reporting the occurrence of media wallet interactions.

While various aspects of NFT platforms, NFTs, media wallets, blockchain configurations, reporting structures, and maintenance systems are discussed above, NFT platforms and different components that can be utilized within NFT platforms in accordance with various embodiments of the invention are discussed further below.

NFT Platforms

An NFT platform in accordance with an embodiment of the invention is illustrated in FIG. 1. The NFT platform 100 utilizes one or more immutable ledgers (e.g. one or more blockchains) to enable a number of verified content creators 104 to access an NFT registry service to mint NFTs 106 in a variety of forms including (but not limited to) celebrity NFTs 122, character NFTs from games 126, NFTs that are redeemable within games 126, NFTs that contain and/or enable access to collectibles 124, and NFTs that have evolutionary capabilities representative of the change from one NFT state to another NFT state.

Issuance of NFTs 106 via the NFT platform 100 enables verification of the authenticity of NFTs independently of the content creator 104 by confirming that transactions written to one or more of the immutable ledgers are consistent with the smart contracts 108 underlying the NFTs.

As is discussed further below, content creators 104 can provide the NFTs 106 to users to reward and/or incentivize engagement with particular pieces of content and/or other user behavior including (but not limited to) the sharing of user personal information (e.g. contact information or user ID information on particular services), demographic information, and/or media consumption data with the content creator and/or other entities. In addition, the smart contracts 108 underlying the NFTs can cause payments of residual royalties 116 when users engage in specific transactions involving NFTs (e.g. transfer of ownership of the NFT).

In a number of embodiments, users utilize media wallet applications 110 on their devices to store NFTs 106 distributed using the NFT platform 100. Users can use media wallet applications 110 to obtain and/or transfer NFTs 106. In facilitating the retention or transfer of NFTs 106, media wallet applications may utilize wallet user interfaces that engage in transactional restrictions through either uniform or personalized settings. Media wallet applications 110 in accordance with some embodiments may incorporate NFT filtering systems to avoid unrequested NFT assignment. Methods for increased wallet privacy may also operate through multiple associated wallets with varying capabilities. As can readily be appreciated, NFTs 106 that are implemented using smart contracts 108 having interfaces that comply with open standards are not limited to being stored within media wallets and can be stored in any of a variety of wallet applications as appropriate to the requirements of a given application. Furthermore, a number of embodiments of the invention support movement of NFTs 106 between different immutable ledgers. Processes for moving NFTs between multiple immutable ledgers in accordance with various embodiments of the invention are discussed further below.

In several embodiments, content creators 104 can incentivize users to grant access to media consumption data using offers including (but not limited to) offers of fungible tokens 118 and/or NFTs 106. In this way, the ability of the content creators to mint NFTs enables consumers to engage directly with the content creators and can be utilized to incentivize users to share with content creators' data concerning user interactions with additional content. The permissions granted by individual users may enable the content creators 104 to directly access data written to an immutable ledger. In many embodiments, the permissions granted by individual users enable authorized computing systems to access data within an immutable ledger and content creators 104 can query the authorized computing systems to obtain aggregated information. Numerous other example functions for content creators 104 are possible, some of which are discussed below.

NFT blockchains in accordance with various embodiments of the invention enable issuance of NFTs by verified users. In many embodiments, the verified users can be content creators that are vetted by an administrator of networks that may be responsible for deploying and maintaining the NFT blockchain. Once the NFTs are minted, users can obtain and conduct transactions with the NFTs. In several embodiments, the NFTs may be redeemable for items or services in the real world such as (but not limited to) admission to movie screenings, concerts, and/or merchandise.

As illustrated in FIG. 1, users can install the media wallet application 110 onto their devices and use the media wallet application 110 to purchase fungible tokens. The media wallet application could also be provided by a browser, or by a dedicated hardware unit executing instructions provided by a wallet manufacturer. The different types of wallets may have slightly different security profiles and may offer different features, but would all be able to be used to initiate the change of ownership of tokens, such as NFTs. In many embodiments, the fungible tokens can be fully converted into fiat currency and/or other cryptocurrency. In several embodiments, the fungible tokens are implemented using split blockchain models in which the fungible tokens can be issued to multiple blockchains (e.g. Ethereum). As can readily be appreciated, the fungible tokens and/or NFTs utilized within an NFT platform in accordance with various embodiments of the invention are largely dependent upon the requirements of a given application.

In several embodiments, the media wallet application is capable of accessing multiple blockchains by deriving accounts from each of the various immutable ledgers used within an NFT platform. For each of these blockchains, the media wallet application can automatically provide simplified views whereby fungible tokens and NFTs across multiple accounts and/or multiple blockchains can be rendered as single user profiles and/or wallets. In many embodiments, the single view can be achieved using deep-indexing of the relevant blockchains and API services that can rapidly provide information to media wallet applications in response to user interactions. In certain embodiments, the accounts across the multiple blockchains can be derived using BIP32 deterministic wallet key. In other embodiments, any of a variety of techniques can be utilized by the media wallet application to access one or more immutable ledgers as appropriate to the requirements of a given application.

NFTs can be purchased by way of exchanges 130 and/or from other users 128. In addition, content creators can directly issue NFTs to the media wallets of specific users (e.g. by way of push download or AirDrop). In many embodiments, the NFTs are digital collectibles such as celebrity NFTs 122, character NFTs from games 126, NFTs that are redeemable within games 126, and/or NFTs that contain and/or enable access to collectibles 124. It should be appreciated that a variety of NFTs are described throughout the discussion of the various embodiments described herein and can be utilized in any NFT platform and/or with any media wallet application.

While the NFTs are shown as static in the illustrated embodiment, content creators can utilize users' ownership of NFTs to engage in additional interactions with the user. In this way, the relationship between users and particular pieces of content and/or particular content creators can evolve over time around interactions driven by NFTs. In a number of embodiments, collection of NFTs can be gamified to enable unlocking of additional NFTs. In addition, leaderboards can be established with respect to particular content and/or franchises based upon users' aggregation of NFTs. As is discussed further below, NFTs and/or fungible tokens can also be utilized by content creators to incentivize users to share data.

NFTs minted in accordance with several embodiments of the invention may incorporate a series of instances of digital content elements in order to represent the evolution of the digital content over time. Each one of these digital elements can have multiple numbered copies, just like a lithograph, and each such version can have a serial number associated with it, and/or digital signatures authenticating its validity. The digital signature can associate the corresponding image to an identity, such as the identity of the artist. The evolution of digital content may correspond to the transition from one representation to another representation. This evolution may be triggered by the artist, by an event associated with the owner of the artwork, by an external event measured by platforms associated with the content, and/or by specific combinations or sequences of event triggers. Some such NFTs may also have corresponding series of physical embodiments. These may be physical and numbered images that are identical to the digital instances described above. They may also be physical representations of another type, e.g., clay figures or statues, whereas the digital representations may be drawings. The physical embodiments may further be of different aspects that relate to the digital series. Evolution in compliance with some embodiments may also be used to spawn additional content, for example, one NFT directly creating one or more secondary NFTs.

When the user wishes to purchase an NFT using fungible tokens, media wallet applications can request authentication of the NFT directly based upon the public key of the content creator and/or indirectly based upon transaction records within the NFT blockchain. As discussed above, minted NFTs can be signed by content creators and administrators of the NFT blockchain. In addition, users can verify the authenticity of particular NFTs without the assistance of entities that minted the NFT by verifying that the transaction records involving the NFT within the NFT blockchain are consistent with the various royalty payment transactions required to occur in conjunction with transfer of ownership of the NFT by the smart contract underlying the NFT.

Applications and methods in accordance with various embodiments of the invention are not limited to media wallet applications or use within NFT platforms. Accordingly, it should be appreciated that the data collection capabilities of any media wallet application described herein can also be implemented outside the context of an NFT platform and/or in a dedicated application and/or in an application unrelated to the storage of fungible tokens and/or NFTs. Various systems and methods for implementing NFT platforms and media wallet applications in accordance with various embodiments of the invention are discussed further below.

NFT Platform Network Architectures

NFT platforms in accordance with many embodiments of the invention utilize public blockchains and permissioned blockchains. In several embodiments, the public blockchain is decentralized and universally accessible. Additionally, in a number of embodiments, private/permissioned blockchains are closed systems that are limited to publicly inaccessible transactions. In many embodiments, the permissioned blockchain can be in the form of distributed ledgers, while the blockchain may alternatively be centralized in a single entity.

Figure 2:
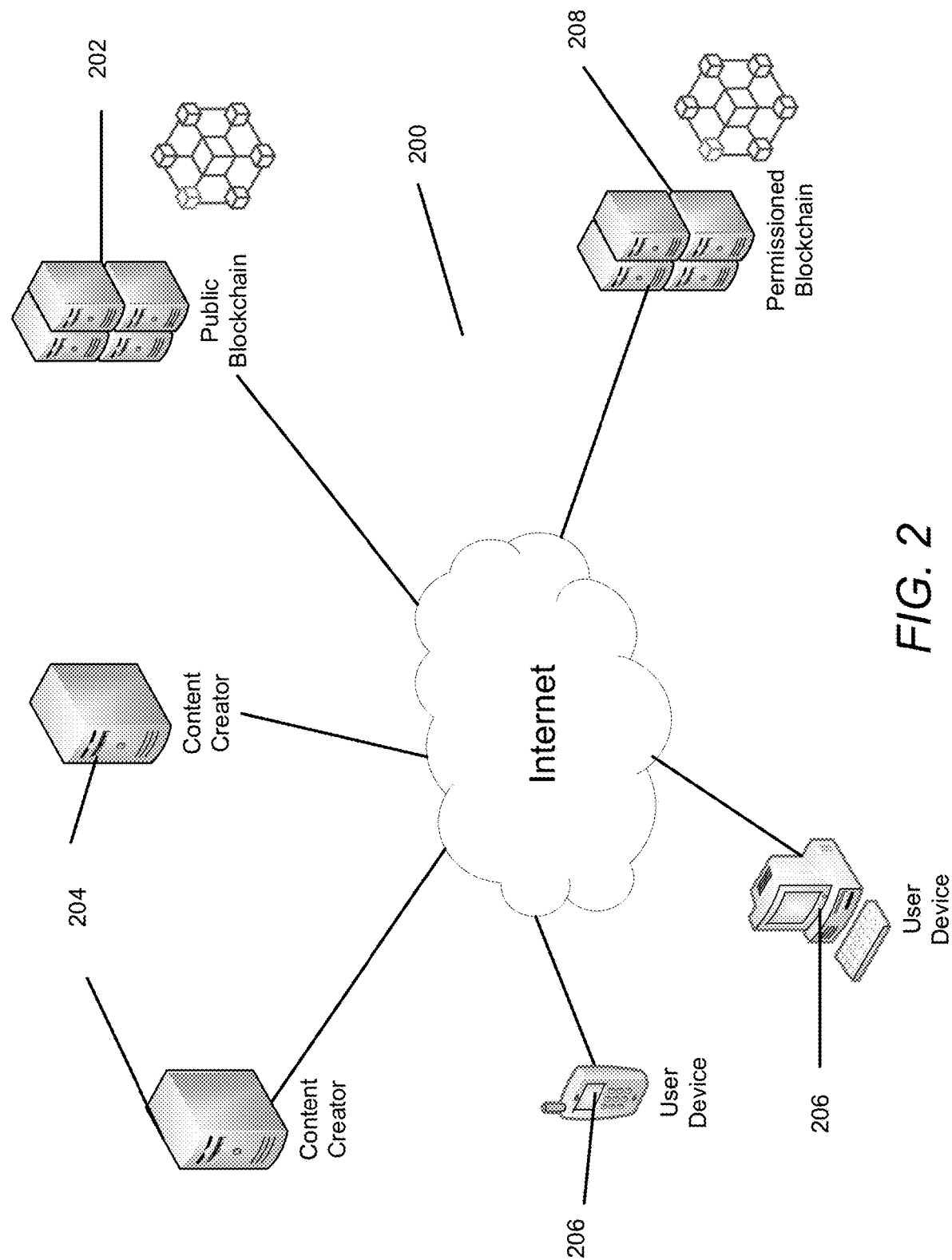
FIG. 2 is a network architecture diagram of an NFT platform in accordance with an embodiment of the invention.

An example of network architecture that can be utilized to implement an NFT platform including a public blockchain and a permissioned blockchain in accordance with several embodiments of the invention is illustrated in FIG. 2. The NFT platform 200 utilizes computer systems implementing a public blockchain 202 such as (but not limited to) Ethereum and Solana. A benefit of supporting interactions with public blockchains 202 is that the NFT platform 200 can support minting of standards based NFTs that can be utilized in an interchangeable manner with NFTs minted by sources outside of the NFT platform on the public blockchain. In this way, the NFT platform 200 and the NFTs minted within the NFT platform are not part of a walled garden, but are instead part of a broader blockchain-based ecosystem. The ability of holders of NFTs minted within the NFT platform 200 to transact via the public blockchain 202 increases the likelihood that individuals acquiring NFTs will become users of the NFT platform. Initial NFTs minted outside the NFT platform can also be developed through later minted NFTs, with the initial NFTs being used to further identify and interact with the user based upon their ownership of both NFTs. Various systems and methods for facilitating the relationships between NFTs, both outside and within the NFT platform are discussed further below.

Users can utilize user devices configured with appropriate applications including (but not limited to) media wallet applications to obtain NFTs. In many embodiments, media wallets are smart device enabled, front-end applications for fans and/or consumers, central to all user activity on an NFT platform. As is discussed in detail below, different embodiments of media wallet applications can provide any of a variety of functionality that can be determined as appropriate to the requirements of a given application. In the illustrated embodiment, the user devices 206 are shown as mobile phones and personal computers. As can readily be appreciated user devices can be implemented using any class of consumer electronics device including (but not limited to) tablet computers, laptop computers, televisions, game consoles, virtual reality headsets, mixed reality headsets, augmented reality headsets, media extenders, and/or set top boxes as appropriate to the requirements of a given application.

In many embodiments, NFT transaction data entries in the permissioned blockchain 208 are encrypted using users' public keys so that the NFT transaction data can be accessed by the media wallet application. In this way, users control access to entries in the permissioned blockchain 208 describing the user's NFT transaction. In several embodiments, users can authorize content creators 204 to access NFT transaction data recorded within the permissioned blockchain 208 using one of a number of appropriate mechanisms including (but not limited to) compound identities where the user is the owner of the data and the user can authorize other entities as guests that can also access the data. As can readily be appreciated, particular content creators' access to the data can be revoked by revoking their status as guests within the compound entity authorized to access the NFT transaction data within the permissioned blockchain 208. In certain embodiments, compound identities are implemented by writing authorized access records to the permissioned blockchain using the user's public key and the public keys of the other members of the compound entity.

When content creators wish to access particular pieces of data stored within the permissioned blockchain 208, they can make a request to a data access service. The data access service may grant access to data stored using the permissioned blockchain 208 when the content creators' public keys correspond to public keys of guests. In a number of embodiments, guests may be defined within a compound identity. The access record for the compound entity may also authorize the compound entity to access the particular piece of data. In this way, the user has complete control over access to their data at any time by admitting or revoking content creators to a compound entity, and/or modifying the access policies defined within the permissioned blockchain 208 for the compound entity. In several embodiments, the permissioned blockchain 208 supports access control lists and users can utilize a media wallet application to modify permissions granted by way of the access control list. In many embodiments, the manner in which access permissions are defined enables different restrictions to be placed on particular pieces of information within a particular NFT transaction data record within the permissioned blockchain 208. As can readily be appreciated, the manner in which NFT platforms and/or immutable ledgers provide fine-grained data access permissions largely depends upon the requirements of a given application.

In many embodiments, storage nodes within the permissioned blockchain 208 do not provide content creators with access to entire NFT transaction histories. Instead, the storage nodes simply provide access to encrypted records. In several embodiments, the hash of the collection of records from the permissioned blockchain is broadcast. Therefore, the record is verifiably immutable and each result includes the hash of the record and the previous/next hashes. As noted above, the use of compound identities and/or access control lists can enable users to grant permission to decrypt certain pieces of information or individual records within the permissioned blockchain. In several embodiments, the access to the data is determined by computer systems that implement permission-based data access services.

In many embodiments, the permissioned blockchain 208 can be implemented using any blockchain technology appropriate to the requirements of a given application. As noted above, the information and processes described herein are not limited to data written to permissioned blockchains 208, and NFT transaction data simply provides an example. Systems and methods in accordance with various embodiments of the invention can be utilized to enable applications to provide fine-grained permission to any of a variety of different types of data stored in an immutable ledger as appropriate to the requirements of a given application in accordance with various embodiments of the invention.

While various implementations of NFT platforms are described above with reference to FIG. 2, NFT platforms can be implemented using any number of immutable and pseudo-immutable ledgers as appropriate to the requirements of specific applications in accordance with various embodiments of the invention. Blockchain databases in accordance with various embodiments of the invention may be managed autonomously using peer-to-peer networks and distributed timestamping servers. In some embodiments, any of a variety of consensus mechanisms may be used by public blockchains, including but not limited to Proof of Space mechanisms, Proof of Work mechanisms, Proof of Stake mechanisms, and hybrid mechanisms.

NFT platforms in accordance with many embodiments of the invention may benefit from the oversight and increased security of private blockchains. As can readily be appreciated, a variety of approaches can be taken to the writing of data to permissioned blockchains and the particular approach is largely determined by the requirements of particular applications. As such, computer systems in accordance with various embodiments of the invention can have the capacity to create verified NFT entries written to permissioned blockchains.

Figure 3:
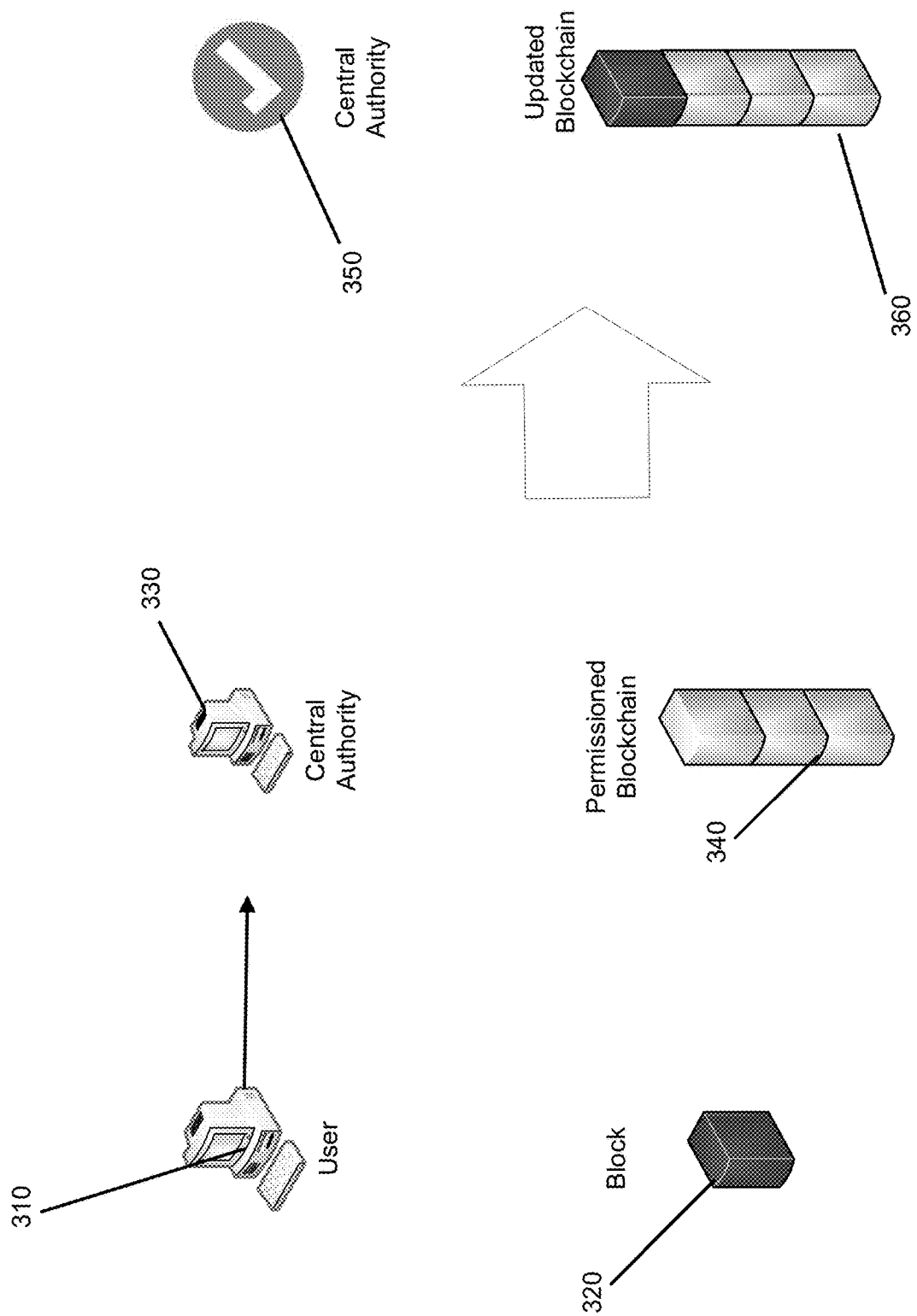
FIG. 3 is a conceptual diagram of a permissioned blockchain in accordance with an embodiment of the invention.

An implementation of permissioned (or private) blockchains in accordance with some embodiments of the invention is illustrated in FIG. 3. Permissioned blockchains 340 can typically function as closed computing systems in which each participant is well defined. In several embodiments, private blockchain networks may require invitations. In a number of embodiments, entries, or blocks 320, to private blockchains can be validated. In some embodiments, the validation may come from central authorities 330. Private blockchains can allow an organization or a consortium of organizations to efficiently exchange information and record transactions. Specifically, in a permissioned blockchain, a preapproved central authority 330 (which should be understood as potentially encompassing multiple distinct authorized authorities) can approve a change to the blockchain. In a number of embodiments, approval may come without the use of a consensus mechanism involving multiple authorities. As such, through a direct request from users 310 to the central authority 330, the determination of whether blocks 320 can be allowed access to the permissioned blockchain 340 can be determined. Blocks 320 needing to be added, eliminated, relocated, and/or prevented from access may be controlled through these means. In doing so the central authority 330 may manage accessing and controlling the network blocks incorporated into the permissioned blockchain 340. Upon the approval 350 of the central authority, the now updated blockchain 360 can reflect the added block 320.

NFT platforms in accordance with many embodiments of the invention may also benefit from the anonymity and accessibility of a public blockchain. Therefore, NFT platforms in accordance with many embodiments of the invention can have the capacity to create verified NFT entries written to a permissioned blockchain.

Figure 4:
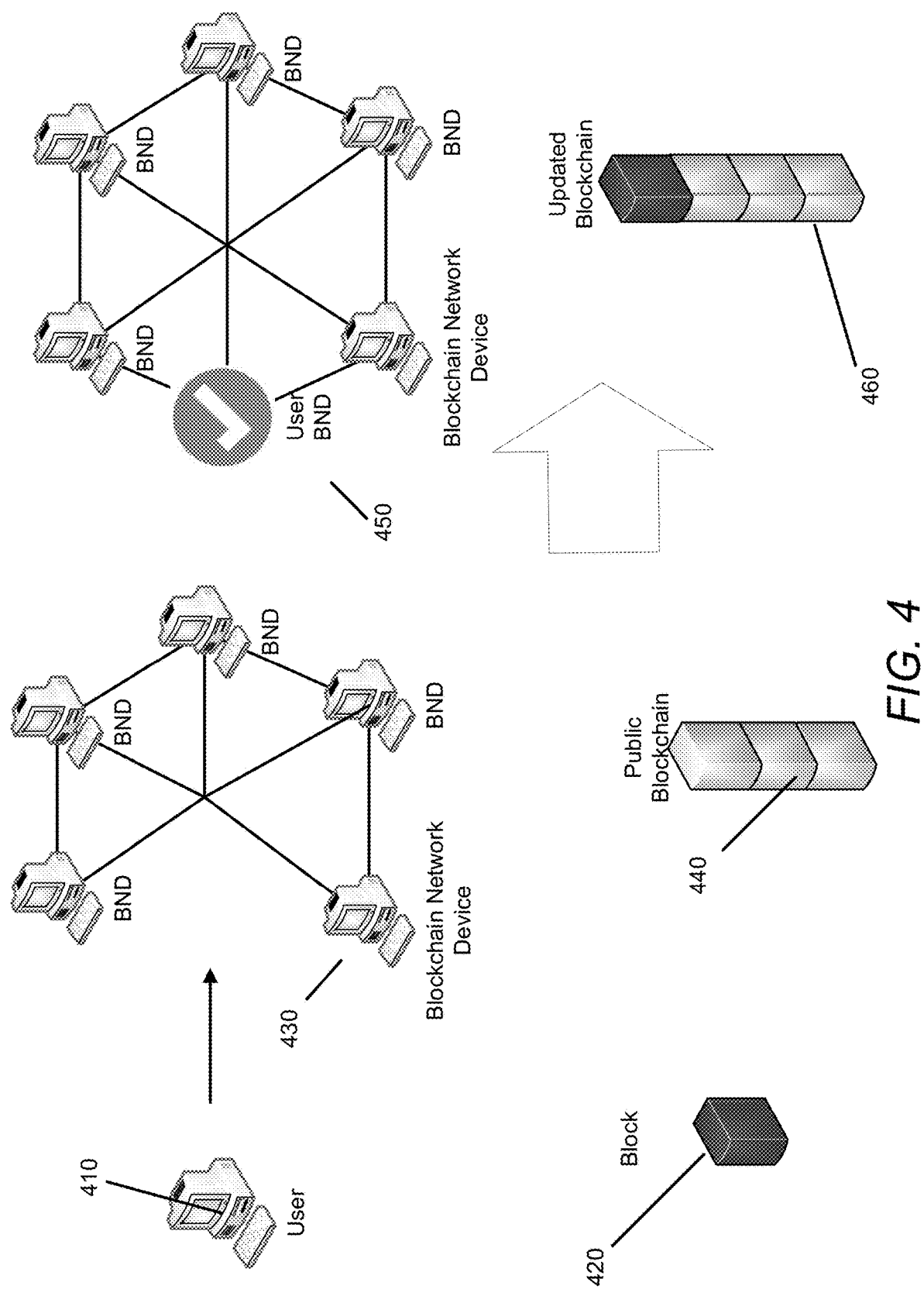
FIG. 4 is a conceptual diagram of a permissionless blockchain in accordance with an embodiment of the invention.

An implementation of a permissionless, decentralized, or public blockchain in accordance with an embodiment of the invention is illustrated in FIG. 4. In a permissionless blockchain, individual users 410 can directly participate in relevant networks and operate as blockchain network devices 430. As blockchain network devices 430, parties would have the capacity to participate in changes to the blockchain and participate in transaction verifications (via the mining mechanism). Transactions are broadcast over the computer network and data quality is maintained by massive database replication and computational trust. Despite being decentralized, an updated blockchain 460 cannot remove entries, even if anonymously made, making it immutable. In many decentralized blockchains, many blockchain network devices 430, in the decentralized system may have copies of the blockchain, allowing the ability to validate transactions. In many instances, the blockchain network device 430 can personally add transactions, in the form of blocks 420 appended to the public blockchain 440. To do so, the blockchain network device 430 would take steps to allow for the transactions to be validated 450 through various consensus mechanisms (Proof of Work, Proof of Stake, etc.). A number of consensus mechanisms in accordance with various embodiments of the invention are discussed further below.

Additionally, in the context of blockchain configurations, the term smart contract is often used to refer to software programs that run on blockchains. While a standard legal contract outlines the terms of a relationship (usually one enforceable by law), a smart contract enforces a set of rules using self-executing code within NFT platforms. As such, smart contracts may have the means to automatically enforce specific programmatic rules through platforms. Smart contracts are often developed as high-level programming abstractions that can be compiled down to bytecode. Said bytecode may be deployed to blockchains for execution by computer systems using any number of mechanisms deployed in conjunction with the blockchain. In many instances, smart contracts execute by leveraging the code of other smart contracts in a manner similar to calling upon a software library.

A number of existing decentralized blockchain technologies intentionally exclude or prevent rich media assets from existing within the blockchain, because they would need to address content that is not static (e.g., images, videos, music files). Therefore, NFT platforms in accordance with many embodiments of the invention may address this with blockchain mechanisms, that preclude general changes but account for updated content.

NFT platforms in accordance with many embodiments of the invention can therefore incorporate decentralized storage pseudo-immutable dual blockchains. In some embodiments, two or more blockchains may be interconnected such that traditional blockchain consensus algorithms support a first blockchain serving as an index to a second, or more, blockchains serving to contain and protect resources, such as the rich media content associated with NFTs.

In storing rich media using blockchain, several components may be utilized by an entity ("miner") adding transactions to said blockchain. References, such as URLs, may be stored in the blockchain to identify assets. Multiple URLs may also be stored when the asset is separated into pieces. An alternative or complementary option may be the use of APIs to return either the asset or a URL for the asset. In accordance with many embodiments of the invention, references can be stored by adding a ledger entry incorporating the reference enabling the entry to be timestamped. In doing so, the URL, which typically accounts for domain names, can be resolved to IP addresses. However, when only files of certain types are located on particular resources, or where small portions of individual assets are stored at different locations, users may require methods to locate assets stored on highly-splintered decentralized storage systems. To do so, systems may identify at least primary asset destinations and update those primary asset destinations as necessary when storage resources change. The mechanisms used to identify primary asset destinations may take a variety of forms including, but not limited to, smart contracts.

Figure 5A:
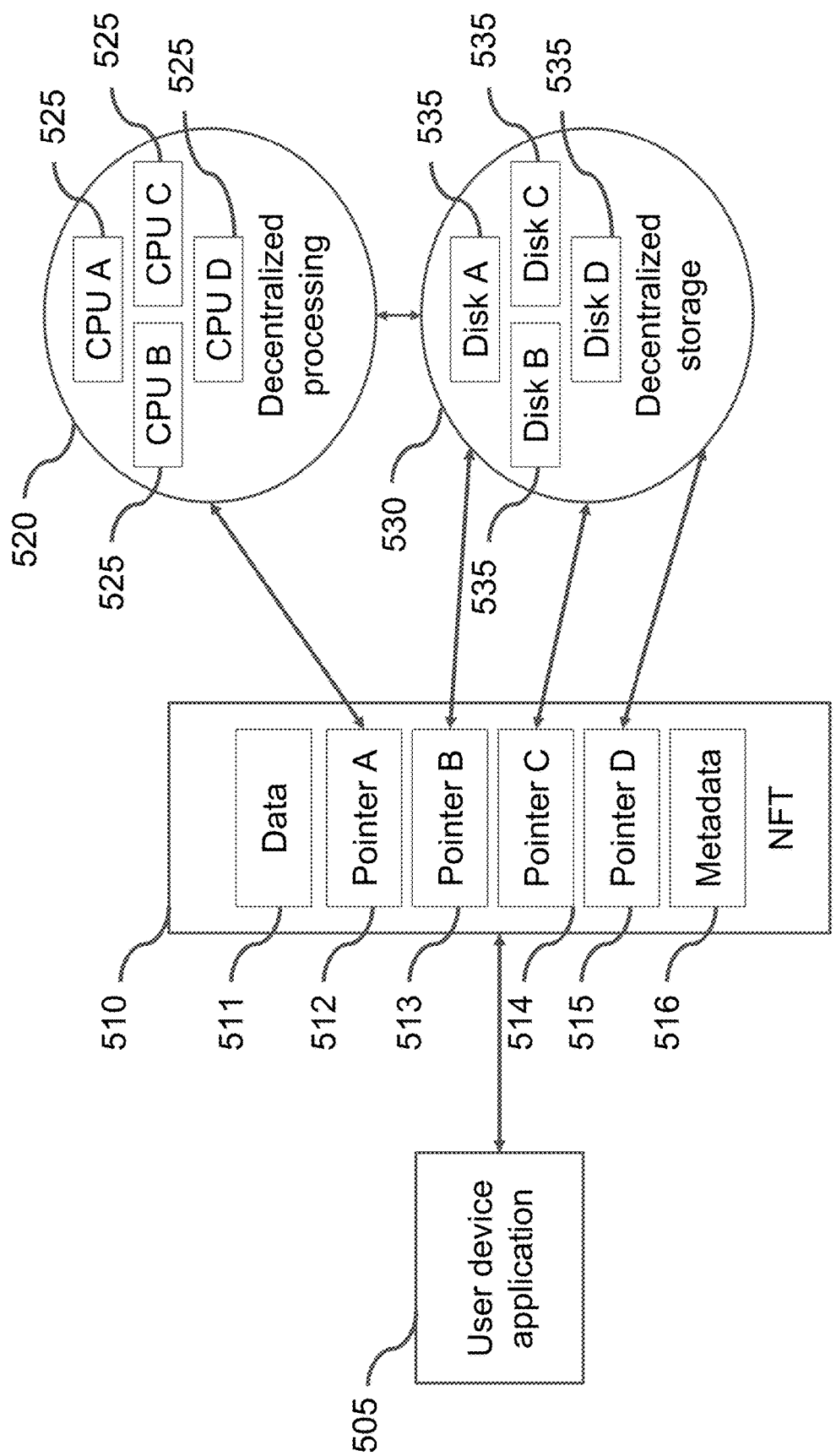
FIGS. 5A-5B are diagrams of a dual blockchain in accordance with a number of embodiments of the invention.

A dual blockchain, including decentralized processing 520 and decentralized storage 530 blockchains, in accordance with some embodiments of the invention is illustrated in FIG. 5A. Application running on devices 505, may interact with or make a request related to NFTs 510 interacting with such a blockchain. An NFT 510 in accordance with several embodiments of the invention may include many values including generalized data 511 (e.g. URLs), and pointers such as pointer A 512, pointer B 513, pointer C 514, and pointer D 515. In accordance with many embodiments of the invention, the generalized data 511 may be used to access corresponding rich media through the NFT 510. The NFT 510 may additionally have associated metadata 516.

Pointers within the NFT 510 may direct an inquiry toward a variety of on or off-ledger resources. In some embodiments of the invention, as illustrated FIG. 5A, pointer A 512 can direct the need for processing to the decentralized processing network 520. Processing systems are illustrated as CPU A, CPU B, CPU C, and CPU D 525. The CPUs 525 may be personal computers, server computers, mobile devices, edge IoT devices, etc. Pointer A may select one or more processors at random to perform the execution of a given smart contract. The code may be secure or nonsecure and the CPU may be a trusted execution environment (TEE), depending upon the needs of the request. In the example reflected in FIG. 5A, pointer B 513, pointer C 514, and pointer D 515 all point to a decentralized storage network 530 including remote off-ledger resources including storage systems illustrated as Disks A, B, C, and D 535.

The decentralized storage system may co-mingle with the decentralized processing system as the individual storage systems utilize CPU resources and connectivity to perform their function. From afunctional perspective, the two decentralized systems may also be separate. Pointer B 513 may point to one or more decentralized storage networks 530 for the purposes of maintaining an off-chain log file of token activity and requests. Pointer C 514 may point to executable code within one or more decentralized storage networks 530. And Pointer D 515 may point to rights management data, security keys, and/or configuration data within one or more decentralized storage networks 530.

Figure 5B:
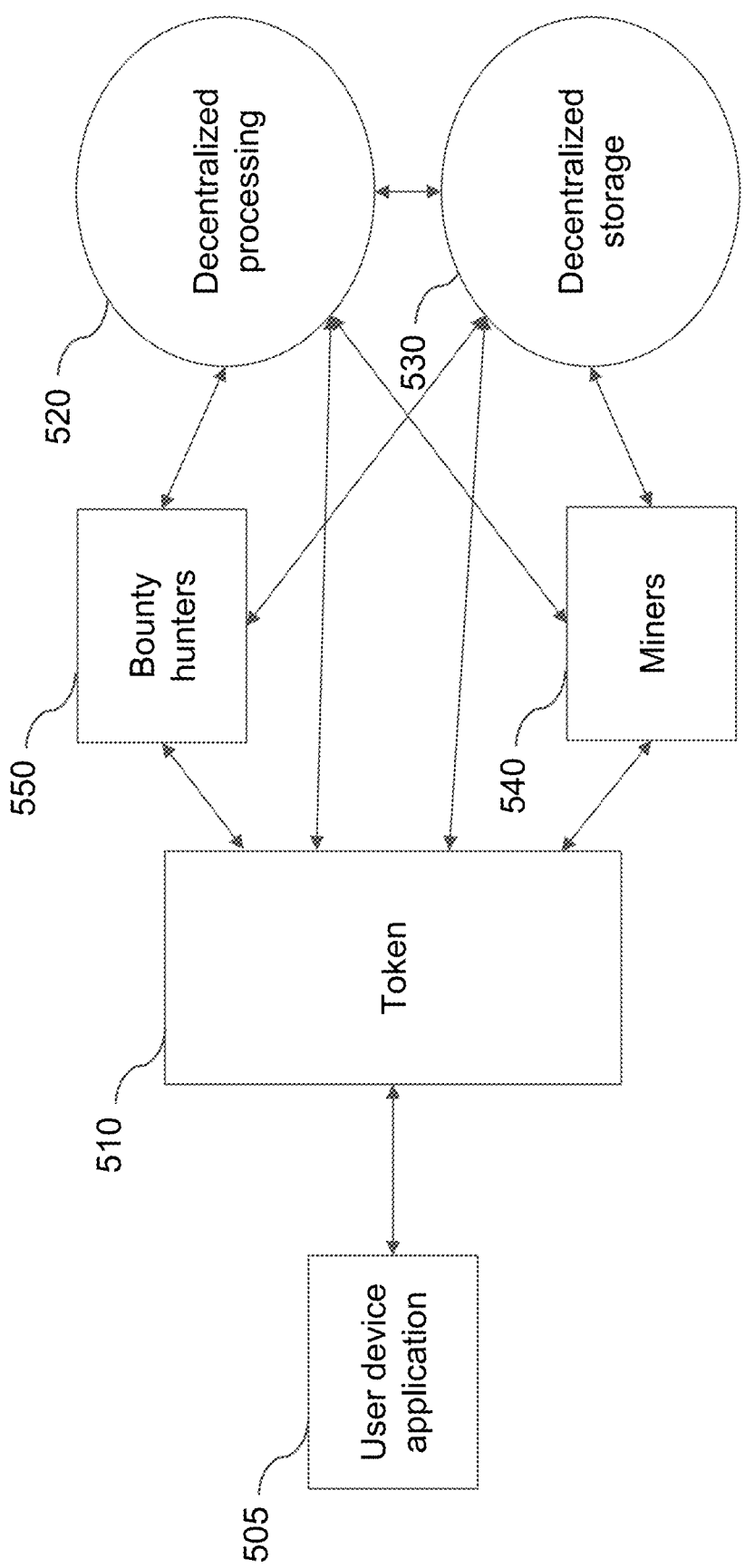

Dual blockchains may additionally incorporate methods for detection of abuse, essentially operating as a "bounty hunter" 550. FIG. 5B illustrates the inclusion of bounty hunters 550 within dual blockchain structures implemented in accordance with an embodiment of the invention. Bounty hunters 550 allow NFTs 510, which can point to networks that may include decentralized processing 520 and/or storage networks 530, to be monitored. The bounty hunter's 550 objective may be to locate incorrectly listed or missing data and executable code within the NFT 510 or associated networks. Additionally, the miner 540 can have the capacity to perform all necessary minting processes or any process within the architecture that involves a consensus mechanism.

Bounty hunters 550 may also choose to verify each step of a computation, and if they find an error, submit evidence of this in return for some reward. This can have the effect of invalidating the incorrect ledger entry and, potentially based on policies, all subsequent ledger entries. Such evidence can be submitted in a manner that is associated with a public key, in which the bounty hunter 550 proves knowledge of the error, thereby assigning value (namely the bounty) with the public key.

Assertions made by bounty hunters 550 may be provided directly to miners 540 by broadcasting the assertion. Assertions may be broadcast in a manner including, but not limited to posting it to a bulletin board. In some embodiments of the invention, assertions may be posted to ledgers of blockchains, for instance, the blockchain on which the miners 540 operate. If the evidence in question has not been submitted before, this can automatically invalidate the ledger entry that is proven wrong and provide the bounty hunter 550 with some benefit.

Applications and methods in accordance with various embodiments of the invention are not limited to use within NFT platforms. Accordingly, it should be appreciated that the capabilities of any blockchain configuration described herein can also be implemented outside the context of an NFT platform network architecture unrelated to the storage of fungible tokens and/or NFTs. A variety of components, mechanisms, and blockchain configurations that can be utilized within NFT platforms are discussed further below. Moreover, any of the blockchain configurations described herein with reference to FIGS. 3-5B (including permissioned, permissionless, and/or hybrid mechanisms) can be utilized within any of the networks implemented within the NFT platforms described above.

NFT Platform Consensus Mechanisms

NFT platforms in accordance with many embodiments of the invention can depend on consensus mechanisms to achieve agreement on network state, through proof resolution, to validate transactions. In accordance with many embodiments of the invention, Proof of Work (PoW) mechanisms may be used as a means of demonstrating non-trivial allocations of processing power. Proof of Space (PoSp) mechanisms may be used as a means of demonstrating non-trivial allocations of memory or disk space. As a third possible approach, Proof of Stake mechanisms may be used as a means of demonstrating non-trivial allocations of fungible tokens and/or NFTs as a form of collateral. Numerous consensus mechanisms are possible in accordance with various embodiments of the invention, some of which are expounded on below.

Traditional mining schemes, such as Bitcoin, are based on Proof of Work, based on performing the aforementioned large computational tasks. The cost of such tasks may not only be computational effort, but also energy expenditure, a significant environmental concern. To address this problem, mining methods operating in accordance with many embodiments of the invention may instead operate using Proof of Space mechanisms to accomplish network consensus, wherein the distinguishing factor can be memory rather than processing power. Specifically, Proof of Space mechanisms can perform this through network optimization challenges. In several embodiments the network optimization challenge may be selected from any of a number of different challenges appropriate to the requirements of specific applications including graph pebbling. In some embodiments, graph pebbling may refer to a resource allocation game played on discrete mathematics graphs, ending with a labeled graph disclosing how a player might get at least one pebble to every vertex of the graph.

Figure 6:
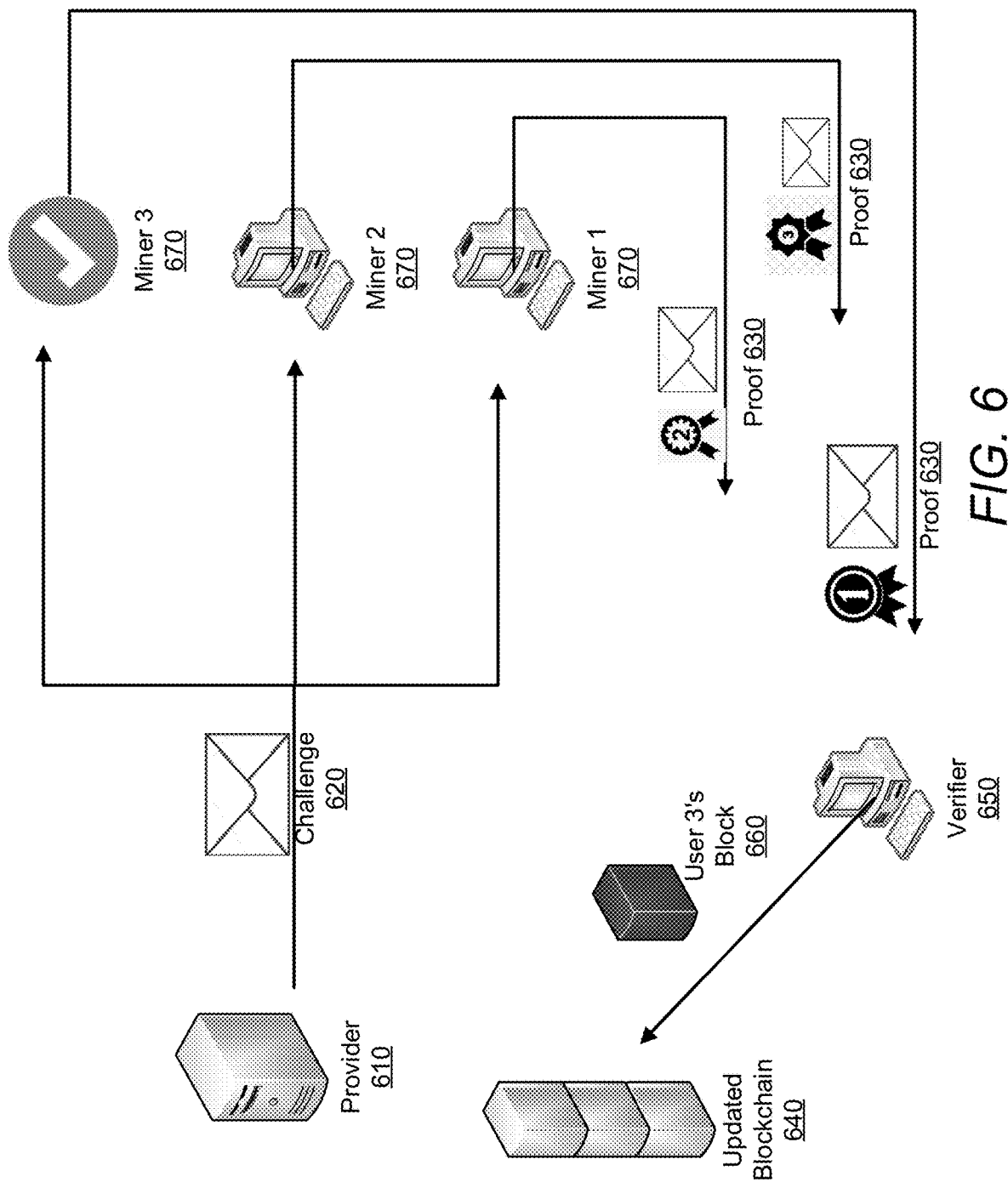
FIG. 6 conceptually illustrates a process followed by a Proof of Work consensus mechanism in accordance with an embodiment of the invention.

An example of Proof of Work consensus mechanisms that may be implemented in decentralized blockchains, in accordance with a number of embodiments of the invention, is conceptually illustrated in FIG. 6. The example disclosed in this figure is a challenge-response authentication, a protocol classification in which one party presents a complex problem ("challenge") 610 and another party must broadcast a valid answer ("proof") 620 to have clearance to add a block to the decentralized ledger that makes up the blockchain 630. As a number of miners may be competing to have this ability, there may be a need for determining factors for the addition to be added first, which in this case is processing power. Once an output is produced, verifiers 640 in the network can verify the proof, something which typically requires much less processing power, to determine the first device that would have the right to add the winning block 650 to the blockchain 630. As such, under a Proof of Work consensus mechanism, each miner involved can have a success probability proportional to the computational effort expended.

Figure 7:
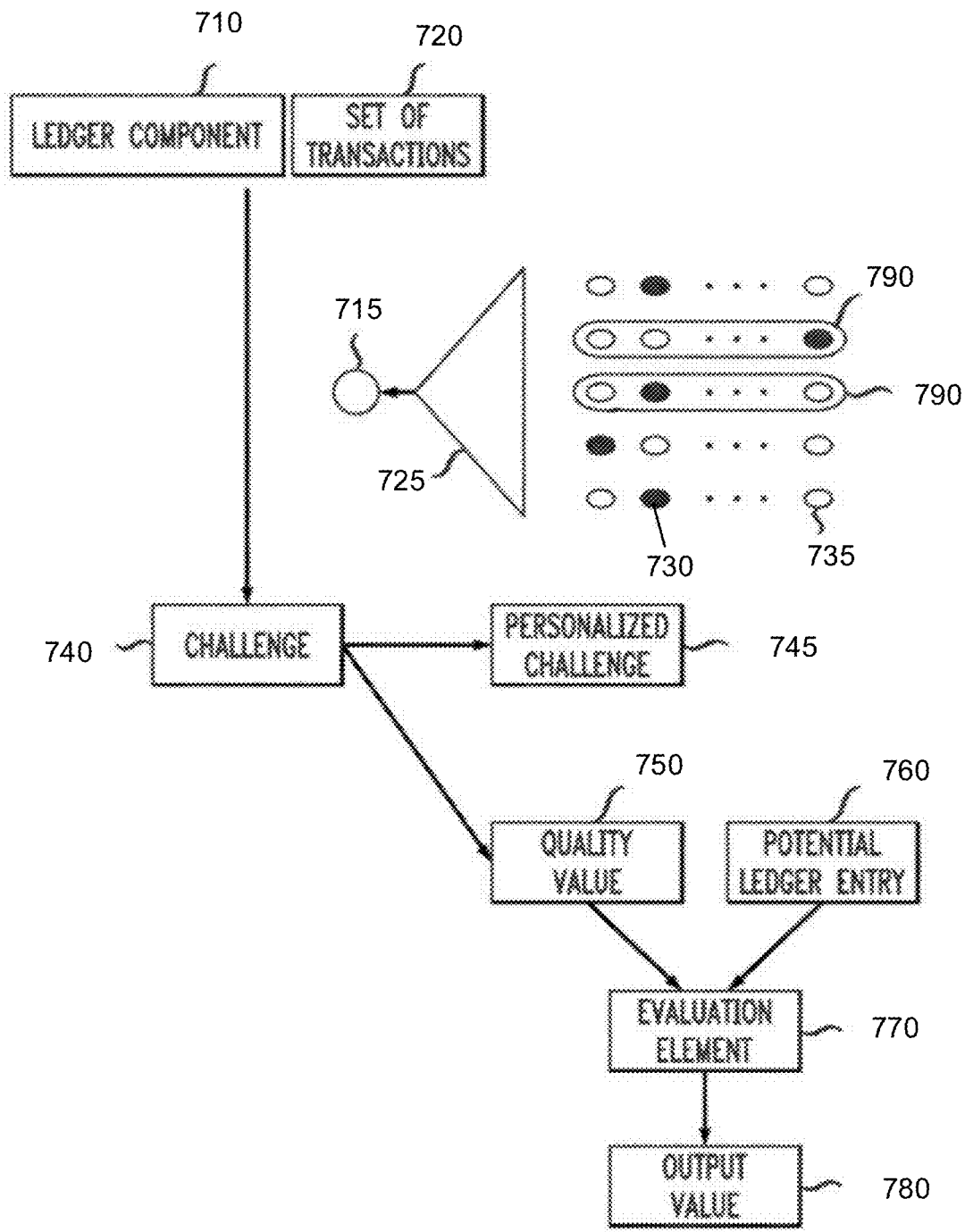
FIG. 7 conceptually illustrates a process followed by a Proof of Space consensus mechanism in accordance with an embodiment of the invention.

An example of Proof of Space implementations on devices in accordance with some embodiments of the invention is conceptually illustrated in FIG. 7. The implementation includes a ledger component 710, a set of transactions 720, and a challenge 740 computed from a portion of the ledger component 710. A representation 715 of a miner's state may also be recorded in the ledger component 710 and be publicly available.

In some embodiments, the material stored on the memory of the device includes a collection of nodes 730, 735, where nodes that depend on other nodes have values that are functions of the values of the associated nodes on which they depend. For example, functions may be one-way functions, such as cryptographic hash functions. In several embodiments the cryptographic hash function may be selected from any of a number of different cryptographic hash functions appropriate to the requirements of specific applications including (but not limited to) the SHA1 cryptographic hash function. In such an example, one node in the network may be a function of three other nodes. Moreover, the node may be computed by concatenating the values associated with these three nodes and applying the cryptographic hash function, assigning the result of the computation to the node depending on these three parent nodes. In this example, the nodes are arranged in rows, where two rows 790 are shown. The nodes are stored by the miner, and can be used to compute values at a setup time. This can be done using Merkle tree hash-based data structures 725, or another structure such as a compression function and/or a hash function.

Challenges 740 may be processed by the miner to obtain personalized challenges 745, made to the device according to the miner's storage capacity. The personalized challenge 745 can be the same or have a negligible change, but could also undergo an adjustment to account for the storage space accessible by the miner, as represented by the nodes the miner stores. For example, when the miner does not have a large amount of storage available or designated for use with the Proof of Space system, a personalized challenge 745 may adjust challenges 740 to take this into consideration, thereby making a personalized challenge 745 suitable for the miner's memory configuration.

In some embodiments, the personalized challenge 745 can indicate a selection of nodes 730, denoted in FIG. 7 by filled-in circles. In the FIG. 7 example specifically, the personalized challenge corresponds to one node per row. The collection of nodes selected as a result of computing the personalized challenge 745 can correspond to a valid potential ledger entry 760. However, here a quality value 750 (also referred to herein as a qualifying function value) can also be computed from the challenge 740, or from other public information that is preferably not under the control of any one miner.

A miner may perform matching evaluations 770 to determine whether the set of selected nodes 730 matches the quality value 750. This process can take into consideration what the memory constraints of the miner are, causing the evaluation 770 to succeed with a greater frequency for larger memory configurations than for smaller memory configurations. This can simultaneously level the playing field to make the likelihood of the evaluation 770 succeeding roughly proportional to the size of the memory used to store the nodes used by the miner. In some embodiments, non-proportional relationships may be created by modifying the function used to compute the quality value 750. When the evaluation 770 results in success, then the output value 780 may be used to confirm the suitability of the memory configuration and validate the corresponding transaction.

In many embodiments, nodes 730 and 735 can also correspond to public keys. The miner may submit valid ledger entries, corresponding to a challenge-response pair including one of these nodes. In that case, public key values can become associated with the obtained NFT. As such, miners can use a corresponding secret/private key to sign transaction requests, such as purchases. Additionally, any type of digital signature can be used in this context, such as RSA signatures, Merkle signatures, DSS signatures, etc. Further, the nodes 730 and 735 may correspond to different public keys or to the same public key, the latter preferably augmented with a counter and/or other location indicator such as a matrix position indicator, as described above. Location indicators in accordance with many embodiments of the invention may be applied to point to locations within a given ledger. In accordance with some embodiments of the invention, numerous Proof of Space consensus configurations are possible, some of which are discussed below.

Hybrid methods of evaluating Proof of Space problems can also be implemented in accordance with many embodiments of the invention. In many embodiments, hybrid methods can be utilized that conceptually correspond to modifications of Proof of Space protocols in which extra effort is expanded to increase the probability of success, or to compress the amount of space that may be applied to the challenge. Both come at a cost of computational effort, thereby allowing miners to improve their odds of winning by spending greater computational effort. Accordingly, in many embodiments of the invention dual proof-based systems may be used to reduce said computational effort. Such systems may be applied to Proof of Work and Proof of Space schemes, as well as to any other type of mining-based scheme.

When utilizing dual proofs in accordance with various embodiments of the invention, the constituent proofs may have varying structures. For example, one may be based on Proof of Work, another on Proof of Space, and a third may be a system that relies on a trusted organization for controlling the operation, as opposed to relying on mining for the closing of ledgers. Yet other proof structures can be combined in this way. The result of the combination will inherit properties of its components. In many embodiments, the hybrid mechanism may incorporate a first and a second consensus mechanism. In several embodiments, the hybrid mechanism includes a first, a second, and a third consensus mechanisms. In a number of embodiments, the hybrid mechanism includes more than three consensus mechanisms. Any of these embodiments can utilize consensus mechanisms selected from the group including (but not limited to) Proof of Work, Proof of Space, and Proof of Stake without departing from the scope of the invention. Depending on how each component system is parametrized, different aspects of the inherited properties will dominate over other aspects.

Figure 8:
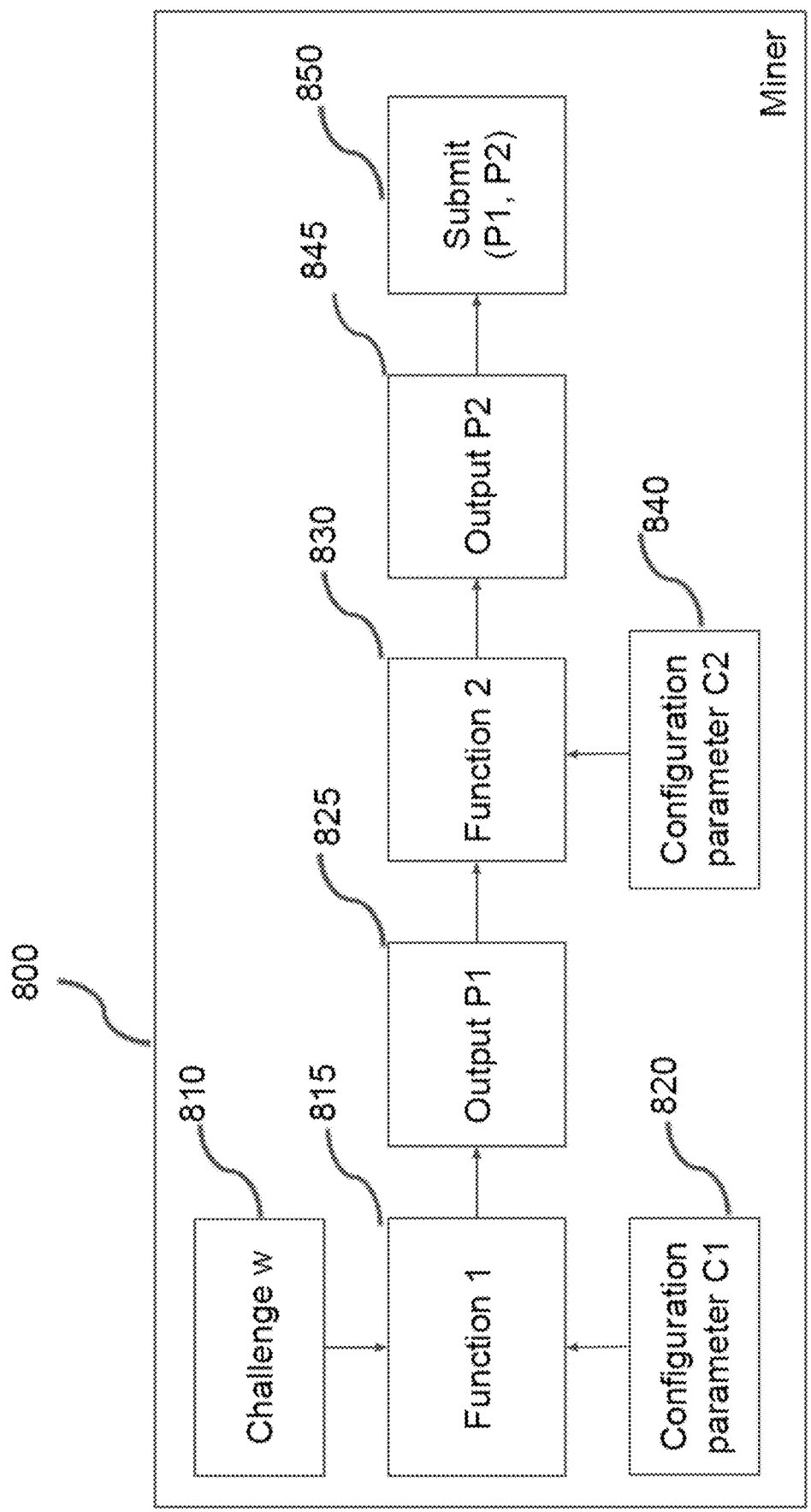
FIG. 8 illustrates a dual proof consensus mechanism configuration in accordance with an embodiment of the invention.

Dual proof configurations in accordance with a number of embodiments of the invention is illustrated in FIG. 8. A proof configuration in accordance with some embodiments of the invention may tend to use the notion of quality functions for tie-breaking among multiple competing correct proofs relative to a given challenge (w) 810. This classification of proof can be described as a qualitative proof, inclusive of proofs of work and proofs of space. In the example reflected in FIG. 8, proofs P1 and P2 are each one of a Proof of Work, Proof of Space, Proof of Stake, and/or any other proof related to a constrained resource, wherein P2 may be of a different type than P1, or may be of the same type.

Systems in accordance with many embodiments of the invention may introduce the notion of a qualifying proof, which, unlike qualitative proofs, are either valid or not valid, using no tie-breaking mechanism. Said systems may include a combination of one or more qualitative proofs and one or more qualifying proofs. For example, it may use one qualitative proof that is combined with one qualifying proof, where the qualifying proof is performed conditional on the successful creation of a qualitative proof. FIG. 8 illustrates challenge w 810, as described above, with a function 1 815, which is a qualitative function, and function 2 830, which is a qualifying function.

To stop miners from expending effort after a certain amount of effort has been spent, thereby reducing the environmental impact of mining, systems in accordance with a number of embodiments of the invention can constrain the search space for the mining effort. This can be done using a configuration parameter that controls the range of random or pseudo-random numbers that can be used in a proof. Upon challenge w 810 being issued to one or more miners 800, it can be input to Function 1 815 along with configuration parameter C1 820. Function 1 815 may output proof P1 825, in this example the qualifying proof to Function 2 830. Function 2 830 is also provided with configuration parameter C2 840 and computes qualifying proof P2 845. The miner 800 can then submit the combination of proofs (P1, P2) 850 to a verifier, in order to validate a ledger associated with challenge w 810. In some embodiments, miner 800 can also submit the proofs (P1, P2) 850 to be accessed by a 3rd-party verifier.

NFT platforms in accordance with many embodiments of the invention may additionally benefit from alternative energy-efficient consensus mechanisms. Therefore, computer systems in accordance with several embodiments of the invention may instead use consensus-based methods alongside or in place of proof-of-space and proof-of-space based mining. In particular, consensus mechanisms based instead on the existence of a Trusted Execution Environment (TEE), such as ARM TrustZone™ or Intel SGX™ may provide assurances exist of integrity by virtue of incorporating private/isolated processing environments.

Figure 9:
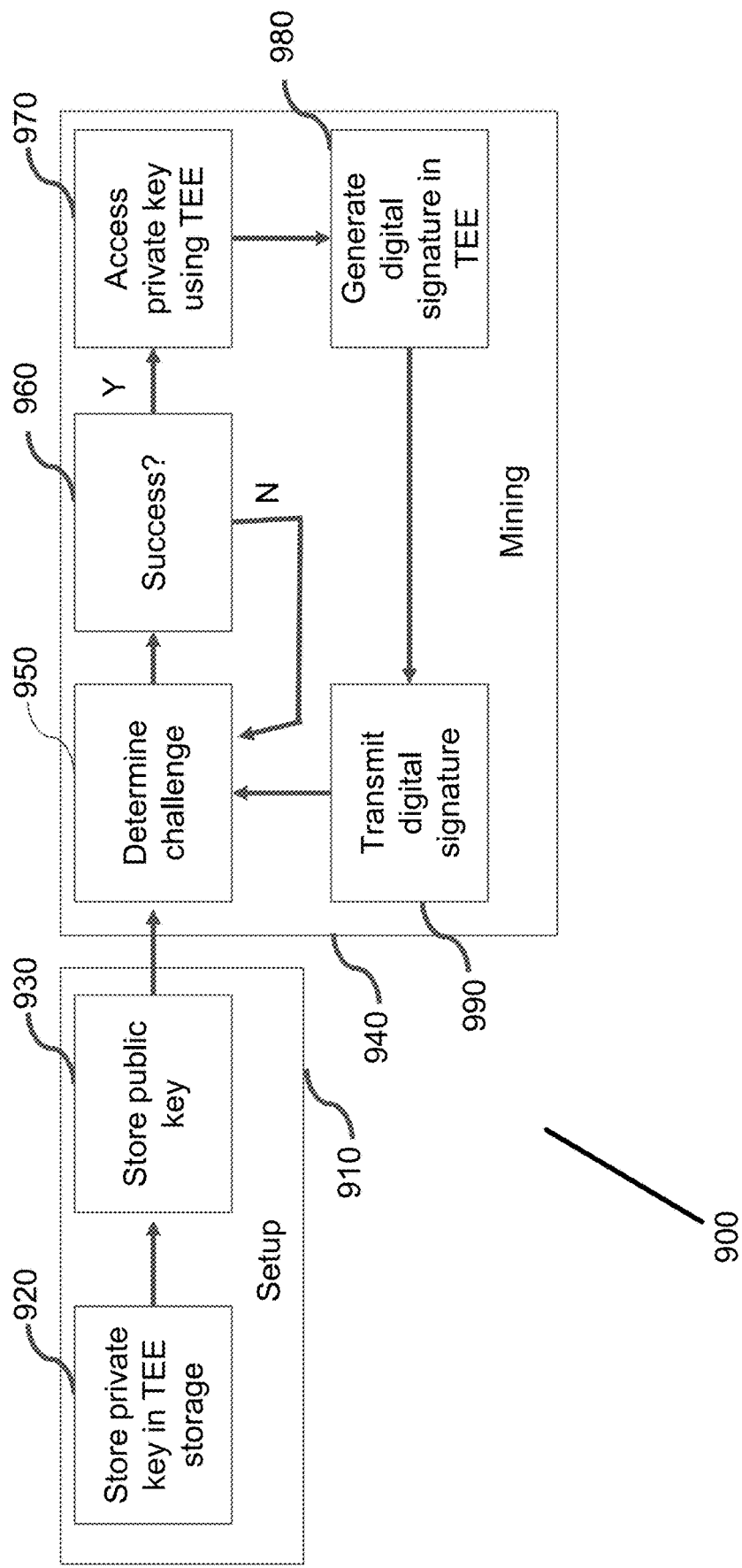
FIG. 9 illustrates a process followed by a Trusted Execution Environment-based consensus mechanism in accordance with some embodiments of the invention.

An illustration of sample process 900 undergone by TEE-based consensus mechanisms in accordance with some embodiments of the invention is depicted in FIG. 9. In some such configurations, a setup 910 may be performed by an original equipment manufacturer (OEM) or a party performing configurations of equipment provided by an OEM. Once a private key/public key pair is generated in the secure environment, process 900 may store (920) the private key in TEE storage (i.e. storage associated with the Trusted Execution Environment). While storage may be accessible from the TEE, it can be shielded from applications running outside the TEE. Additionally, processes can store (930) the public key associated with the TEE in any storage associated with the device containing the TEE. Unlike the private key, the public key may also be accessible from applications outside the TEE. In a number of embodiments, the public key may also be certified. Certification may come from OEMs or trusted entities associated with the OEMs, wherein the certificate can be stored with the public key.

In many embodiments of the invention, mining-directed steps can also be influenced by the TEE. In the illustrated embodiment, the process 900 can determine (950) a challenge. For example, this may be by computing a hash of the contents of a ledger. In doing so, process 900 may also determine whether the challenge corresponds to success 960. In some embodiments of the invention, the determination of success may result from some pre-set portion of the challenge matching a pre-set portion of the public key, e.g. the last 20 bits of the two values matching. In several embodiments the success determination mechanism may be selected from any of a number of alternate approaches appropriate to the requirements of specific applications. The matching conditions may also be modified over time. For example, modification may result from an announcement from a trusted party or based on a determination of a number of participants having reached a threshold value.

When the challenge does not correspond to a success 960, process 900 can return to determine (950) a new challenge. In this context, process 900 can determine (950) a new challenge after the ledger contents have been updated and/or a time-based observation is performed. In several embodiments the determination of a new challenge may come from any of a number of approaches appropriate to the requirements of specific applications, including, but not limited to, the observation of as a second elapsing since the last challenge. If the challenge corresponds to a success 960, then the processing can continue on to access (970) the private key using the TEE.

When the private key is accessed, process can generate (980) a digital signature using the TEE. The digital signature may be on a message that includes the challenge and/or which otherwise references the ledger entry being closed. Process 900 can also transmit (980) the digital signature to other participants implementing the consensus mechanism. In cases where multiple digital signatures are received and found to be valid, a tie-breaking mechanism can be used to evaluate the consensus. For example, one possible tie-breaking mechanism may be to select the winner as the party with the digital signature that represents the smallest numerical value when interpreted as a number. In several embodiments the tie-breaking mechanism may be selected from any of a number of alternate tie-breaking mechanisms appropriate to the requirements of specific applications.

Applications and methods in accordance with various embodiments of the invention are not limited to use within NFT platforms. Accordingly, it should be appreciated that consensus mechanisms described herein can also be implemented outside the context of an NFT platform network architecture unrelated to the storage of fungible tokens and/or NFTs. Moreover, any of the consensus mechanisms described herein with reference to FIGS. 6-9 (including Proof of Work, Proof of Space, Proof of Stake, and/or hybrid mechanisms) can be utilized within any of the blockchains implemented within the NFT platforms described above with reference to FIGS. 3-5B. Various systems and methods for implementing NFT platforms and applications in accordance with numerous embodiments of the invention are discussed further below.

NFT Platform Constituent Devices and Applications

A variety of computer systems that can be utilized within NFT platforms and systems that utilize NFT blockchains in accordance with various embodiments of the invention are illustrated below. The computer systems in accordance with many embodiments of the invention may implement a processing system 1010, 1120, 1220 using one or more CPUs, GPUs, ASICs, FPGAs, and/or any of a variety of other devices and/or combinations of devices that are typically utilized to perform digital computations. As can readily be appreciated each of these computer systems can be implemented using one or more of any of a variety of classes of computing devices including (but not limited to) mobile phone handsets, tablet computers, laptop computers, personal computers, gaming consoles, televisions, set top boxes and/or other classes of computing device.

Figure 10:
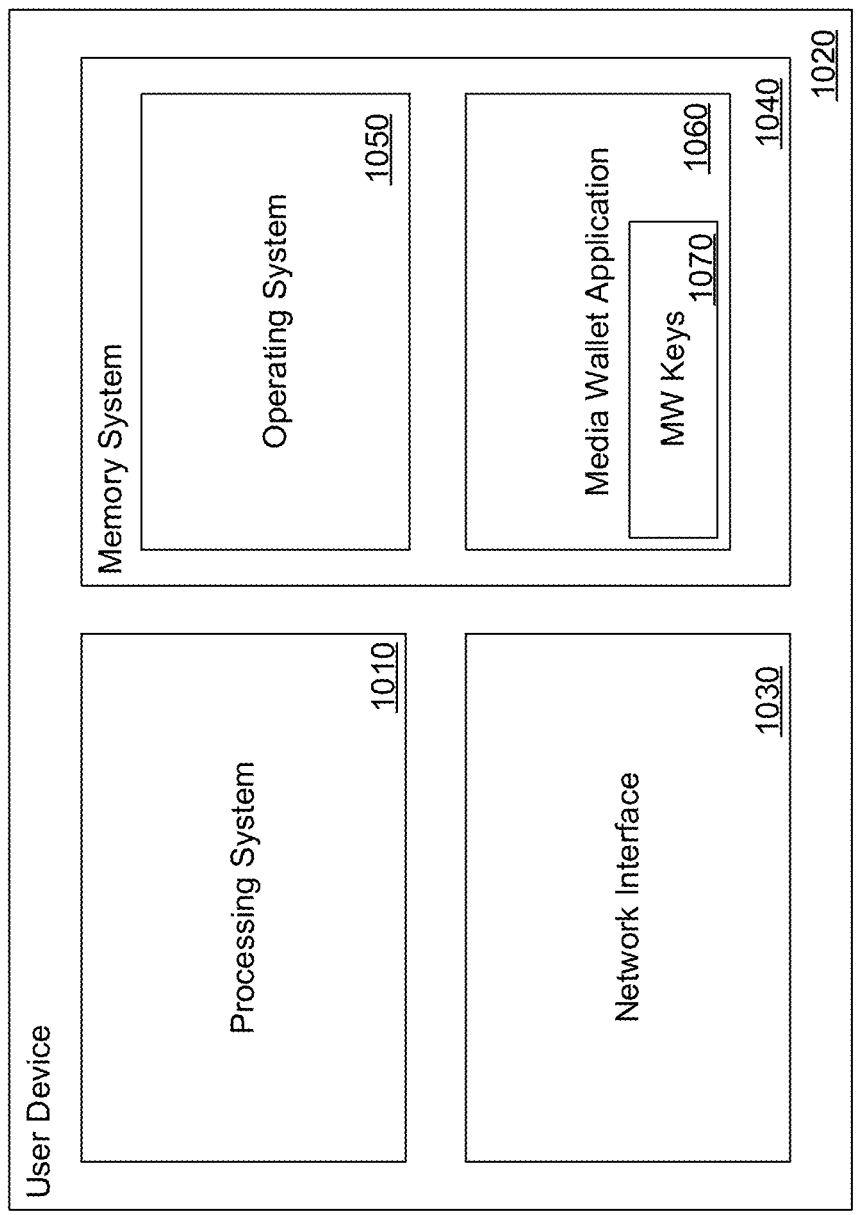
FIGS. 10-12 depicts various devices that can be utilized alongside an NFT platform in accordance with various embodiments of the invention.

A user device capable of communicating with an NFT platform in accordance with an embodiment of the invention is illustrated in FIG. 10. The memory system 1040 of particular user devices may include an operating system 1050 and media wallet applications 1060. Media wallet applications may include sets of media wallet (MW) keys 1070 that can include public key/private key pairs. The set of MW keys may be used by the media wallet application to perform a variety of actions including, but not limited to, encrypting and signing data. In many embodiments, the media wallet application enables the user device to obtain and conduct transactions with respect to NFTs by communicating with an NFT blockchain via the network interface 1030. In some embodiments, the media wallet applications are capable of enabling the purchase of NFTs using fungible tokens via at least one distributed exchange. User devices may implement some or all of the various functions described above with reference to media wallet applications as appropriate to the requirements of a given application in accordance with various embodiments of the invention.

Figure 11:
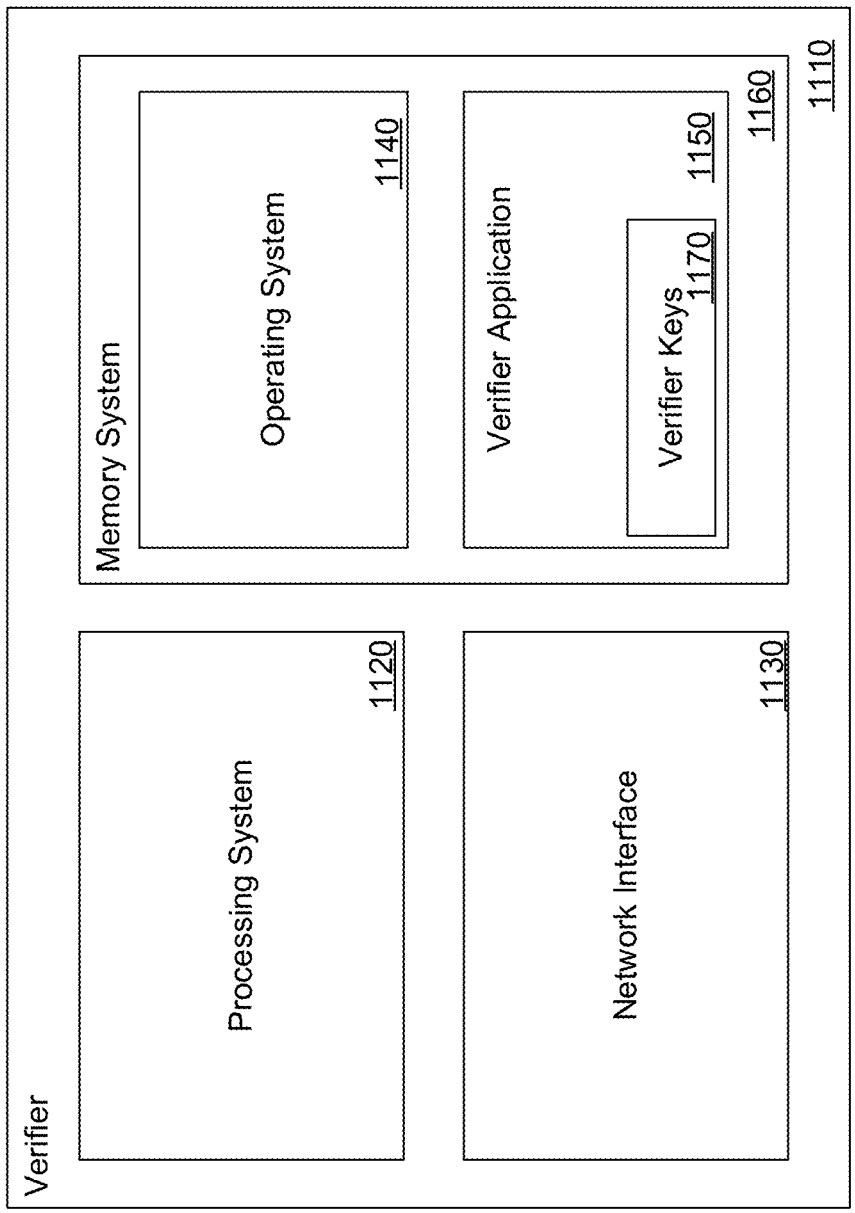

A verifier 1110 capable of verifying blockchain transactions in an NFT platform in accordance with many embodiments of the invention is illustrated in FIG. 11. The memory system 1160 of the verifier computer system includes an operating system 1140 and a verifier application 1150 that enables the verifier 1110 computer system to access a decentralized blockchain in accordance with various embodiments of the invention. Accordingly, the verifier application 1150 may utilize a set of verifier keys 1170 to affirm blockchain entries. When blockchain entries can be verified, the verifier application 1150 may transmit blocks to the corresponding blockchains. The verifier application 1150 can also implement some or all of the various functions described above with reference to verifiers as appropriate to the requirements of a given application in accordance with various embodiments of the invention.

Figure 12:
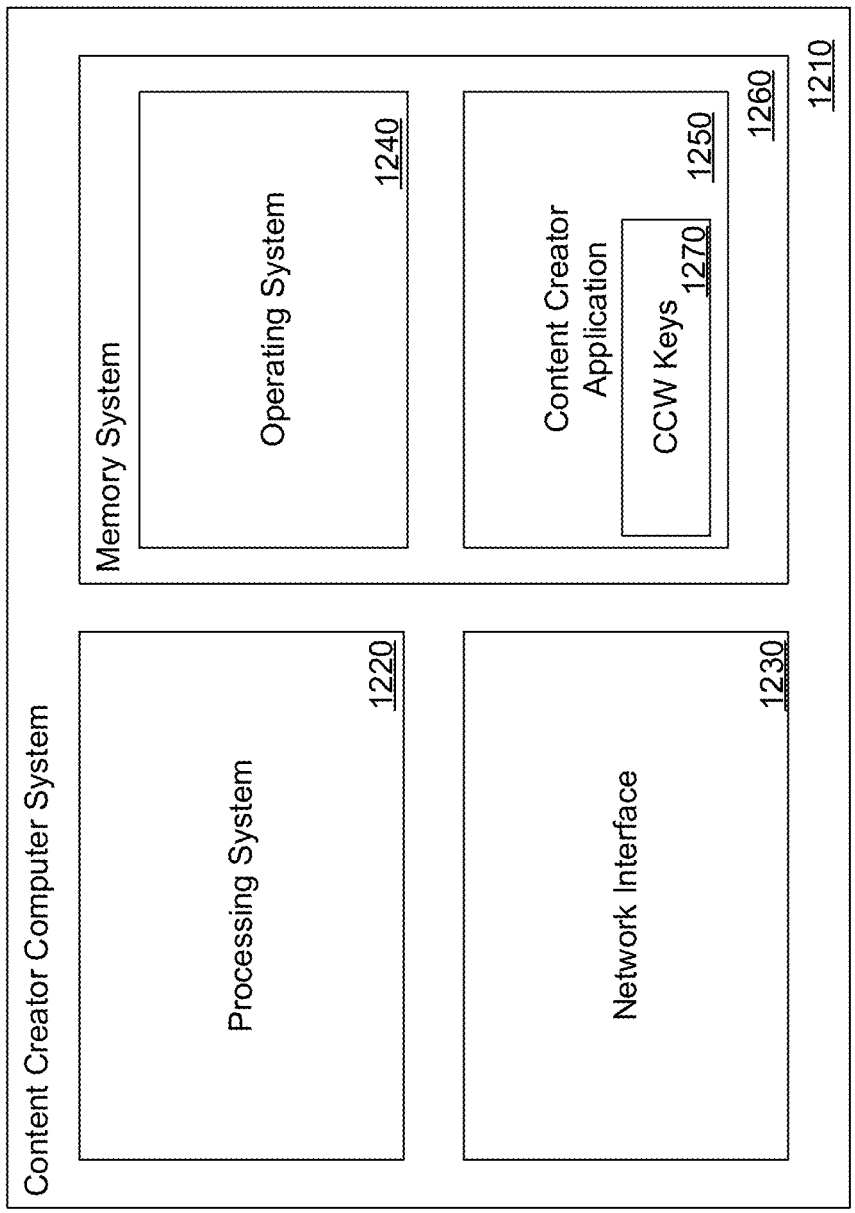

A content creator system 1210 capable of disseminating content in an NFT platform in accordance with an embodiment of the invention is illustrated in FIG. 12. The memory system 1260 of the content creator computer system may include an operating system 1240 and a content creator application 1250. The content creator application 1250 may enable the content creator computer system to mint NFTs by writing smart contracts to blockchains via the network interface 1230. The content creator application can include sets of content creator wallet (CCW) keys 1270 that can include a public key/private key pairs. Content creator applications may use these keys to sign NFTs minted by the content creator application. The content creator application can also implement some or all of the various functions described above with reference to content creators as appropriate to the requirements of a given application in accordance with various embodiments of the invention.

Computer systems in accordance with many embodiments of the invention incorporate digital wallets (herein also referred to as "wallets" or "media wallets") for NFT and/or fungible token storage. In several embodiments, the digital wallet may securely store rich media NFTs and/or other tokens. Additionally, in some embodiments, the digital wallet may display user interface through which user instructions concerning data access permissions can be received.

In a number of embodiments of the invention, digital wallets may be used to store at least one type of token-directed content. Example content types may include, but are not limited to crypto currencies of one or more sorts; non-fungible tokens; and user profile data.

Example user profile data may incorporate logs of user actions. In accordance with some embodiments of the invention, example anonymized user profile data may include redacted, encrypted, and/or otherwise obfuscated user data. User profile data in accordance with some embodiments may include, but are not limited to, information related to classifications of interests, determinations of a post-advertisement purchases, and/or characterizations of wallet contents.

Media wallets, when storing content, may store direct references to content. Media wallets may also reference content through keys to decrypt and/or access the content. Media wallets may use such keys to additionally access metadata associated with the content. Example metadata may include, but is not limited to, classifications of content. In a number of embodiments, the classification metadata may govern access rights of other parties related to the content.

Access governance rights may include, but are not limited to, whether a party can indicate their relationship with the wallet; whether they can read summary data associated with the content; whether they have access to peruse the content; whether they can place bids to purchase the content; whether they can borrow the content, and/or whether they are biometrically authenticated.

Figure 13:
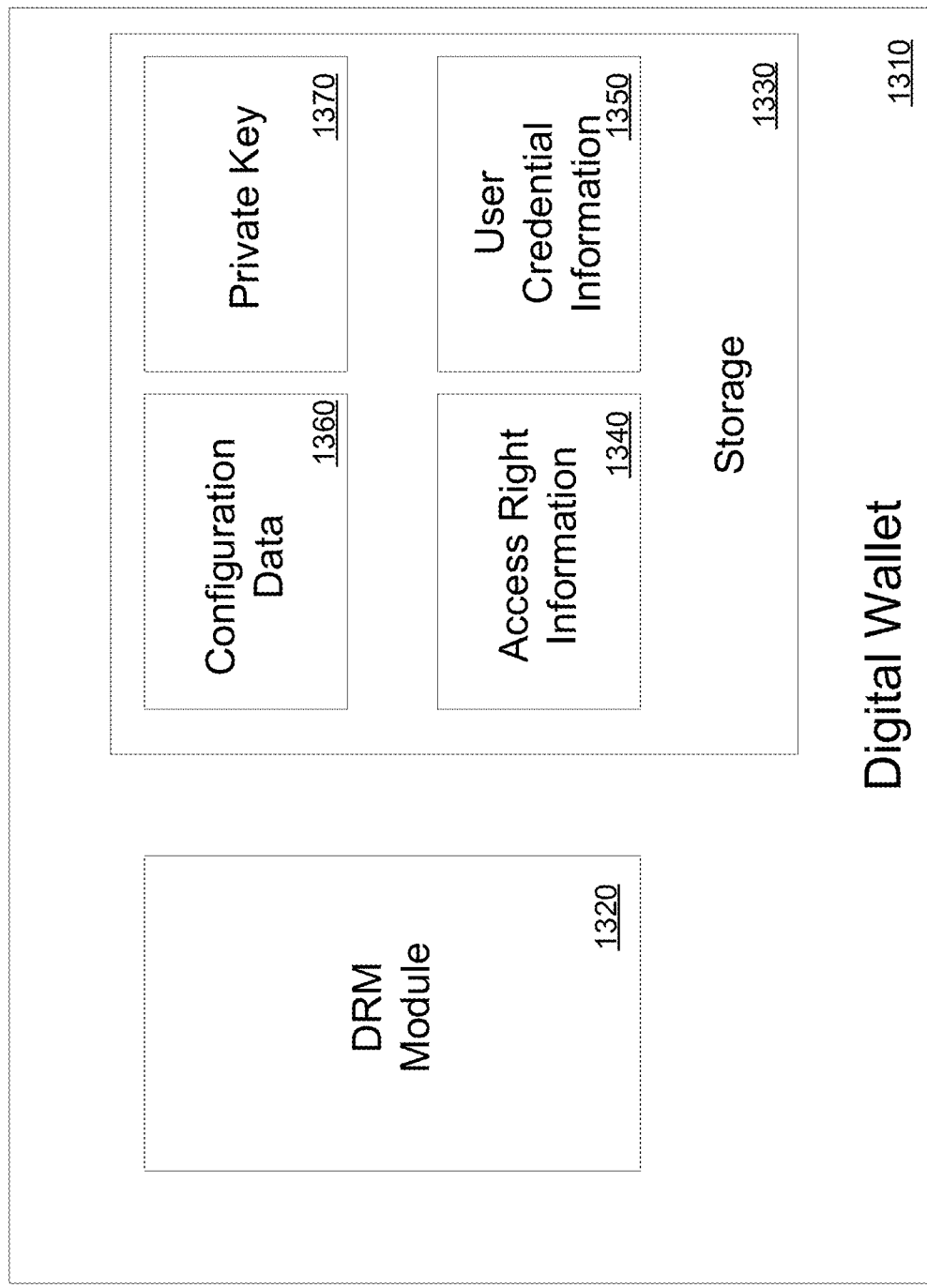
FIG. 13 depicts a media wallet application configuration in accordance with an embodiment of the invention.

An example of a media wallet 1310 capable of storing rich media NFTs in accordance with an embodiment of the invention is illustrated in FIG. 13. Media wallets 1310 may include a storage component 1330, including access right information 1340, user credential information 1350, token configuration data 1360, and/or at least one private key 1370. In accordance with many embodiments of the invention, a private key 1370 may be used to perform a plurality of actions on resources, including but not limited to decrypting NFT and/or fungible token content. Media wallets may also correspond to a public key, referred to as a wallet address. An action performed by private keys 1370 may be used to prove access rights to digital rights management modules. Additionally, private keys 1370 may be applied to initiating ownership transfers and granting NFT and/or fungible token access to alternate wallets. In accordance with some embodiments, access right information 1340 may include lists of elements that the wallet 1310 has access to. Access right information 1340 may also express the type of access provided to the wallet. Sample types of access include, but are not limited to, the right to transfer NFT and/or fungible ownership, the right to play rich media associated with a given NFT, and the right to use an NFT and/or fungible token. Different rights may be governed by different cryptographic keys. Additionally, the access right information 1340 associated with a given wallet 1310 may utilize user credential information 1350 from the party providing access.

In accordance with many embodiments of the invention, third parties initiating actions corresponding to requesting access to a given NFT may require user credential information 1350 of the party providing access to be verified. User credential information 1350 may be taken from the group including, but not limited to, a digital signature, hashed passwords, PINs, and biometric credentials. User credential information 1350 may be stored in a manner accessible only to approved devices. In accordance with some embodiments of the invention, user credential information 1350 may be encrypted using a decryption key held by trusted hardware, such as a trusted execution environment. Upon verification, user credential information 1350 may be used to authenticate wallet access.

Available access rights may be determined by digital rights management (DRM) modules 1320 of wallets 1310. In the context of rich media, encryption may be used to secure content. As such, DRM systems may refer to technologies that control the distribution and use of keys required to decrypt and access content. DRM systems in accordance with many embodiments of the invention may require a trusted execution zone. Additionally, said systems may require one or more keys (typically a certificate containing a public key/private key pair) that can be used to communicate with and register with DRM servers. DRM modules 1320 in some embodiments may also use one or more keys to communicate with a DRM server. In several embodiments, the DRM modules 1320 may include code used for performing sensitive transactions for wallets including, but not limited to, content access. In accordance with a number of embodiments of the invention, the DRM module 1320 may execute in a Trusted Execution Environment. In a number of embodiments, the DRM may be facilitated by an Operating System (OS) that enables separation of processes and processing storage from other processes and their processing storage.

Figure 14B:
FIGS. 14A-14C depicts user interfaces of various media wallet applications in accordance with a number of embodiments of the invention.
Figure 14A:
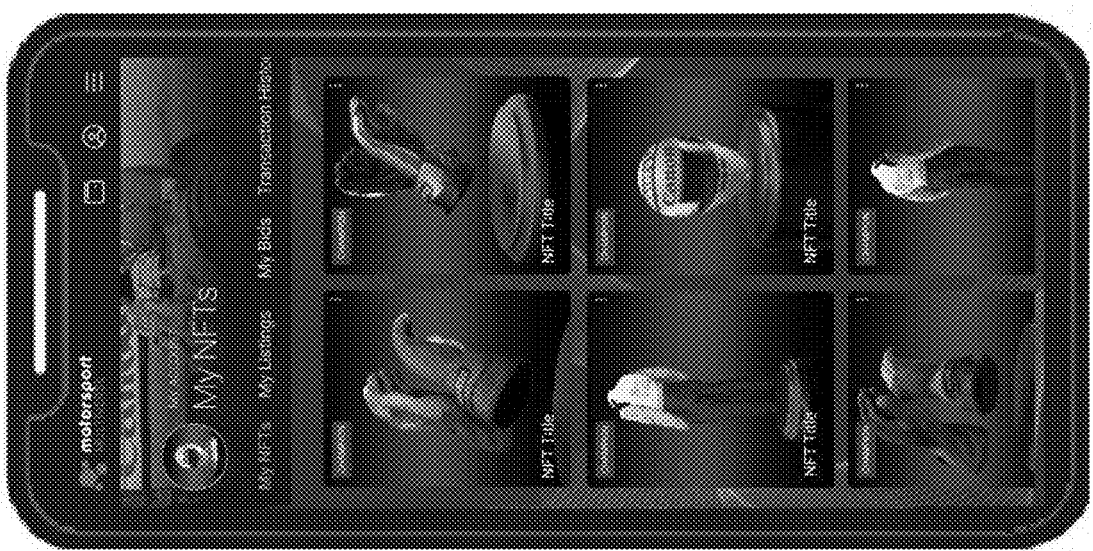
Figure 14C:

Operation of media wallet applications implemented in accordance with some embodiments of the invention is conceptually illustrated by way of the user interfaces shown in FIGS. 14A-14C. In many embodiments, media wallet applications can refer to applications that are installed upon user devices such as (but not limited to) mobile phones and tablet computers running the iOS, Android and/or similar operating systems. Launching media wallet applications can provide a number of user interface contexts. In many embodiments, transitions between these user interface contexts can be initiated in response to gestures including (but not limited to) swipe gestures received via a touch user interface. As can readily be appreciated, the specific manner in which user interfaces operate through media wallet applications is largely dependent upon the user input capabilities of the underlying user device. In several embodiments, a first user interface context is a dashboard (see, FIGS. 14A, 14C) that can include a gallery view of NFTs owned by the user. In several embodiments, the NFT listings can be organized into category index cards. Category index cards may include, but are not limited to digital merchandise/collectibles, special event access/digital tickets, fan leaderboards. In certain embodiments, a second user interface context (see, for example, FIG. 14B) may display individual NFTs. In a number of embodiments, each NFT can be main-staged in said display with its status and relevant information shown. Users can swipe through each collectible and interacting with the user interface can launch a collectible user interface enabling greater interaction with a particular collectible in a manner that can be determined based upon the smart contract underlying the NFT.

A participant of an NFT platform may use a digital wallet to classify wallet content, including NFTs, fungible tokens, content that is not expressed as tokens such as content that has not yet been minted but for which the wallet can initiate minting, and other non-token content, including executable content, webpages, configuration data, history files and logs. This classification may be performed using a visual user interface. Users interface may enable users to create a visual partition of a space. In some embodiments of the invention, a visual partition may in turn be partitioned into sub-partitions. In some embodiments, a partition of content may separate wallet content into content that is not visible to the outside world ("invisible partition"), and content that is visible at least to some extent by the outside world ("visible partition"). Some of the wallet content may require the wallet use to have an access code such as a password or a biometric credential to access, view the existence of, or perform transactions on. A visible partition may be subdivided into two or more partitions, where the first one corresponds to content that can be seen by anybody, the second partition corresponds to content that can be seen by members of a first group, and/or the third partition corresponds to content that can be seen by members of a second group.

For example, the first group may be users with which the user has created a bond, and invited to be able to see content. The second group may be users who have a membership and/or ownership that may not be controlled by the user. An example membership may be users who own non-fungible tokens (NFTs) from a particular content creator. Content elements, through icons representing the elements, may be relocated into various partitions of the space representing the user wallet. By doing so, content elements may be associated with access rights governed by rules and policies of the given partition.

One additional type of visibility may be partial visibility. Partial visibility can correspond to a capability to access metadata associated with an item, such as an NFT and/or a quantity of crypto funds, but not carry the capacity to read the content, lend it out, or transfer ownership of it. As applied to a video NFT, an observer to a partition with partial visibility may not be able to render the video being encoded in the NFT but see a still image of it and a description indicating its source.

Similarly, a party may have access to a first anonymized profile which states that the user associated with the wallet is associated with a given demographic. The party with this access may also be able to determine that a second anonymized profile including additional data is available for purchase. This second anonymized profile may be kept in a sub-partition to which only people who pay a fee have access, thereby expressing a form of membership. Alternatively, only users that have agreed to share usage logs, aspects of usage logs or parts thereof may be allowed to access a given sub-partition. By agreeing to share usage log information with the wallet comprising the sub-partition, this wallet learns of the profiles of users accessing various forms of content, allowing the wallet to customize content, including by incorporating advertisements, and to determine what content to acquire to attract users of certain demographics.

Another type of membership may be held by advertisers who have sent promotional content to the user. These advertisers may be allowed to access a partition that stores advertisement data. Such advertisement data may be encoded in the form of anonymized profiles. In a number of embodiments, a given sub-partition may be accessible only to the advertiser to whom the advertisement data pertains. Elements describing advertisement data may be automatically placed in their associated partitions, after permission has been given by the user. This partition may either be visible to the user. Visibility may also depend on a direct request to see "system partitions." A first partition may correspond to material associated with a first set of public keys, a second partition to material associated with a second set of public keys not overlapping with the first set of public keys, wherein such material may comprise tokens such as crypto coins and NFTs. A third partition may correspond to usage data associated with the wallet user, and a fourth partition may correspond to demographic data and/or preference data associated with the wallet user. Yet other partitions may correspond to classifications of content, e.g., child-friendly vs. adult; classifications of whether associated items are for sale or not, etc.

The placing of content in a given partition may be performed by a drag-and-drop action performed on a visual interface. By selecting items and clusters and performing a drag-and-drop to another partition and/or to a sub-partition, the visual interface may allow movement including, but not limited to, one item, a cluster of items, and a multiplicity of items and clusters of items. The selection of items can be performed using a lasso approach in which items and partitions are circled as they are displayed. The selection of items may also be performed by alternative methods for selecting multiple items in a visual interface, as will be appreciated by a person of skill in the art.

Some content classifications may be automated in part or full. For example, when user place ten artifacts, such as NFTs describing in-game capabilities, in a particular partition, they may be asked if additional content that are also in-game capabilities should be automatically placed in the same partition as they are acquired and associated with the wallet. When "yes" is selected, then this placement may be automated in the future. When "yes, but confirm for each NFT" is selected, then users can be asked, for each automatically classified element, to confirm its placement. Before the user confirms, the element may remain in a queue that corresponds to not being visible to the outside world. When users decline given classifications, they may be asked whether alternative classifications should be automatically performed for such elements onwards. In some embodiments, the selection of alternative classifications may be based on manual user classification taking place subsequent to the refusal.

Automatic classification of elements may be used to perform associations with partitions and/or folders. The automatic classification may be based on machine learning (ML) techniques considering characteristics including, but not limited to, usage behaviors exhibited by the user relative to the content to be classified, labels associated with the content, usage statistics; and/or manual user classifications of related content.

Multiple views of wallets may also be accessible. One such view can correspond to the classifications described above, which indicates the actions and interactions others can perform relative to elements. Another view may correspond to a classification of content based on use, type, and/or users-specified criterion. For example, all game NFTs may be displayed in one collection view. The collection view may further subdivide the game NFTs into associations with different games or collections of games. Another collection may show all audio content, clustered based on genre. users-specified classification may be whether the content is for purposes of personal use, investment, or both. A content element may show up in multiple views. users can search the contents of his or her wallet by using search terms that result in potential matches.

Alternatively, the collection of content can be navigated based the described views of particular wallets, allowing access to content. Once a content element has been located, the content may be interacted with. For example, located content elements may be rendered. One view may be switched to another after a specific item is found. For example, this may occur through locating an item based on its genre and after the item is found, switching to the partitioned view described above. In some embodiments, wallet content may be rendered using two or more views in a simultaneous manner. They may also select items using one view.

Media wallet applications in accordance with various embodiments of the invention are not limited to use within NFT platforms. Accordingly, it should be appreciated that applications described herein can also be implemented outside the context of an NFT platform network architecture unrelated to the storage of fungible tokens and/or NFTs. Moreover, any of the computer systems described herein with reference to FIGS. 10-14C can be utilized within any of the NFT platforms described above.

NFT Platform NFT Interactions

NFT platforms in accordance with many embodiments of the invention may incorporate a wide variety of rich media NFT configurations. The term "Rich Media Non-Fungible Tokens" can be used to refer to blockchain-based cryptographic tokens created with respect to a specific piece of rich media content and which incorporate programmatically defined digital rights management. In some embodiments of the invention, each NFT may have a unique serial number and be associated with a smart contract defining an interface that enables the NFT to be managed, owned and/or traded.

Under a rich media blockchain in accordance with many embodiments of the invention, a wide variety of NFT configurations may be implemented. Some NFTs may be referred to as anchored NFTs (or anchored tokens), used to tie some element, such as a physical entity, to an identifier. Of this classification, one sub-category may be used to tie users' real-world identities and/or identifiers to a system identifier, such as a public key. In this disclosure, this type of NFT applied to identifying users, may be called a social NFT, identity NFT, identity token, and a social token. In accordance with many embodiments of the invention, an individual's personally identifiable characteristics may be contained, maintained, and managed throughout their lifetime so as to connect new information and/or NFTs to the individual's identity. A social NFT's information may include, but are not limited to, personally identifiable characteristics such as name, place and date of birth, and/or biometrics.

An example social NFT may assign a DNA print to a newborn's identity. In accordance with a number of embodiments of the invention, this first social NFT might then be used in the assignment process of a social security number NFT from the federal government. In some embodiments, the first social NFT may then be associated with some rights and capabilities, which may be expressed in other NFTs. Additional rights and capabilities may also be directly encoded in a policy of the social security number NFT.

Figure 15:
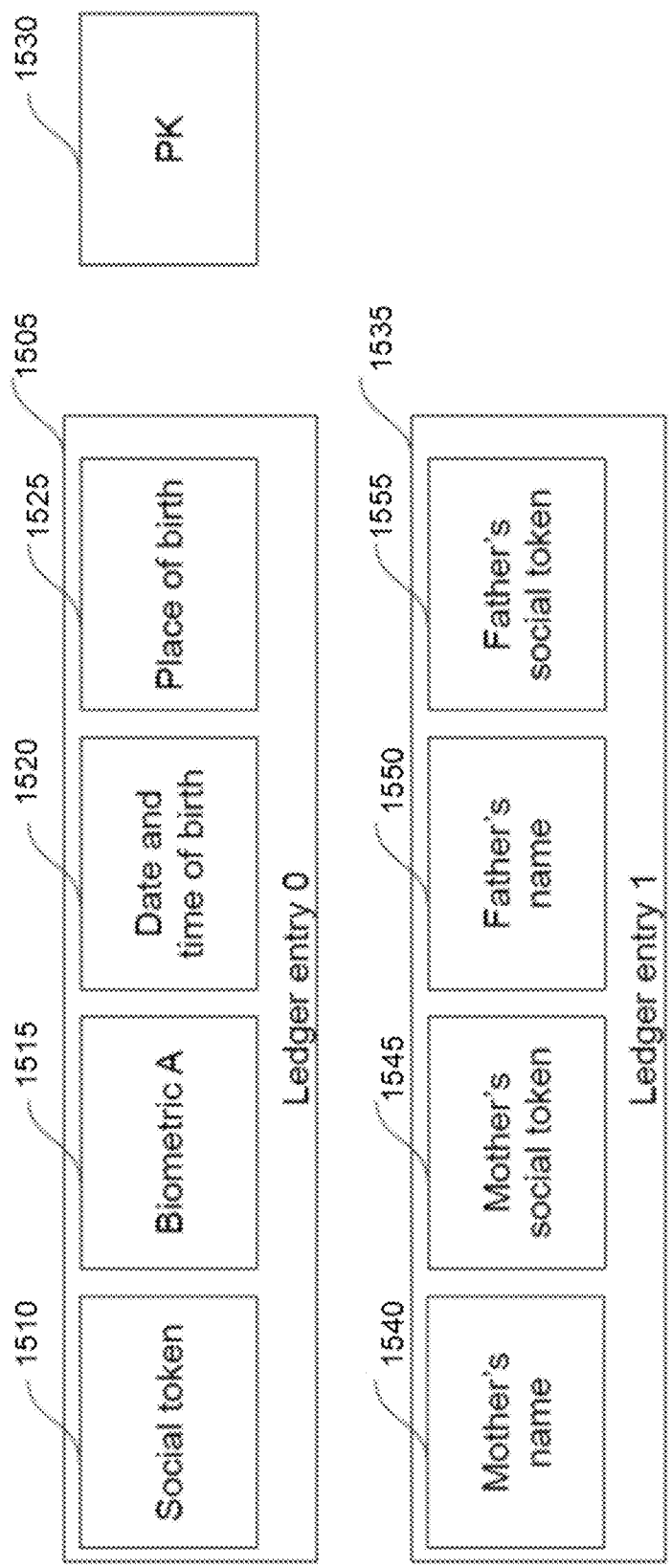
FIG. 15 illustrates an NFT ledger entry corresponding to an NFT identifier.

A social NFT may exist on a personalized branch of a centralized and/or decentralized blockchain. Ledger entries related to an individual's social NFT in accordance with several embodiments of the invention are depicted in FIG. 15. Ledger entries of this type may be used to build an immutable identity foundation whereby biometrics, birth and parental information are associated with an NFT. As such, this information may also be protected with encryption using a private key 1530. The initial entry in a ledger, "ledger entry 0" 1505, may represent a social token 1510 assignment to an individual with a biometric "A" 1515. In this embodiment, the biometric may include but is not limited to a footprint, a DNA print, and a fingerprint. The greater record may also include the individual's date and time of birth 1520 and place of birth 1525. A subsequent ledger entry 1 1535 may append parental information including but not limited to mothers' name 1540, mother's social token 1545, father's name 1550, and father's social token 1555.

In a number of embodiments, the various components that make up a social NFT may vary from situation to situation. In a number of embodiments, biometrics and/or parental information may be unavailable in a given situation and/or period of time. Other information including, but not limited to, race, gender, and governmental number assignments such as social security numbers, may be desirable to include in the ledger. In a blockchain, future NFT creation may create a life-long ledger record of an individual's public and private activities. In accordance with some embodiments, the record may be associated with information including, but not limited to, identity, purchases, health and medical records, access NFTs, family records such as future offspring, marriages, familial history, photographs, videos, tax filings, and/or patent filings. The management and/or maintenance of an individual's biometrics throughout the individual's life may be immutably connected to the first social NFT given the use of a decentralized blockchain ledger.

In some embodiments, a certifying third party may generate an NFT associated with certain rights upon the occurrence of a specific event. In one such embodiment, the DMV may be the certifying party and generate an NFT associated with the right to drive a car upon issuing a traditional driver's license. In another embodiment, the certifying third party may be a bank that verifies a person's identity papers and generates an NFT in response to a successful verification. In a third embodiment, the certifying party may be a car manufacturer, who generates an NFT and associates it with the purchase and/or lease of a car.

In many embodiments, a rule may specify what types of policies the certifying party may associate with the NFT. Additionally, a non-certified entity may also generate an NFT and assert its validity. This may require putting up some form of security. In one example, security may come in the form of a conditional payment associated with the NFT generated by the non-certified entity. In this case, the conditional payment may be exchangeable for funds if abuse can be detected by a bounty hunter and/or some alternate entity. Non-certified entities may also relate to a publicly accessible reputation record describing the non-certified entity's reputability.

Anchored NFTs may additionally be applied to automatic enforcement of programming rules in resource transfers. NFTs of this type may be referred to as promise NFTs. A promise NFT may include an agreement expressed in a machine-readable form and/or in a human-accessible form. In a number of embodiments, the machine-readable and human-readable elements can be generated one from the other. In some embodiments, an agreement in a machine-readable form may include, but is not limited to, a policy and/or an executable script. In some embodiments, an agreement in a human-readable form may include, but is not limited to, a text and/or voice-based statement of the promise.

In some embodiments, regardless of whether the machine-readable and human-readable elements are generated from each other, one can be verified based on the other. Smart contracts including both machine-readable statements and human-accessible statements may also be used outside the implementation of promise NFTs. Moreover, promise NFTs may be used outside actions taken by individual NFTs and/or NFT-owners. In some embodiments, promise NFTs may relate to general conditions, and may be used as part of a marketplace.

In one such example, horse betting may be performed through generating a first promise NFT that offers a payment of $10 if a horse does not win. Payment may occur under the condition that the first promise NFT is matched with a second promise NFT that causes a transfer of funds to a public key specified with the first promise NFT if horse X wins.

A promise NFT may be associated with actions that cause the execution of a policy and/or rule indicated by the promise NFT. In some embodiments of the invention, a promise of paying a charity may be associated with the sharing of an NFT. In this embodiment, the associated promise NFT may identify a situation that satisfies the rule associated with the promise NFT, thereby causing the transfer of funds when the condition is satisfied (as described above). One method of implementation may be embedding in and/or associating a conditional payment with the promise NFT. A conditional payment NFT may induce a contract causing the transfer of funds by performing a match. In some such methods, the match may be between the promise NFT and inputs that identify that the conditions are satisfied, where said input can take the form of another NFT. In a number of embodiments, one or more NFTs may also relate to investment opportunities.

For example, a first NFT may represent a deed to a first building, and a second NFT a deed to a second building. Moreover, the deed represented by the first NFT may indicate that a first party owns the first property. The deed represented by the second NFT may indicate that a second party owns the second property. A third NFT may represent one or more valuations of the first building. The third NFT may in turn be associated with a fourth NFT that may represent credentials of a party performing such a valuation. A fifth NFT may represent one or more valuations of the second building. A sixth may represent the credentials of one of the parties performing a valuation. The fourth and sixth NFTs may be associated with one or more insurance policies, asserting that if the parties performing the valuation are mistaken beyond a specified error tolerance, then the insurer would pay up to a specified amount.

A seventh NFT may then represent a contract that relates to the planned acquisition of the second building by the first party, from the second party, at a specified price. The seventh NFT may make the contract conditional provided a sufficient investment and/or verification by a third party. A third party may evaluate the contract of the seventh NFT, and determine whether the terms are reasonable. After the evaluation, the third party may then verify the other NFTs to ensure that the terms stated in the contract of the seventh NFT agree. If the third party determines that the contract exceeds a threshold in terms of value to risk, as assessed in the seventh NFT, then executable elements of the seventh NFT may cause transfers of funds to an escrow party specified in the contract of the sixth NFT.

Alternatively, the first party may initiate the commitment of funds, conditional on the remaining funds being raised within a specified time interval. The commitment of funds may occur through posting the commitment to a ledger. Committing funds may produce smart contracts that are conditional on other events, namely the payments needed to complete the real estate transaction. The smart contract also may have one or more additional conditions associated with it. For example, an additional condition may be the reversal of the payment if, after a specified amount of time, the other funds have not been raised. Another condition may be related to the satisfactory completion of an inspection and/or additional valuation.

NFTs may also be used to assert ownership of virtual property. Virtual property in this instance may include, but is not limited to, rights associated with an NFT, rights associated with patents, and rights associated with pending patents. In a number of embodiments, the entities involved in property ownership may be engaged in fractional ownership. In some such embodiments, two parties may wish to purchase an expensive work of digital artwork represented by an NFT. The parties can enter into smart contracts to fund and purchase valuable works. After a purchase, an additional NFT may represent each party's contribution to the purchase and equivalent fractional share of ownership.

Another type of NFTs that may relate to anchored NFTs may be called "relative NFTs." This may refer to NFTs that relate two or more NFTs to each other. Relative NFTs associated with social NFTs may include digital signatures that is verified using a public key of a specific social NFT. In some embodiments, an example of a relative NFT may be an assertion of presence in a specific location, by a person corresponding to the social NFT. This type of relative NFT may also be referred to as a location NFT and a presence NFT. Conversely, a signature verified using a public key embedded in a location NFT may be used as proof that an entity sensed by the location NFT is present. Relative NFTs are derived from other NFTs, namely those they relate to, and therefore may also be referred to as derived NFTs. An anchored NFT may tie to another NFT, which may make it both anchored and relative. An example of such may be called pseudonym NFTs.

Pseudonym NFTs may be a kind of relative NFT acting as a pseudonym identifier associated with a given social NFT. In some embodiments, pseudonym NFTs may, after a limited time and/or a limited number of transactions, be replaced by a newly derived NFTs expressing new pseudonym identifiers. This may disassociate users from a series of recorded events, each one of which may be associated with different pseudonym identifiers. A pseudonym NFT may include an identifier that is accessible to biometric verification NFTs. Biometric verification NFTs may be associated with a TEE and/or DRM which is associated with one or more biometric sensors. Pseudonym NFTs may be output by social NFTs and/or pseudonym NFTs.

Inheritance NFTs may be another form of relative NFTs, that transfers rights associated with a first NFT to a second NFT. For example, computers, represented by an anchored NFT that is related to a physical entity (the hardware), may have access rights to WiFi networks. When computers are replaced with newer models, users may want to maintain all old relationships, for the new computer. For example, users may want to retain WiFi hotspots. For this to be facilitated, a new computer can be represented by an inheritance NFT, inheriting rights from the anchored NFT related to the old computer. An inheritance NFT may acquire some or all pre-existing rights associated with the NFT of the old computer, and associate those with the NFT associated with the new computer.

More generally, multiple inheritance NFTs can be used to selectively transfer rights associated with one NFT to one or more NFTs, where such NFTs may correspond to users, devices, and/or other entities, when such assignments of rights are applicable. Inheritance NFTs can also be used to transfer property. One way to implement the transfer of property can be to create digital signatures using private keys. These private keys may be associated with NFTs associated with the rights. In accordance with a number of embodiments, transfer information may include the assignment of included rights, under what conditions the transfer may happen, and to what NFT(s) the transfer may happen. In this transfer, the assigned NFTs may be represented by identifies unique to these, such as public keys. The digital signature and message may then be in the form of an inheritance NFT, or part of an inheritance NFT. As rights are assigned, they may be transferred away from previous owners to new owners through respective NFTs. Access to financial resources is one such example.

However, sometimes rights may be assigned to new parties without taking the same rights away from the party (i.e., NFT) from which the rights come. One example of this may be the right to listen to a song, when a license to the song is sold by the artist to consumers. However, if the seller sells exclusive rights, this causes the seller not to have the rights anymore.

In accordance with many embodiments of the invention, multiple alternative NFT configurations may be implemented. One classification of NFT may be an employee NFT or employee token. Employee NFTs may be used by entities including, but not limited to, business employees, students, and organization members. Employee NFTs may operate in a manner analogous to key card photo identifications. In a number of embodiments, employee NFTs may reference information including, but not limited to, company information, employee identity information and/or individual identity NFTs.

Additionally, employee NFTs may include associated access NFT information including but not limited to, what portions of a building employees may access, and what computer system employees may utilize. In several embodiments, employee NFTs may incorporate their owner's biometrics, such as a face image. In a number of embodiments, employee NFTs may operate as a form of promise NFT. In some embodiments, employee NFT may comprise policies or rules of employing organization. In a number of embodiments, the employee NFT may reference a collection of other NFTs.

Another type of NFT may be referred to as the promotional NFT or promotional token. Promotional NFTs may be used to provide verification that promoters provide promotion winners with promised goods. In some embodiments, promotional NFTs may operate through decentralized applications for which access restricted to those using an identity NFT. The use of a smart contract with a promotional NFT may be used to allow for a verifiable release of winnings. These winnings may include, but are not limited to, cryptocurrency, money, and gift card NFTs useful to purchase specified goods. Smart contracts used alongside promotional NFTs may be constructed for winners selected through random number generation.

Another type of NFT may be called the script NFT or script token. Script tokens may incorporate script elements including, but not limited to, story scripts, plotlines, scene details, image elements, avatar models, sound profiles, and voice data for avatars. Script tokens may also utilize rules and policies that describe how script elements are combined. Script tokens may also include rights holder information, including but not limited to, licensing and copyright information. Executable elements of script tokens may include instructions for how to process inputs; how to configure other elements associated with the script tokens; and how to process information from other tokens used in combination with script tokens.

Script tokens may be applied to generate presentations of information. In accordance with some embodiments, these presentations may be developed on devices including but not limited to traditional computers, mobile computers, and virtual reality display devices. Script tokens may be used to provide the content for game avatars, digital assistant avatars, and/or instructor avatars. Script tokens may comprise audio-visual information describing how input text is presented, along with the input text that provides the material to be presented. It may also comprise what may be thought of as the personality of the avatar, including how the avatar may react to various types of input from an associated user.

In some embodiments, script NFTs may be applied to govern behavior within an organization. For example, this may be done through digital signatures asserting the provenance of the scripts. Script NFTs may also, in full and/or in part, be generated by freelancers. For example, a text script related to a movie, an interactive experience, a tutorial, and/or other material, may be created by an individual content creator. This information may then be combined with a voice model or avatar model created by an established content producer. The information may then be combined with a background created by additional parties. Various content producers can generate parts of the content, allowing for large-scale content collaboration.

Features of other NFTs can be incorporated in a new NFT using techniques related to inheritance NFTs, and/or by making references to other NFTs. As script NFTs may consist of multiple elements, creators with special skills related to one particular element may generate and combine elements. This may be used to democratize not only the writing of storylines for content, but also outsourcing for content production. For each such element, an identifier establishing the origin or provenance of the element may be included. Policy elements can also be incorporated that identify the conditions under which a given script element may be used. Conditions may be related to, but are not limited to execution environments, trusts, licenses, logging, financial terms for use, and various requirements for the script NFTs. Requirements may concern, but are not limited to, what other types of elements the given element are compatible with, what is allowed to be combined with according the terms of service, and/or local copyright laws that must be obeyed.

Evaluation units may be used with various NFT classifications to collect information on their use. Evaluation units may take a graph representing subsets of existing NFTs and make inferences from the observed graph component. From this, valuable insights into NFT value may be derived. For example, evaluation units may be used to identify NFTs whose popularity is increasing or waning. In that context, popularity may be expressed as, but not limited to, the number of derivations of the NFT that are made; the number of renderings, executions or other uses are made; and the total revenue that is generated to one or more parties based on renderings, executions or other uses.

Evaluation units may make their determination through specific windows of time and/or specific collections of end-users associated with the consumption of NFT data in the NFTs. Evaluation units may limit assessments to specific NFTs (e.g. script NFTs). This may be applied to identify NFTs that are likely to be of interest to various users. In addition, the system may use rule-based approaches to identify NFTs of importance, wherein importance may be ascribed to, but is not limited to, the origination of the NFTs, the use of the NFTs, the velocity of content creation of identified clusters or classes, the actions taken by consumers of NFT, including reuse of NFTs, the lack of reuse of NFTs, and the increased or decreased use of NFTs in selected social networks.

Evaluations may be repurposed through recommendation mechanisms for individual content consumers and/or as content originators. Another example may address the identification of potential combination opportunities, by allowing ranking based on compatibility. Accordingly, content creators such as artists, musicians and programmers can identify how to make their content more desirable to intended target groups.

The generation of evaluations can be supported by methods including, but not limited to machine learning (ML) methods, artificial intelligence (AI) methods, and/or statistical methods. Anomaly detection methods developed to identify fraud can be repurposed to identify outliers. This can be done to flag abuse risks or to improve the evaluation effort.

Multiple competing evaluation units can make competing predictions using alternative and proprietary algorithms. Thus, different evaluation units may be created to identify different types of events to different types of subscribers, monetizing their insights related to the data they access.

In a number of embodiments, evaluation units may be a form of NFTs that derive insights from massive amounts of input data. Input data may correspond, but is not limited to the graph component being analyzed. Such NFTs may be referred to as evaluation unit NFTs.

The minting of NFTs may associate rights with first owners and/or with an optional one or more policies and protection modes. An example policy and/or protection mode directed to financial information may express royalty requirements. An example policy and/or protection mode directed to non-financial requirements may express restrictions on access and/or reproduction. An example policy directed to data collection may express listings of user information that may be collected and disseminated to other participants of the NFT platform.

Figure 16A:
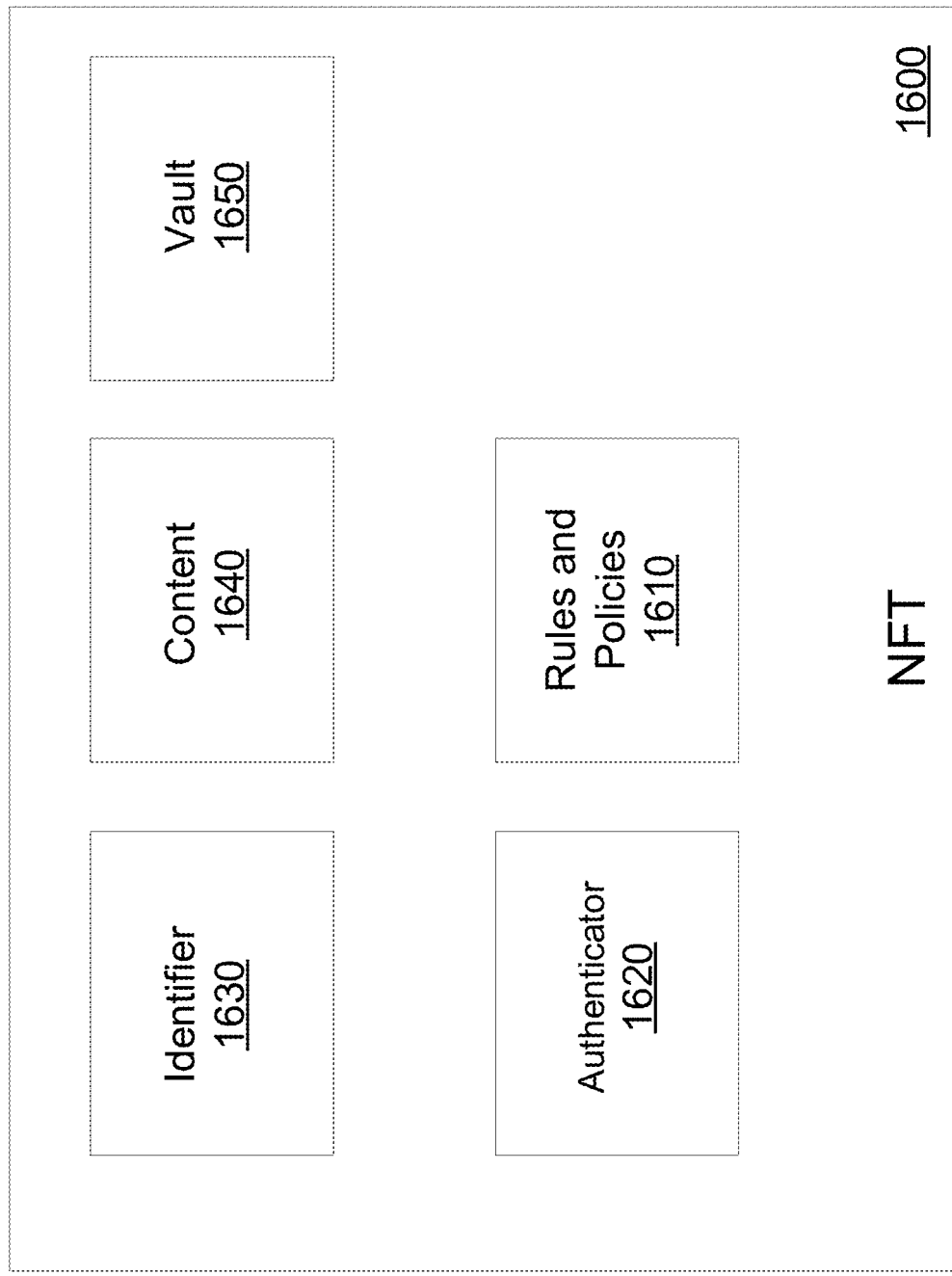
FIGS. 16A-16B illustrate an NFT arrangement relationship with corresponding physical content in accordance with an embodiment of the invention.

An example NFT which may be associated with specific content in accordance with several embodiments of the invention is illustrated in FIG. 16A. In some embodiments, an NFT 1600 may utilize a vault 1650, which may control access to external data storage areas. Methods of controlling access may include, but are not limited to, user credential information 1350. In accordance with a number of embodiments of the invention, control access may be managed through encrypting content 1640. As such, NFTs 1600 can incorporate content 1640, which may be encrypted, not encrypted, yet otherwise accessible, or encrypted in part. In accordance with some embodiments, an NFT 1600 may be associated with one or more content 1640 elements, which may be contained in or referenced by the NFT. A content 1640 element may include, but is not limited to, an image, an audio file, a script, a biometric user identifier, and/or data derived from an alternative source. An example alternative source may be a hash of biometric information). An NFT 1600 may also include an authenticator 1620 capable of affirming that specific NFTs are valid.

In accordance with many embodiments of the invention, NFTs may include a number of rules and policies 1610. Rules and policies 1610 may include, but are not limited to access rights information 1340. In some embodiments, rules and policies 1610 may also state terms of usage, royalty requirements, and/or transfer restrictions. An NFT 1600 may also include an identifier 1630 to affirm ownership status. In accordance with many embodiments of the invention, ownership status may be expressed by linking the identifier 1630 to an address associated with a blockchain entry.

In accordance with a number of embodiments of the invention, NFTs may represent static creative content. NFTs may also be representative of dynamic creative content, which changes over time. In accordance with many examples of the invention, the content associated with an NFT may be a digital content element.

One example of a digital content element in accordance with some embodiments may be a set of five images of a mouse. In this example, the first image may be an image of the mouse being alive. The second may be an image of the mouse eating poison. The third may be an image of the mouse not feeling well. The fourth image may be of the mouse, dead. The fifth image may be of a decaying mouse.

The user credential information 1350 of an NFT may associate each image to an identity, such as of the artist. In accordance with a number of embodiments of the invention, NFT digital content can correspond to transitions from one representation (e.g., an image of the mouse, being alive) to another representation (e.g., of the mouse eating poison). In this disclosure, digital content transitioning from one representation to another may be referred to as a state change and/or an evolution. In a number of embodiments, an evolution may be triggered by the artist, by an event associated with the owner of the artwork, randomly, and/or by an external event.

When NFTs representing digital content are acquired in accordance with some embodiments of the invention, they may also be associated with the transfer of corresponding physical artwork, and/or the rights to said artwork. The first ownership records for NFTs may correspond to when the NFT was minted, at which time its ownership can be assigned to the content creator. Additionally, in the case of "lazy" minting, rights may be directly assigned to a buyer.

In some embodiments, as a piece of digital content evolves, it may also change its representation. The change in NFTs may also send a signal to an owner after it has evolved. In doing so, a signal may indicate that the owner has the right to acquire the physical content corresponding to the new state of the digital content. Under an earlier example, buying a live mouse artwork, as an NFT, may also carry the corresponding painting, and/or the rights to it. A physical embodiment of an artwork that corresponds to that same NFT may also be able to replace the physical artwork when the digital content of the NFT evolves. For example, should the live mouse artwork NFT change states to a decaying mouse, an exchange may be performed of the corresponding painting for a painting of a decaying mouse.

The validity of one of the elements, such as the physical element, can be governed by conditions related to an item with which it is associated. For example, a physical painting may have a digital authenticity value that attests to the identity of the content creator associated with the physical painting.

Figure 16B:
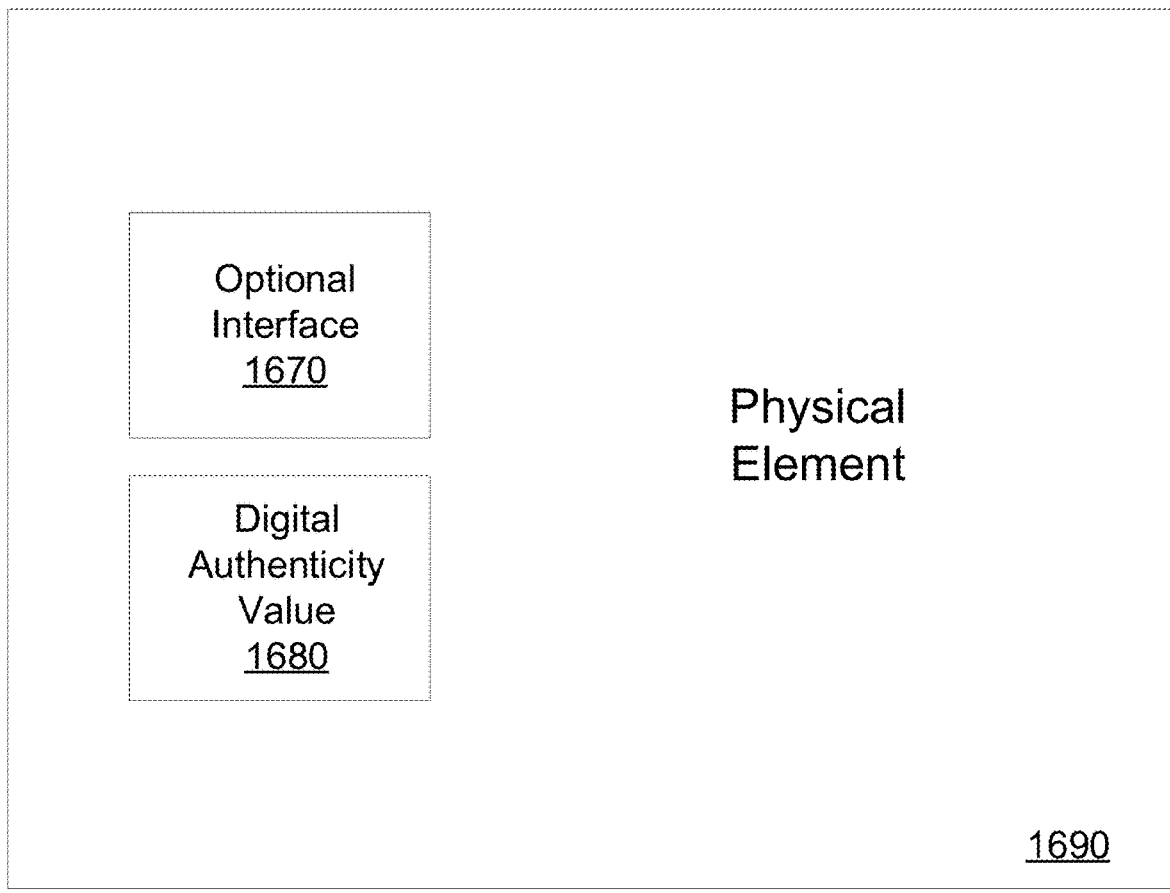

An example of a physical element 1690 corresponding to an NFT, in accordance with some embodiments of the invention is illustrated in FIG. 16B. A physical element 1690 may be a physical artwork including, but not limited to, a drawing, a statue, and/or another physical representation of art. In a number of embodiments, physical representations of the content (which may correspond to a series of paintings) may each be embedded with a digital authenticity value (or a validator value). In accordance with many embodiments of the invention, a digital authenticity value (DAV) 1680 may be therefore be associated with a physical element 1690 and a digital element. A digital authenticity value may be a value that includes an identifier and a digital signature on the identifier. In some embodiments the identifier may specify information related to the creation of the content. This information may include the name of the artist, the identifier 1630 of the digital element corresponding to the physical content, a serial number, information such as when it was created, and/or a reference to a database in which sales data for the content is maintained. A digital signature element affirming the physical element may be made by the content creator and/or by an authority associating the content with the content creator.

In some embodiments, the digital authenticity value 1680 of the physical element 1690 can be expressed using a visible representation. The visible representation may be an optional physical interface 1670 taken from a group including, but not limited to, a barcode and a quick response (QR) code encoding the digital authenticity value. In some embodiments, the encoded value may also be represented in an authenticity database. Moreover, the physical interface 1670 may be physically associated with the physical element. One example of such may be a QR tag being glued to or printed on the back of a canvas. In some embodiments of the invention, the physical interface 1670 may be possible to physically disassociate from the physical item it is attached to. However, if a DAV 1680 is used to express authenticity of two or more physical items, the authenticity database may detect and block a new entry during the registration of the second of the two physical items. For example, if a very believable forgery is made of a painting the forged painting may not be considered authentic without the QR code associated with the digital element.

In a number of embodiments, the verification of the validity of a physical item, such as a piece of artwork, may be determined by scanning the DAV. In some embodiments, scanning the DAV may be used to determine whether ownership has already been assigned. Using techniques like this, each physical item can be associated with a control that prevents forgeries to be registered as legitimate, and therefore, makes them not valid. In the context of a content creator receiving a physical element from an owner, the content creator can deregister the physical element 1690 by causing its representation to be erased from the authenticity database used to track ownership. Alternatively, in the case of an immutable blockchain record, the ownership blockchain may be appended with new information. Additionally, in instances where the owner returns a physical element, such as a painting, to a content creator in order for the content creator to replace it with an "evolved" version, the owner may be required to transfer the ownership of the initial physical element to the content creator, and/or place the physical element in a stage of being evolved.

Figure 17:
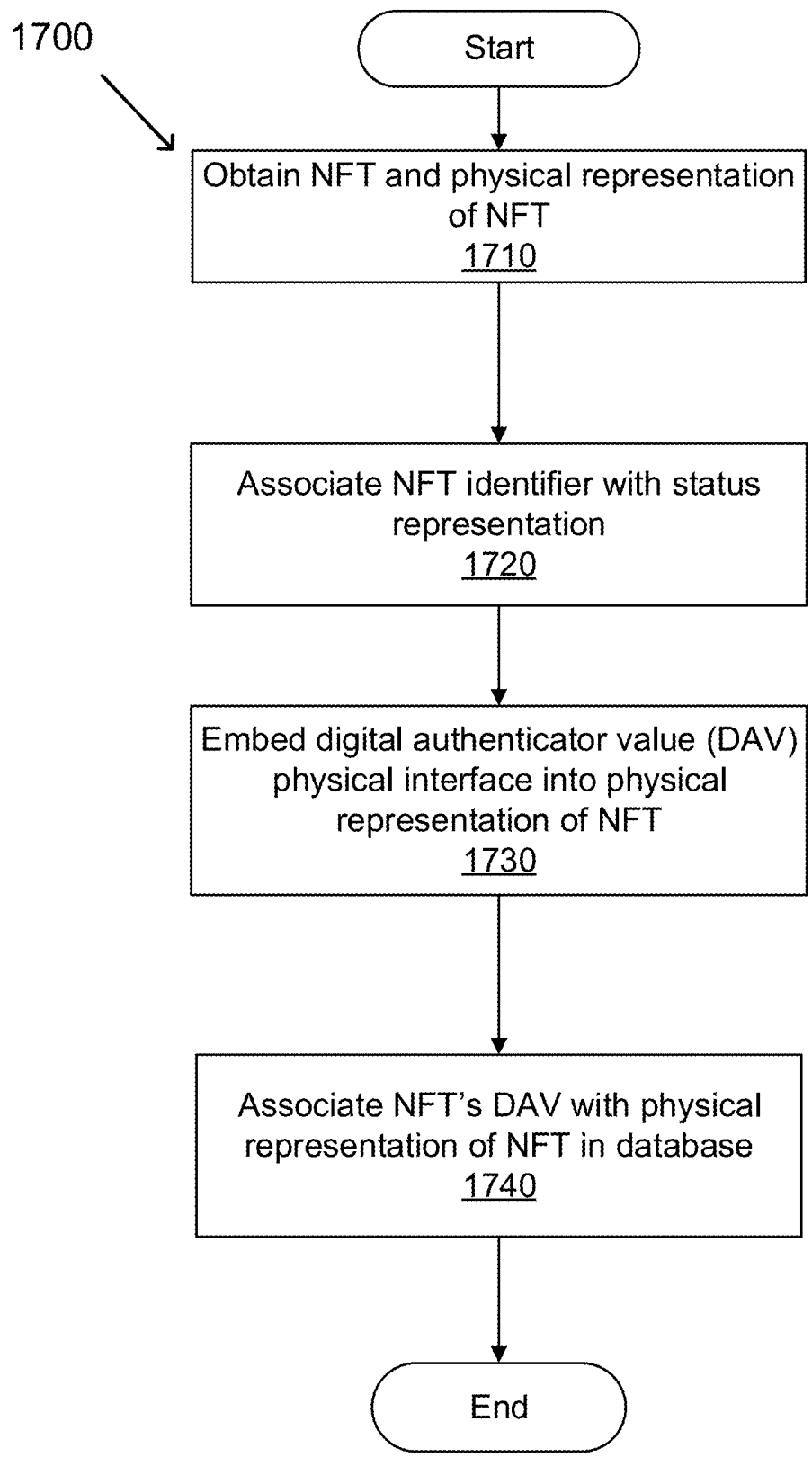
FIG. 17 illustrates a process for establishing a relationship between an NFT and corresponding physical content.

An example of a process for connecting an NFT digital element to physical content in accordance with some embodiments of the invention is illustrated in FIG. 17. Process 1700 may obtain (1710) an NFT and a physical representation of the NFT in connection with an NFT transaction. Under the earlier example, this may be a painting of a living mouse and an NFT of a living mouse. By virtue of establishing ownership of the NFT, the process 1700 may associate (1720) an NFT identifier with a status representation of the NFT. The NFT identifier may specify attributes including, but not limited to, the creator of the mouse painting and NFT ("Artist"), the blockchain the NFT is on ("NFT-Chain"), and an identifying value for the digital element ("no. 0001"). Meanwhile, the status representation may clarify the present state of the NFT ("alive mouse"). Process 1700 may also embed (1730) a DAV physical interface into the physical representation of the NFT. In a number of embodiments of the invention, this may be done by implanting a QR code into the back of the mouse painting. In affirming the connection between the NFT and painting, Process 1700 can associate (1740) the NFT's DAV with the physical representation of the NFT in a database. In some embodiments, the association can be performed through making note of the transaction and clarifying that it encapsulates both the mouse painting and the mouse NFT.

While specific processes are described above with reference to FIGS. 15-17, NFTs can be implemented in any of a number of different ways to enable as appropriate to the requirements of specific applications in accordance with various embodiments of the invention. Additionally, the specific manner in which NFTs can be utilized within NFT platforms in accordance with various embodiments of the invention is largely dependent upon the requirements of a given application.

Blockchain-Directed Functionality on NFT Platforms

NFT platforms in accordance with many embodiments of the invention may implement systems directed to various blockchain-based capabilities. Blockchain-enabling functionality can be applied, but are not limited, to facilitating transactions, fortifying consensus mechanisms, and protecting against fraudulent activity.

A. Content Tagging on NFT Platforms

Systems and techniques in accordance with some embodiments of the invention may enable functionality including but not limited to the generation and/or maintenance of content and user descriptors. Systems may apply the functionality to purposes including but not limited to improving user security, user privacy, user experience, and/or network utilization; and reducing costs and latencies in operation. System components may include but are not limited to: tags, profiles, processing functionality, profiles, and data-based system determinations.

a. Tags

Systems in accordance with a number of embodiments of the invention may be directed to token-related tags used to identify and/or classify the content associated with the underlying tokens. Such tokens may include but are not limited to NFTs. In accordance with many embodiments, tags can be included with tokens, be stored separately from tokens, and/or contain references to tokens. Tags may, additionally or alternatively, take various forms including but not limited to token metadata; aspects of smart contracts; and/or records related to the tokens. Example tag subjects may include but are not limited to: content file format type (e.g., JPEG, MPEG, access right data); rating (e.g., X-rated, PG-13, classified, top-secret); commercial type (e.g., advertisements, movies with product placements, educational material); genre (e.g., horror, comedy, news); expiration date (for example, tokens associated with a weather forecast may expire when the time period of the prediction has passed); monetary descriptors (e.g., cash equivalents, collectible material, metered access, free access); content creator identifiers (e.g., identity, group membership, organizations); and location information (e.g., where the data may be stored, the jurisdictions which allow and/or disallow the consumption of the content).

Additionally or alternatively, tags may describe user preferences related to content. Preferences may include but are not limited to quality scores provided by consumers. In such cases, "consumers" may refer to humans and/or computational entities capable of generating assessments of compatibility between content and the underlying need of the consumer (and/or related parties).

In accordance with numerous embodiments of the invention, tags may be generated by content creators who create and/or select the content associated with the tokens. Content creators may end up intentionally or unintentionally using incorrect tags. In accordance with many embodiments of the invention, systems may address issues of correctness by appointing content creators reputation scores, reflective of the reliability of their tags. Reputation scores associated with specific content creators may be stored in databases and/or servers.

In accordance with some embodiments, reputation score may be related to, but are not limited to the number of tags generated by the content creator; the degree to which these tags have been found to be correct; and/or to the extent to which some tags have been found to be incorrect. Incorrect tags may have various classifications that identify the specific tag as a mistake, harmless, intentional, malicious, dangerous, etc.

In accordance with many embodiments, tags may be generated by various entities. For example, tags may be generated by entities in charge of minting the corresponding tokens. In such cases, the entities may use automated content inspection methods to assess the tags, content, and/or tokens. Tags may, additionally or alternatively, be generated by third parties, including but not limited to parties with established trust within specific systems. For instance, a particular third party may be a product (e.g., movie) ranking company that identifies the preferences of groups of users and ranks and/or rates the perceived quality of the products along one or more axes.

Additionally or alternatively, example entities that generate tags may assess the tags generated by other entities. In doing so, the entities may create aggregate tags that can incorporate multiple assessments (which themselves may be represented by tags) of various other entities and/or weights based on the assessed reputations of these various other entities. In such cases, highly trustworthy entities with significant track records can be assigned higher weights than entities with no track record and/or indications of having been abusive. The weights can be used to modify the influence of the tags of the entities generating the aggregate values.

Different aggregate values and/or assessments may correspond to different weights. For example, when aggregate values indicate that an entity has a flawless record as far as determining the commercial type of content, but a poor track record when determining user preferences indicative of whether a given group of users will appreciate the associated content.

b. Profiles

In accordance with several embodiments, profiles may be used to describe individual users, collections of users, and/or collections of computational entities (which may themselves represent users). Profiles may include but are not limited to personal information including but not limited to access records for given content items, location histories associated with users, selections by and identified preferences of users, demographic information of users, etc. In accordance with many embodiments, profiles may be associated with multiple users and/or multiple personae. Personae may differ from "users" such that individual users may correspond to two or more personae, where these two or more personae are associated with very different content preferences and needs; for example, one person may have separate personae for themselves at home and work. Users may, additionally or alternatively, represent groups of individuals including but not limited to families, fraternities, enterprises, buyers' clubs, Decentralized Autonomous Organizations (DAOs), etc.

In accordance with certain embodiments, individual first) profiles may be used for the generation of individual second profiles. Such functionality may be used in cases where the first profiles include personal information that may be sensitive, and the second profiles take the form of aggregate descriptions of the first profiles. Aggregate descriptions, in accordance with numerous embodiments of the invention, may be configured to exclude some or all personal and/or sensitive information according to configuration settings set by users and/or default settings.

Profiles may correspond to computational entities, including but not limited to wallets, trading accounts, service providers, content creators, and/or entities having generated one or more tags associated with one or more tokens. These profiles may describe, but are not limited to the needs, capabilities, reputation, usage statistics, etc., of computational entities and/or corresponding users.

In accordance with a number of embodiments, profile data may be generated by various parties including but not limited to wallets associated with users; aggregating entities; computational entities associated with enterprises; etc. In accordance with several embodiments, profile data produced by enterprises may describe product usage preferences of employees and/or incorporate such descriptions in profiles associated with the enterprise(s). Some profile data may be automatically generated through modes including but not limited to, rules and/or machine learning (ML) algorithms. Additionally or alternatively, profile data may be selected and/or generated by users and/or admins associated with users.

Profiles may be stored in private and/or semi-private locations including but not limited to wallets and/or enterprise gateway servers. Profiles may, additionally or alternatively, be stored in public locations including but not limited to public databases, such as cloud servers and/or blockchains. The profiles may be in part encrypted and/or associated with access control lists (ACLs) for purposes of limiting the exposure of the information to various parties.

c. Tag and Profile Utilization

Figure 18A:
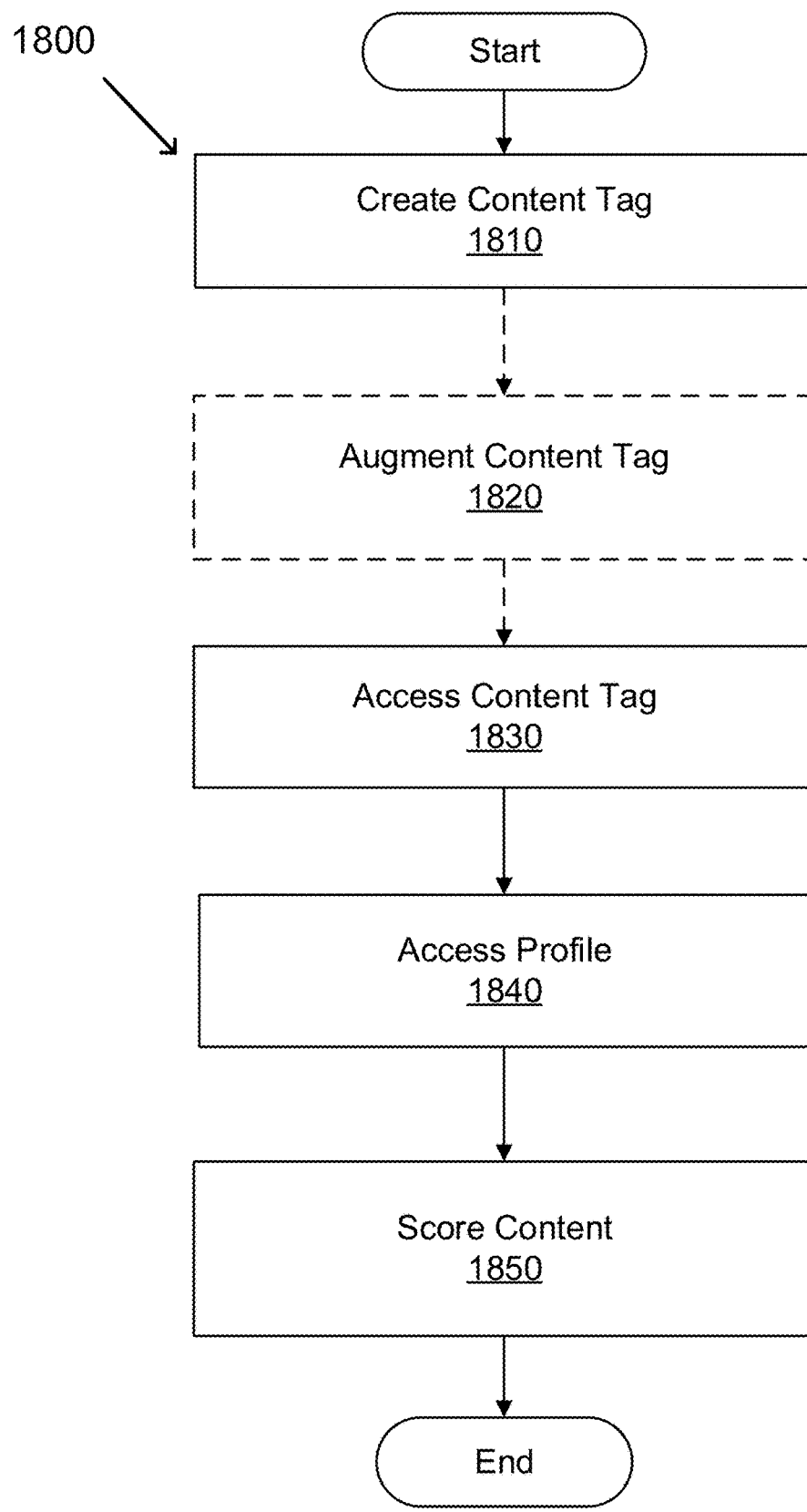
FIGS. 18A-18B illustrate a process for tagging and profiling content represented on blockchains configured in accordance with a number of embodiments of the invention.

A process depicting the use of tags and profiles, in accordance with some embodiments of the invention, is illustrated in FIG. 18A. Process 1800 may be performed by entities including but not limited to, the creator of the content with which the content tags may be associated. Process 1800 creates (1810) content tags. Content tags may be stored as part of tokens, referenced by tokens, and/or associated with content referenced by tokens. Process 1800 optionally augments (1820) the content tags. Content tags may be augmented based on additional input from entities including but not limited to reviewers of content, bloggers, and/or users of the content with which the tags may be associated. Process 1800 accesses (1930) the content tags through intermediaries including but not limited to, wallets, DRM units associated with wallets, content distributors, and/or advertisers. The content tags may describe the content through methods, including but not limited to, providing keywords associated with it, rating the content, and/or indicating one or more categories and/or sub-categories associated with the content. Process 1800 accesses (1840) profiles. Profiles may describe various system users, including but not limited to wallet owners. In accordance with many embodiments of the invention, profiles may indicate attributes including but not limited to user demographic, content access history, purchase history, browsing history, preferences, settings, content ownership, etc. Process 1800 scores (1850) the content associated with the tags based on the profile, where the score indicates a fit between the content, as classified by the associated tag, and the profile.

Scores may be based on the clusters associated with the profiles, the clusters associated with the tags, and/or the relationship between these two clusters (e.g., mappings). In accordance with many embodiments, high scores may indicate, for example, that users are likely to have a positive preference for the given content. Positive preferences may correspond to indications that users are likely to purchase the content and/or otherwise take actions related to the content. Other actions may include but are not limited to viewing the content, being influenced by the content, and/or selecting the content. Additionally or alternatively, in accordance with many embodiments of the invention, fitness scores may indicate likely correlations, including but not limited to correlations being shown the content and purchasing the content (and/or related products).

Figure 18B:
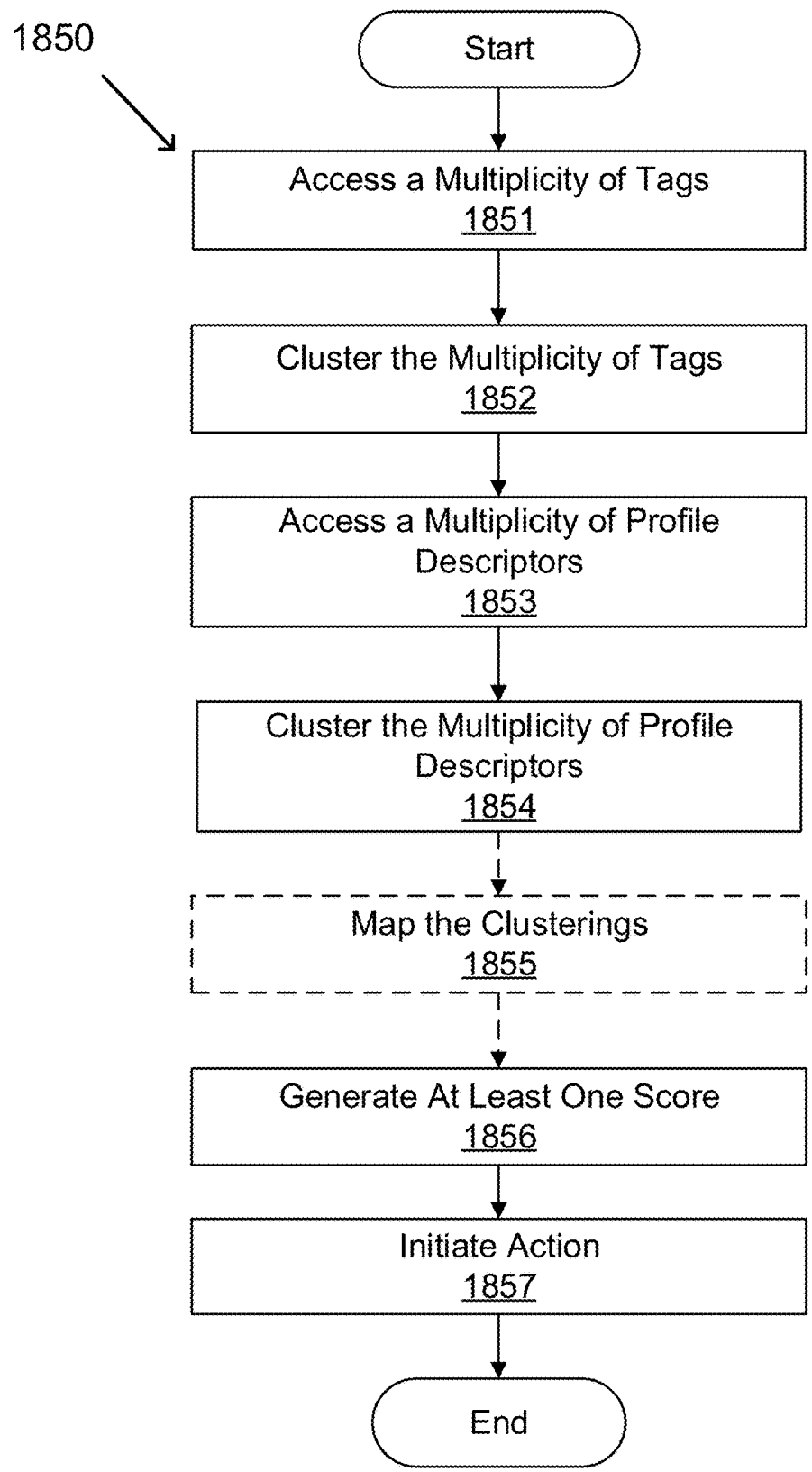

The generation of a score (e.g., fitness score), in accordance with several embodiments of the invention, is illustrated in FIG. 18B. The score generation may correspond to, but is not limited to the score generated in (1850). Process 1850 accesses (1851) a multiplicity of tags are accessed. The multiplicity may be stored in one or more blockchains, public databases, and/or proprietary databases. When non-blockchain databases are used, process 1850 may tags may be stored using cloud storage methods. Process 1800 clusters (1852) the multiplicity of tags, creating at least two clusters. Process 1850 accesses (1853) a multiplicity of profile descriptors. Profile descriptors may be the same as profiles and/or records containing aggregate and/or anonymized data from one or more profiles. Systems in accordance with some embodiments may be configured to use records with anonymized data, thereby hiding personal and/or sensitive information included in the associated profiles. Process 1850 clusters (1854) the multiplicity of profile descriptors. Process 1850 may optionally map (1855) the clusters generated in (1852) and the clusters generated in (1854). The mappings may indicate trends including but not limited to correlations that represent the relationship between the data underlying the clusters. Process 1850 generates (1856) at least one score. Fitness scores may indicate the likelihood that a given user, associated with a given profile, would respond in a given way to content associated with a given tag. Additionally or alternatively, quality scores may be indications of the users' likely preferences in relation to the content associated with the tag(s).

Process 1850 initiates (1857), an action based on the score generated in (1856). Actions initiated (1857) in response to the scores may include but are not limited to rendering the content associated with the tags, blocking the content, determining rankings related to the content (based on the scores), viewing promotional material associated with the content, etc.

As mentioned above, tags can be utilized for various purposes including but not limited to improving user experience and user security; optimizing performance; minimizing costs; and enabling desirable interaction features of systems while guarding the privacy of the individual users. A variety of further, non-limiting, examples is provided below.

d. Content Selection

Tags and/or profiles utilized by systems operating in accordance with many embodiments of the invention may provide improved content selection mechanisms. One example use of content selection mechanisms exists in the context of recommendation mechanisms. In accordance with some embodiments, recommendation mechanisms may be used to determine whether users are likely to want to consume and/or engage with certain content. Such mechanisms may determine whether user Alice may be likely to want to view movie A (and/or compare movie A with movie B). Alternatively or additionally, the mechanisms may determine whether user Bob would want to invest in token C (and/or compare token C with token D).

In accordance with some embodiments, content selection mechanisms may promote advertisement and product placements. This may include but is not limited to determinations of whether advertisements should be displayed to particular users based on the tags and/or profiles. For example, systems operating in accordance with numerous embodiments may be configured to determine whether given advertisements should be shown to users (e.g., user Cindy). Such determinations may be based on their anticipated needs and preferences, which (in Cindy's case) may be determined based on her past behavior, their token ownership; their feedback related to her preferences; and/or the similarity between the observed user (Cindy) and other users. In accordance with some embodiments, the outcome of comparisons between users may be expressed as demographic collections.

Systems in accordance with various embodiments may be used to guide generative AI methods that can customize product placements. Such product placements may be customized to align with expected user preferences of one or more viewers. For example, methods may visually and aurally configure content to create the perception of a character in a movie drinking a particular soft drink, alcoholic beverage and/or other drink. Such content customization may, additionally or alternatively, be performed based on factors, including but not limited to, the venue, the local laws and regulations in the place where the content may be being consumed, and/or product availability in such places. The content customization may, additionally or alternatively, be based on the bids of advertisers at the time of the content consumption.

User wallets configured in accordance with various embodiments may be used to identify what content users appreciate based on attributes including but not limited to access behaviors. These access behaviors may be known by the wallet(s), where they can be recorded. When users utilize multiple wallets (e.g., one on their laptop and one on their cellular phone) the wallets associated with some or all of the devices may aggregate user behavior. Aggregating user behavior may be useful for noting differences in access preferences based on the platform, the time of the day, the location, etc. In accordance with numerous embodiments, information may not be publicly available, for reasons of user privacy and/or preference.

In accordance with some embodiments, wallets can use collected and/or aggregated information to generate preference profiles. Preference profiles may be stored locally on the wallet(s) and/or with storage entities associated with the wallet(s). Additionally or alternatively, preference profiles may be shared selectively and/or in the form of being made public. In accordance with a few embodiments, publication may take the form of the inclusion of collected and/or aggregated data in the social networking profiles of the corresponding user(s).

As mentioned above, the wallets and/or entities with access to published information may generate content selections for users based on profile data. They may, additionally or alternatively, suggest introductions between users with preferences that align. In accordance with numerous embodiments, the extent to which such introductions are performed may be configured by the users, admins associated with the users, and/or security profile data of the users indicating what types of introductions are safe. Such considerations can, additionally or alternatively, be made in the context of content recommendations.

e. Commercial Content Selection

Systems and techniques configured in accordance with certain embodiments may be applied to the context of selecting commercial content including but not limited to advertisements, promotional material, coupons, and on-the-fly configuration of product placements. Such on-the-fly configurations may, for instance, allow for advertisements within movies. For example, advertisements to be rendered at user wallets, associated monitors, and/or loudspeakers/earphones may be determined based on profiles associated with the users and/or wallets/devices themselves. In accordance with some embodiments, inputs to commercial content determination may, additionally or alternatively, involve information (e.g., tag-related data) about one or more tokens associated with the users and/or wallets. In such cases, tag-related data may include the tag data of the tokens and data associated with related classes.

Systems and methods in accordance with many embodiments of the invention may be combined with the management of user profiles within wallets. In some instances, profiles may not be disclosed outside the wallet(s) and/or only select predicates related to such wallet(s) may be disclosed outside the wallet(s). For example, the selection of commercial material may be performed at least in part on user wallets, based on profile data of the users and/or tag data associated with tokens (that are stored in, have been accessed from, and/or otherwise become associated with the wallets and/or associated wallets). A determination of commercial content in and/or by wallets is disclosed in U.S. patent application Ser. No. 17/811,831, titled "Systems and Methods for Token Management in Augmented and Virtual Environments," filed Jul. 11, 2022, incorporated by reference in its entirety. Examples of associated wallets may include but are not limited to wallets of a family member, and/or wallets owned by members of shared organizations with particular wallet users. Techniques describing the association of multiple wallets to each other are disclosed in U.S. patent application Ser. No. 18/155,662, titled "Crypto Wallet Configuration Data Retrieval," filed Jan. 17, 2023, incorporated by reference in its entirety.

Systems configured in accordance with certain embodiments may equate control of tokens with the rights to associated assets. This can be applied to a variety of applications, including but not limited to advertising/promotion; warranty; value-add software-based entitlement; upgrades; cross-promotions (by vendors of a particular resource and/or vendors of another resource with conceptual crossovers—such as selling diamonds to someone with an expensive handbag); new "lost and found" models (including but not limited to, automated rewards and/or auto-disabling of upgrades); and/or new rental models including but not limited to being given rights to use a particular resource with the possibility of receiving, in response to additional actions, value, upgrades, and/or entitlements.

The use of tags and profiles in accordance with several embodiments of the invention may enable and/or improve personalization. For example, tags and/or profiles may be applied to matching content (assessed through tags) to contexts, the contexts including information about one or more likely content consumers (assessed through profiles).

Systems in accordance with many embodiments may experience shifts in focus towards access facilitation (among other features). For example, systems may subsequently experience improved controls over content and wallets, including but not limited to, content/wallets implemented using access controls, digital rights management (DRM) methods, and cross-wallet access rights sharing. Alternatively or additionally, recording access rights on blockchains may be made easier by utilizing techniques in accordance with a number of embodiments. Access may be not limited to access related to possession, but, include access due to users borrowing, renting and/or otherwise being provided temporary or permanent access to content elements.

In accordance with some embodiments, access can be limited by access rights of entities with possession of the associated tokens. The rights to access may thereby be terminated when individual users transfer possession rights to other entities. Additionally or alternatively, access rights may be locked in, through persisting licenses.

There are, additionally or alternatively, scenarios where users may want to yield access to a resource during prespecified periods of time, periods triggered by particular events, and/or periods that end according to particular events. For example, this may occur when: an employee wants to yield building access while on leave; a husband wants to rent/share/provide temporary control of tokens to his wife while under surgical anesthesia; and/or a party wants to rent out tokens (when unlikely to be used contemporaneously with other, secondary tokens).

Access rights may be governed by, but are not limited to, smart contracts of tokens, metadata associated with tokens, and/or policies. Such policies may be associated with token types, content creators, and/or jurisdictions. The policing of access rights related to tokens may involve content encryption and/or key-enabled access to content. The use of keys may be controlled by the current possessor(s) of content, trusted third parties that may be distributed, one or more wallets that may have DRM mechanisms built in, and/or trusted execution environments (TEEs). Examples of trusted parties that may be distributed may include but are not limited to DAOs, bridges between two or more blockchains, and/or consensus mechanisms.

In accordance with some embodiments, trusted parties may, additionally or alternatively, implement watchfulness. Watchfulness is disclosed in PCT Patent Application No. PCT/US23/62851, titled "Systems and Methods for Abuse Safeguards in NFT-Directed Environments," filed on Feb. 17, 2023, incorporated by reference in its entirety. Watchful actions may, additionally or alternatively, be performed in other manners, including but not limited to, using DAOs, trusted authorities, and/or consumer representatives selected by users associated with transactions (to which watchful actions may be taken).

In numerous embodiments, watchful mechanisms may be implemented using various mechanisms. For example, some systems may utilize consensus mechanisms by quorums of entities that operate AI. Additionally or alternatively, these AI may be modified using another consensus mechanism. This concept may be referred to as Consensus-driven AI (CAI). This notion was introduced in U.S. patent application Ser. No. 17/810,085, titled "Distributed Ledgers with Ledger Entries Containing Redactable Payloads," filed on Jun. 30, 2022, incorporated by reference in its entirety. Watchful mechanisms may, additionally or alternatively, be implemented using machine learning (ML). When ML is used, each participating node may determine new weights for the ML engine and/or the nodes can collectively agree on what weights to use, based on consensus.

f. Search Enhancement

Systems in accordance with a number of embodiments may be implemented in search contexts, referring to contexts that can involve but are not limited to users entering a query in a browser and/or app, and a search engine determining what webpages and associated HTML resources correspond to the query. In the context of blockchains and/or wallets, searches may, additionally or alternatively, correspond to one or more records on the blockchains. Such (query-response) records may be selected based on the content associated with tokens stored on blockchain records. To enhance such search capabilities, search algorithms configured in accordance with some embodiments may utilize specific input queries. Such queries may not necessarily be user-generated but may, additionally or alternatively, be generated by agents. Once queries are obtained, systems may make output determinations, at least in part based on the tag data associated with one or more tokens, other information elements stored in one or more blockchains, and/or profile information associated with the searching users.

However, given users may have preferences that indicate that specific searches should be performed when prioritizing a search of specific blockchains, whereas other users may have other preferences that indicate a different prioritization. The determination of how to prioritize blockchains (to search) can be made based on, but not limited to, tags information, profile information, and/or past user search histories. In particular, in accordance with many embodiments, different blockchains may have different security, cost, functionality and/or performance characterizations. Here, the preferences may be expressed by systems in the form of tag data of tokens associated with the users and/or wallets; profile data associated with the users and/or wallets; and search history data associated with the users and/or wallets.

For example, agents may field requests to add transactions that include large data files (such as a video and/or movie file) to one or more blockchains. The agent may use tags searching similar, yet previously accepted and/or rejected videos to identify what tags to associate with the new transaction content. Additionally or alternatively, the similar content may assist in the determination and/or approval of which blockchain may be used to store the large video file.

In accordance with many embodiments, agents may be described as (but are not limited to) software configured to operate on-chain as part of smart contracts, as part of blockchain operating software systems such as the Ethereum Virtual Machine (EVM) and/or embedded consensus mechanism, and/or off-chain as may be implemented by independent monitors, external third party monitors, control systems and/or oracles.

In accordance with numerous embodiments, users (and/or agents working on behalf of users) can perform searches in order to proactively identify relevant material. Additionally or alternatively, users/agents may be able to determine how to display material that the users/agents actively perform searches for. For example, the mood and/or context of the users may be determined as the search is performed; this may be used to decide whether search results should be enhanced with suggestions. Suggestions may include but are not limited to warnings that the identified content may not be suitable for the users based on their interests and/or investment goals.

In accordance with some embodiments, agents can, additionally or alternatively, proactively perform searches on behalf of users. These proactive searches may be used to identify methods of addressing needs that the users may not yet be aware of. In such cases, the agent(s), having access to user behavioral histories and/or characterizations of needs associated with behavioral characterizations, may determine methods with higher accuracy. By refining the search methods, agents may be able to cache results that can take significant time (due to complexity). Additionally or alternatively, agents may be able to anticipate potential future search queries of the users and present results immediately when such requests are made. Additionally or alternatively, agents may present proactive results without being prompted by users. In such cases, agents may make assessments (based on user activity) of the optimal time(s) to share the results of proactive searches (e.g., when they first log on).

Predictive determinations of user searches/needs may be based on recent search queries. For example, users who search for five different but related types of primary information may be (e.g., songs), additionally or alternatively, likely to be interested in three other (secondary) types of information that are commonly of interest to users interested in the five types of information (e.g., other songs of the same genre). As such, once the agents/users have identified at least some search queries associated with the five types of information, agents may initiate proactive searches for the secondary information.

In accordance with certain embodiments, tokens and/or content selection may be made based on one or more environmental parameters. Environmental parameters may encompass various factors, including but not limited to recent user behavior being observed (e.g., "recent" may correspond to the last hour) and/or historical user behavior being observed (e.g., "historical" may correspond to one or more events that took place at least a week ago). In accordance with some embodiments, behavior may include but is not limited to the locations associated with users and/or wallets, movement associated with users, frequency of user actions involving the wallets, and types of user actions. Example user actions may include but are not limited to access to content, searches, requests for access, etc.

Additionally or alternatively, example applications may proactively identify and render/play content likely to be desirable to users at given times. An example may involve playing soothing music when users appear to be stressed (which may be identified by actions like driving too fast). In accordance with some embodiments, the determination of desirable content may be a matter of prioritization (for example when users were already listening to music, but the selection of music was influenced by the contextual information).

g. Clustering

In accordance with certain embodiments, using tags and profile data, clustering can be performed through methods, including but not limited to, using artificial intelligence (AI) techniques, machine learning (ML) techniques, and/or statistical clustering methods. Clustering can enable the finding of similarities for content and/or users. Additionally or alternatively, clustering can enable the finding of outliers. In accordance with some embodiments, outliers may be indicators of fraud and/or signal new trends and/or novel types of content and content use.

i. Use for Enhancements of Recommendations.

In accordance with a number of embodiments, content recommendations can be generated based on the clustering of profiles and/or tags. Additionally or alternatively, these recommendations may result from the correlation of already determined feedback from users associated with the profile clusters (relative to the clusters of tags and associated content). Feedback can be explicit, including but not limited to the filing of written reviews, the selection of rank metrics (e.g., three stars) corresponding to products and/or services, and/or indications of endorsements applied by users to content, services, and/or content providers. Feedback can, additionally or alternatively, be implicit, including but not limited to the consumption of content (e.g., playing a song) multiple times, the saving of content, the deletion of content, the interruption before the end of playing of content, the taking of actions related to content in response to accessing said content, etc. Feedback may, for example, be collected by a wallet and communicated in an anonymized manner to a service provider associated with a blockchain.

Feedback may, additionally or alternatively, be determined by entities external to the users and their wallets, including but not limited to computational nodes associated with blockchains. The nodes may identify feedback associated with users based on factors, including but not limited to, content acquisition patterns related to the wallets' private and/or public keys.

Feedback, when taken in aggregate for clusters of related users and/or wallets, may indicate correlations between the users' cluster (i.e., the predominant cluster) and one or more content-related clusters. In accordance with many embodiments such correlations may be positive (suggesting preference); negative (suggesting dislike); and/or neutral (suggesting a lack of data and/or relative indifference). Based on the determination of positive correlations between the predominant cluster and multiple content-related clusters, content selection can be made.

In accordance with certain embodiments, content selection may be based on the degree of correlation between the predominant cluster and the individual content-related clusters. Additionally or alternatively, weights may be applied to indicate the value of transactions for each one of the content elements being considered (for recommendation to the users of the predominant cluster). Weights may be generated based on auctions and/or bids between content providers, for example. In such cases, the highest bid within each category (categories corresponding to different clusters of tags and associated content), may be given the greatest weight in content selection. Techniques in accordance with numerous embodiments of the invention can, additionally or alternatively, be applied to select advertisements and other commercial content.

ii. Profile Utilization

In accordance with various embodiments, clustering may include the clustering of tokens based on associated tags. In such cases, the clustering may use weights associated with expected trustworthiness and/or accuracy of tags. Having tokens clustered in this manner may enable the finding of similar content, which can facilitate searches as described above.

In accordance with a number of embodiments, clustering may include the clustering of users based on their profiles, including but not limited to, the profiles that they convey to each other and/or to trusted parties. In a few embodiments, sensitive profiles may be clustered using methods of computation on encrypted data. Co-pending U.S. Patent Provisional Application No. 63/384,737, titled "Automated Wallet and Transaction Control," filed on Nov. 22, 2022, incorporated by reference in the entirety, discloses novel techniques for computation on encrypted data, with examples given relating to computation on encrypted private keys, where said encrypted private keys are not disclosed as part of the computation but can be proven to be legitimate private keys relative to some specified public key. The same methods can be used to improve the efficiency of other types of computations on encrypted data.

In accordance with some embodiments, clustering may include the clustering of tokens based on which users access the tokens. Additionally or alternatively, the clustering may depend on how accessing users are related to each other. This may enable the collection of data based on how tokens are actually used and by whom. In accordance with certain embodiments, systems may identify content that gets clustered differently when clusters use tag data and when the clusters use usage data. In accordance with many embodiments, this difference may be indicative of invalid tag data, so can be used as feedback mechanisms to determine what tokens are likely to have incorrect tags. In response to the differences, associated tags can have their associated weights modified (e.g., decreased) to remove the discrepancy between the two clusters. Thus, feedback methods in accordance with certain embodiments may enable improved tags determination based on use, strengthening other uses of the tags, including but not limited to, the use of tags in the context of search and/or recommendations.

Clustering users based on access to token clusters may, additionally or alternatively, enable systems operating in accordance with several embodiments to find outliers among users. Outliers can be used to perform functions including but not limited to distinguishing real human users from bots and identifying changes in user clusters. In relation to user clusters, changes in threshold values may be indicative of potential account take-overs. This may, for example, reflect situations in which one wallet is used by a first user (the real owner) and later used by a second user (e.g., a phisher and/or a malware agent.)

h. Blockchains i. Selection

In accordance with certain embodiments, constellations of blockchains may be associated with each other. These connections may be performed using one or more bridges. For example, a level 1 (L1) blockchain may be connected with one or more level 2 (L2) blockchains using bridges that copy one or more elements from the L1 blockchain to one or more of the L2 blockchains. In such cases, items on the one or more L2 blockchains may later be copied back to the L1 blockchain using the same bridges and/or using different bridges. Additionally or alternatively, bridges may connect two or more of the L2 blockchains together, and selectively copy elements (also referred to as items) from one blockchain to another.

In accordance with many embodiments, when a bridge copies an element from a first blockchain to a second blockchain, the bridge may lock and/or burn the item on the first blockchain. Destroying duplicates of the same item may be used to make sure that items may only be represented on one blockchain at a time, and/or that the overlap of double representation is minimal and governed by the time needed to lock and/or burn the item. In accordance with several embodiments, items in this context may refer to tokens, including but not limited to cryptocurrency and/or non-fungible tokens. Items may, additionally or alternatively, be data items that represent facts and/or other information that has been submitted to one or more blockchains. Information in this content may be submitted by, but is not limited to, users, mints, quorums of entities corresponding to consensus mechanisms, and/or oracles.

Two or more L2 blockchains being associated may have different properties, including but not limited to, different gas fees, different security assurances, etc. This may happen because the two are implemented using different consensus mechanisms (e.g., one implemented using a proof of work structure, another by a proof of stake structure, and a third by a proof of authority structure). A variety of consensus mechanism structures may, additionally or alternatively, be used in accordance with certain embodiments of the invention, including but not limited to hybrid structures. Examples of hybrid structures may include but are not limited to hybrids between proof of space and proof of work components. In accordance with several embodiments, hybrid consensus mechanism components may be balanced against each other in real-time. Hybrid consensus structures are described in U.S. patent application Ser. No. 17/806,060, titled "Composite Cryptographic Systems with Variable Configuration Parameters and Memory Bound Functions," filed on Jun. 8, 2022, incorporated by reference in its entirety.

Because different L2 blockchains may be associated with different properties, systems operating in accordance with some embodiments may find it appropriate to move items from a first blockchain (e.g., the L1 blockchain described above) to one particular second blockchain (e.g., a first L2 blockchain). Additionally or alternatively, some other items may be determined appropriate to move to a third blockchain (e.g., a second L2 blockchain). The determination of which items to move to which blockchains may depend at least in part on the one or more tags associated with individual items, including but not limited to tokens. The determinations of transfer may be made by one or more associated bridges that transfer items from a first blockchain to a second and/or a third blockchain. These determinations may be made at least in part based on the tags and/or may involve but are not limited to decisions of what items to move, under what conditions to move them, and to what blockchain to move each item.

In accordance with many embodiments, there can be constellations of blockchains, with differing purposes. For instance, each constellation may have its own units of transaction (e.g., ether) for mining. As such, singular tokens (e.g., a ERC-20 coin) can, additionally or alternatively, exist across the constellation(s). Each of the blockchains in constellations may be optimized for particular applications. For instance, an organization (e.g., Netflix™) may have file server blockchains that run completely on proof of authority. Here, Netflix™ may control what may be written to the blockchain through access controls. Another blockchain may serve metadata for anybody, run proof-of-stake, and be permissionless. Block sealing rate and/or block transaction size can be restricted to employ restrictions on the actions that may be taken.

Given queues for transaction, items may be moved by bridges to selected blockchains based on particular rationales (e.g., cost). In accordance with some embodiments, when cost is a distinguishing factor, arbitrage may occur where the cheapest blockchain gets the activity of such transfers. Items may, additionally or alternatively, be associated with blockchains based on the assurances of associated blockchains and/or time granularity of the associated time-stamping. Thus, selections of what items to transfer to what blockchains may be performed based on sets of rules. The rules may take as input, but are not limited to, the tags, the preferences, user budgets, and user selections (that may be made by a person and/or based on recommendations by the system). Where determinations are based (at least in part) on system recommendations, bridges may generate the recommendations and/or may use rules associated with users and/or wallets to automatically implement preferences associated with such rules.

In accordance with numerous embodiments, entities may be used in combination with consensus mechanisms to protect blockchains from being exploited for unintended use. When determinations are made, disclosing that item(s) (associated with low-risk preferences) should be maintained on high-risk blockchains then the item(s) may be moved to a blockchain that matches the rules associated with the item. In accordance with a number of embodiments rules may take many forms including but not limited to being part of the tokens; associated with the tokens, including but not limited to, in the form of derived tokens; associated with the holder of the tokens, including but not limited to, the wallet(s) to which the tokens may be assigned; and/or based on guidelines/legislation associated with given token type.

As suggested above, in certain embodiments, front-end components corresponding to bridges may make evaluations to determine the blockchains to which given tokens should be transferred. These evaluations may be based on smart contracts associated with tokens. Additionally or alternatively, bridges may evaluate data including but not limited to tags, profile data, and/or rules associated with the tokens to make these evaluations. In accordance with many embodiments, given blockchains may be optimized in terms of their hardware configurations and consensus mechanisms for particular tasks. This may result, for example, in execution-heavy, computation-heavy, communications-heavy, and/or storage-heavy implementations and, additionally or alternatively, ranges of gas fees.

Systems in accordance with some embodiments of the invention can be utilized to implement pricing controls. For example, users may elect to store particular tokens on given blockchains and be informed of the likely consequences of implementation. For example, certain users may be informed that storage on specific blockchains will be associated with premiums of significantly greater (e.g., three times as many) gas fees compared with other optional blockchains.

In accordance with some embodiments, tags and/or partitions can be application-specific. Application developers may embed metadata deep inside their code. Doing so may provide one source of tag data that is not available in traditional token metadata fields. To facilitate the description of metadata in generalized ways, often the application itself can define the consistency and integrity of the database(s). In accordance with certain embodiments, database partitions may cooperate with applications that understand/agree on (1) the use cases for the partition; and (2) the semantics of the metadata as they relate to operations on and presentations of the database partition(s). The applications that operate on partitions may, additionally or alternatively, be in charge of extracting and interpreting metadata. The applications may incorporate this metadata in the tag data to be considered for actions including but not limited to the evaluation of tokens and evaluation of transfers.

In the context of this application, the terms partition and shard may be used to describe divisions of databases into subsets. Both partitions and shards may refer to the same element and/or elements since both are specified by one or more tags and/or profile information. One example of a partition may be a logical subdivision of a database defined by entities and relationships between entities. Another example of a partition may be a vertical subdivision of a database (including but not limited to, the columns of a spreadsheet). One example of a shard may be a physical subdivision of a database defined as a single transaction ledger. Another example may be a horizontal subset of a spreadsheet (including but not limited to, a collection of rows of a spreadsheet). Multiple partitions might share some information and require frequent synchronization events (rollups for example) whereas shards (as independent transaction ledgers) should share nothing with any other shard.

The behavior of systems configured in accordance with various embodiments of the invention may be application-specific and/or defined via data descriptors including but not limited to metadata (such as in the form of metadata tags). This metadata may direct associated Ethereum Virtual Machines (EVMs) to operate on specified blockchains, contracts, and/or accounts. This metadata can be defined using standardized protocols that are designed to bridge depending on application-specific behaviors and/or universal behaviors. The metadata may, additionally or alternatively, direct associated "Blockchain Management Systems", referring to EVMs and all the components that support the EVMs in the task of managing the blockchains.

In some embodiments, application-specific knowledge, as described above, may include static metadata descriptors (tags) and/or dynamic rules that define how database operations are applied. These rules can be implemented as, but are not limited to smart contracts, database views, and stored procedures within the EVM Database Management System (DBMS). Additionally or alternatively, rules may be defined in the form of triggers, stored procedures, stored views, and/or application-specific code.

In accordance with a number of embodiments of the invention, the metadata can allow a plurality of metadata-aware EVMs operating on a plurality of transaction ledgers to support atomicity across a plurality of database shards. In numerous embodiments, a plurality of EVMs can process atomics transactions, including but not limited to one or more database operations. The database operations may affect multiple blockchains by referencing metadata tags, preparing state channel rollups for each affected blockchain, and/or making state channel rollups available to all nodes. In accordance with many embodiments, other metadata-aware EVMs may act as verifiers to ensure that state channel rollups meet global consistency and integrity requirements defined by the schema. The verifier EVMs may signal consensus by tagging one or more state channel rollups. Once consensus is established, the plurality of EVMs can enable and/or roll forward the state channel transactions. In order to maintain consistency, universal EVMs with visibility into the plurality of blockchains may roll forward and/or roll back related atomic state channel rollups before presenting views of the global database.

In accordance with certain embodiments, state channels may enable two parties to commit funds on-chain, then transact off-chain. In such cases, after a number of off-chain transactions between them, the final state can be written back to the chain, with each party claiming what they are owed. The micro-transactions may be signed off-chain and the receipts presented at the end to ensure each party gets back what is due to them. Additionally or alternatively, to prevent cheating by submitting earlier receipts, state channel rollups may include challenge periods where challenging parties party can submit up-to-date receipts to avoid being conned. Rollups, for configurations with parallel blockchains, may, at regular intervals an intermediary bundles up the activities on the second blockchain that would have an effect on assets bridged from the first blockchain, and write a hash and/or compressed summary of the activity.

In accordance with many embodiments, database shard/partition topology may take the form of directed acyclic graphs (e.g., spanning trees). Rollups (compilations of blockchain transactions submitted together) may thereby work up the acyclic graph, spanning tree and/or other graph structure, and have the capacity to pause at any layer of the graph. In accordance with numerous embodiments, rollups may, for instance, pause at the topmost layers where the node metadata may be especially meaningful. In accordance with some embodiments, the node metadata at the topmost layer of a representation of database shards may be known as the data control node (or "single source of truth".) Additionally or alternatively to state channel rollups, rollups may include but are not limited to zero-knowledge proofs and/or optimistic proofs. Additionally or alternatively, rollups might be temporarily and/or permanently deferred to parent nodes and/or be included by metadata-aware EVMs in any presentation of the universal database. Deferred rollups may, for example, mean that the rollups will be included in the transaction ledger of a shard but only referenced by the parent shard.

In addition to being aware of metadata, computational nodes may, additionally or alternatively, have access to other tag data. Some computational nodes may have access to greater amounts of tag data for given entries than others. In some cases, two computational nodes may have access to different numbers of tag elements for a given record. For example, this may happen when some tag records are stored in external databases (not accessible by all the computational nodes). In such cases, the computational nodes may associate different weights to their consensus vote, where these weights reflect the importance of the different types of tag data used by them. One way of reflecting the importance, for systems operating in accordance with certain embodiments, may be to count the number of tag element types being used and make the weight proportional to the number of tag elements used. Additionally or alternatively, the award associated with mining may be modified based on weights to encourage the use of greater amounts of input data for making decisions.

In accordance with many embodiments, at least some tag data may be validated by computational nodes before being used as inputs to the classification of and/or action selection for the associated tokens. The validation may include the verification of digital signatures, verification that statements are approved by sets of servers (including but not limited to one or more consensus mechanisms), and/or verification that data associated with the tags may be present in databases verified to be valid. Blockchain consensus mechanisms may require, prioritize, and/or process tagged transactions at different costs to consumers.

In some embodiments, metadata may be hidden from the general mining community. As such, one approach to determining weights may be to determine how much the corresponding miner(s) (and/or other consensus nodes) has at stake in the partition(s). Additionally or alternatively, weights can be determined based on verifications of whether addresses associated with the miners show recent positive activity on the partition(s). In accordance with numerous embodiments, positive activity may be judged by, thresholds indicating recentness. Other approaches to determine whether given nodes correspond to recognized authorities on subject partitions can be used to determine the weights used. Additionally or alternatively, the determination of weights may be done by nodes including but not limited to the consensus mechanism, based on information available to them but not necessarily to a broader public. Such information may include but is not limited to the results of audits, which may (additionally or alternatively) be performed periodically.

ii. Filtering

In accordance with numerous embodiments, tags and/or profiles can be used to make filtering decisions using watchful bridges and/or watchful consensus mechanisms. Watchfulness was disclosed in U.S. Patent Application No. PCT/US23/62851, titled "Systems and Methods for Abuse Safeguards in NFT-Directed Environments," filed on Feb. 17, 2023, incorporated by reference in its entirety.

As suggested above, bridges may perform determinations using watchful mechanisms. In several embodiments, the watchful mechanisms may be implemented using consensus mechanisms by quorums of entities that operate AI that may be modified using other consensus mechanisms. This application may refer to such systems as Consensus-driven AI (CAI). This notion was introduced in U.S. patent application Ser. No. 17/810,085, titled "Distributed Ledgers with Ledger Entries Containing Redactable Payloads," filed Jun. 30, 2022, integrated by reference in its entirety. CAI can be implemented using machine learning (ML) wherein each participating node determines new weights for the ML engine and the nodes collectively agree on what weights to use, based on consensus.

Watchful mechanisms can, additionally or alternatively, be implemented in consensus mechanisms such that they are implemented in the consensus mechanism of one particular blockchain, but not in another. In such cases, blockchains with watchful consensus mechanisms may thereby possess greater degrees of protection than those that depend primarily on bridges for watchfulness. Systems operating in accordance with certain embodiments may include watchful mechanisms that control the characteristics of the transactions being performed. For example, certain watchful mechanisms may block transfers of ownership in contexts where it is determined by the mechanism that transfers of ownership are associated with high risks of abuse. Such watchful mechanisms may be based on but are not limited to, heuristic algorithms identifying likely malware-based attacks based on temporal aspects of transaction requests.

In accordance with many embodiments, while blockchains may restrict what entities perform actions, they may be prevented from restricting what actions are performed. For example, in private and permissioned databases/blockchains, only those with assigned and/or controlled access to the ability to seal blocks may be allowed to select and exclude data from being included in sealed blocks. Excluded data may be, for example, a very large movie file attempting to be written to a blockchain configured with minimal and/or inefficient file storage and retrieval capabilities. In accordance with some embodiments of the invention, abuse of a given blockchain's intention may thereby be prevented.

In a number of embodiments, prevention of abuse may be achieved by having agents, including but not limited to watchful bridges, employed to police the actions on one or more associated blockchains. One type of monitoring may relate to the monitoring of the types of actions being employed by smart contracts. For example, a smart contract creating items (e.g., ERC-20 tokens—typically a fungible coin resource), may be prohibited on particular blockchains and welcomed on others. Preventing the deployment of such smart contracts may be performed by a watchful agent programmed within the blockchain operating system (e.g., the Ethereum virtual machine). Additionally or alternatively, prevented smart contract deployment may be appropriate when smart contracts include broad abilities to move contract funds to the destination address(es) and/or to token wrapping agents capable of moving funds to different blockchains.

Watchful computing can be described as the application of one or more rules and/or processes (e.g., AI and/or ML processes) to input(s). The input may include one or more tokens; their corresponding tag data; and/or the profile data (corresponding to at least one of current owners of the tokens, prospective owners of the tokens, parties provided access to data associated with the tokens, and/or boundaries associated with such parties). Boundaries associated with parties provided data access may include but are not limited to political boundaries, enterprise-centric boundaries (such as membership of organizations and/or teams), age-related boundaries, and/or preference-related boundaries.

Tags and boundaries can be used to determine fitness scores of intended actions, including but not limited to the transfer of tokens from one user to another, the transfer of tokens from one wallet to another, and/or access to tokens from inside a given boundary. Actions associated with low fitness scores may be deemed unsuitable.

Based on fitness thresholds associated with, but not limited to users, boundaries, and/or tokens, determinations can be made by watchful agents on whether to allow intended actions. When the action is not allowed, a second determination can be made to identify and propose replacement actions. This may be to block an action and/or to perform an alternative action. Additionally or alternatively, watchful agents may initiate remedial actions, which may be the same as the proposed action. For example, when the remedial action is for users identified with the tokens to perform an assurance, like a second-factor authentication (2FA) with a trusted entity, then the replacement action may be to complete the proposed action when the 2FA authentication succeeds and/or results in a score exceeding a fitness threshold with sufficient assurance.

In several embodiments, arrays of values can be computed in response to watchful computing instead of fitness scores. The fields of this array may represent one or more actions to be taken in response to determined situations. The array elements may indicate actions and/or associated scores indicating the need for such actions. The array elements may, additionally or alternatively, indicate one or more conditions for the actions. Some of the array elements can be used to select information provided to users in prompts and/or other user interfaces. Some array elements may include instructions for computational entities associated with the users, including but not limited to the users' wallets. These instructions may be in the form of selections of computational actions, scripts to be evaluated, and/or addresses to services. Such services may need to be called to comply with agreements, recommendations, laws and/or settings.

i. Proprietary Markups

In certain embodiments, servers may create tag data not made public and/or controlled using digital rights management rules, encryption and/or access control measures. The tag data may correspond to the results of computation that the servers perform, potentially using proprietary algorithms and methods. This type of tag data may be referred to as private tag data. Additionally or alternatively, servers may create private profile data describing one or more user entities; user entities may include but are not limited to users and/or wallets.

The use of proprietary markups in the form of private tag data and/or private profile data, in combination with other tag data and other profile data, may enhance the decision-making by entities with access. Specifically, access may enable these entities to provide higher-quality services related, but not limited to filtering, security, and/or selections of commercial content. Proprietary markups can be marketed as premium services that users (including but not limited to owners of tokens, prospective buyers of tokens, prospective renters of tokens, and/or content creators associated with tokens) may utilize to improve the service provision, assurance, quality of recommendations, etc.

Proprietary markups can enhance the capability for systems operating in accordance with various embodiments to make better decisions. This can be monetized by reputation values associated with the use of proprietary markups. Reputation access can be provided as subscriptions to servers. Additionally or alternatively, servers can use reputations by virtue of purchasing and/or creating them. Such servers can advertise the fact that they use proprietary markups and/or advertise ratings indicating the estimated improvement of determination accuracy resulting from the use. In accordance with some embodiments, premiums may be required for utilizing the proprietary markups. Additionally or alternatively, servers may be selected by users needing to have services provided based on their higher accuracy. The servers may be associated with reputation scores supporting the assertions of higher accuracy. The assertions may have been provided by third parties, including but not limited to rating agencies and/or audit organizations. Additionally or alternatively, the assertions of higher accuracy and/or reputation scores may be determined by surveys among users indicating satisfaction with services.

In accordance with numerous embodiments, proprietary markups may be generated by oracles, based on off-chain events, and/or based on off-chain algorithms. Proprietary markups, which may include at least one of tag data and profile data, may be used by oracles to provide various services (similarly to the servers above). In accordance with certain embodiments, oracles may provide proprietary markups to servers performing their own services. In such cases, the provision of the proprietary markup may be done in a manner that limits what entities have access and/or access rights to the data of the proprietary markup. For example, the data of the proprietary markups can be provided in an encrypted manner to one or more servers that have paid for access, and who have cryptographic keys that enable them to decrypt the received encrypted information to extract the proprietary markup. Additionally or alternatively, proprietary markups may be wrapped in digital rights management containers, which may be expressed in the form of NFTs. In such cases, access may be limited to privileged entities, including but not limited to entities that pay service fees (including but not limited to subscriptions, access fees, etc.). NFTs may include hyperlinks to the proprietary markup data, and/or other similar addresses. The NFTs may thereby enable parties with access rights to request proprietary markup data from storage that can verify access right credentials of the requesting entities (e.g., servers). Additionally or alternatively, the NFTs may have the proprietary markup data encrypted with cryptographic keys that control what entities can access it.

Along with the proprietary markup data, oracles can provide certificates associated with markup data that assert validity, origin, and/or quality score(s). The certificates may be independent from the data of the proprietary markup, allowing third parties to verify validity without being able to infer the proprietary markup data. One way to achieve this may be to apply a one-way function to the proprietary markup data to generate a result that may be referenced in the certificate; in such cases, the result may end up not including the plaintext data corresponding to the proprietary markup in the certificate.

In many embodiments, the protection of escrowed information may be performed by the selection and/or use of secure storage areas. Secure storage areas may correspond to one or more escrow authority entities.

Additionally or alternatively, the data stored may be stored in plaintext databases, enabling search by the one or more escrow authorities, but where the access to the data may be limited to such authority entities. In accordance with some embodiments, at least part of the data in access-controlled storage areas (e.g., databases) may be encrypted using keys that require multiple escrow authority entities to collaborate to decrypt. Another portion of a record may be accessible in plaintext format to entities that are able to access the contents of the database.

Additionally or alternatively, access may be possible for each individual that is part of an escrow authority without collaboration with other such entities. This can enable limited searches, in some fields, by single trusted escrow authority entities, but require a multiplicity of them to collaborate to access sensitive portions (which may include, but are not limited to portions with identity data).

Storage areas may, additionally or alternatively, be secure by virtue of logging all accesses after having verified that individual entities have the right to access the requested data. In accordance with various embodiments, access logs can be audited to identify abuse. Some audits may be automated, such as based on anomalous volumes and/or patterns of access. Additionally or alternatively, others may involve one or more admins.

Data derived from tags and/or profiles may be used both on the client side (e.g., wallets) and by service providers. Both client-side entities and service provider entities may perform customizations based on data derived from tags and/or profiles. The customizations may be performed by AI, by rule engines, using heuristics, and/or based on simulations. An example of such customization is disclosed in U.S. Patent Application No. 63/477,286, titled "AI Guided Content Creation, Configuration and Distribution," filed on Dec. 27, 2022, incorporated by reference in its entirety. In a few embodiments, only the client-side entity may have access to profile data, allowing the protection of the privacy of end users. In some situations, some profile data, including but not limited to basic demographic information, may be shared by client-side entities (e.g., wallets), allowing other network entities, including but not limited to service providers, to select content to be conveyed to the wallet(s) and/or other end-user-associated entities.

B. Optimized Proof of Stake Techniques in NFT Platforms

In accordance with many embodiments of the invention, Proof of Stake (PoS) methods may be applied for reducing the risk of network attacks and energy costs associated with decentralized blockchain mining. Systems in accordance with a number of embodiments may be used alongside PoS technology. The disclosure comprises several novel aspects. One novel aspect may be the use of a function for generating hash chains useful for determining relative order of events, with applications in various protocols, such as Proof of History (PoH) and Proof of Stake (PoS) protocols. The disclosed function protects against pre-processing based dictionary attacks. One of its benefits may be that it may be faster to verify than to compute; another benefit may be that its difficulty to compute can be configured, and may be adjusted to prevent resource waste during periods of low transaction rates. Another novel aspect may be the parallel generation of multiple chains, where a final chain may be generated by combining portions from different chains. The different chains may be associated with different difficulties to compute, where this corresponds to different resolutions of time. A chain that may be difficult for the miner to compute corresponds to one that will cover longer time segments than one that may be less difficult to compute. However, the difference of difficulty to compute may be only for the miner, and not for the validators. Whereas chain links of a "difficult" chain are harder for a miner to compute than chain links of a less difficult chain, each chain link takes the same computational effort for a validator to verify. The final chain that may be transmitted to a validator may comprise chain links from different chains, where these different chains are linked together, but each of them may be associated with a different level of difficulty. Thus, the chain that may be being output by the miner (or miners), may comprise some links that are from a more difficult chain and some that are from a less difficult chain. As such, the disclosed invention may be an enhancement of some of the mechanisms disclosed in co-pending U.S. patent application Ser. No. 17/817,931, titled "Methods for Securely Adding Data to a Blockchain Using Dynamic Time Quanta and Version Authentication," filed Aug. 5, 2022, incorporated herein in its entirety. A third novel aspect may be a configuration of resolution that enables tradeoffs between provable ordering of events taking place close to each other in time, and the efficiency of validators. The longer time periods that are associated with an element of a chain, the higher the efficiency of the validators will be, since the cost of validating a link may be constant and does not depend on the time it corresponds to. Therefore, when a miner includes a chain element from a "difficult" chain, that typically corresponds to a longer time period than when it includes a chain element from a less difficult chain; the inclusion of links from difficult chains, when possible, therefore results in savings for validators. It may be not always practically desirable to use chain links corresponding to long time periods, though, as this results in a lesser ability to distinguish, order-wise, various entries on the ledger. When the density of ledger entries may be high, it may be therefore better to use shorter time periods, which corresponds to chain links from chains with lower difficulty values. The disclosed technology balances these needs against each other. A person of skill in the art will recognize that the disclosure comprises a large number of additional novel aspects, as described herein.

One aspect of the disclosure may be a function that can be used instead of the iterated hash function used, for example, in Solana™, thereby replacing a typically very large number of function evaluations with a typically much smaller number of function evaluations for all validators. In one example usage, the input to the function, which we refer to as F, may be a value V1, and the output may be a value V2, where V2=V1|DIFFICULTY|EVENT|NONCE, wherein | denotes concatenation. The value EVENT will be explained later; the value NONCE may be a value chosen such that trunc_DIFFICULTY(h(V2))=trunc_DIFFICULTY(V1); where trunc_DIFFICULTY truncates its input to the last DIFFICULTY number of bits, and h may be a cryptographic hash function, such as SHA256. For example, if DIFFICULTY=5, then V2 may be a valid output of F if the five last bits of V2 matches the five last bits of V1 and V2 may be of the format V2=V1|DIFFICULTY|EVENT|NONCE for some values for EVENT and NONCE. A miner can generate V2 from V1 by selecting appropriate values for DIFFICULTY and EVENT, as described below, and iteratively trying different values for NONCE until the resulting value V2 satisfies the constraints described above. This may be illustrated in FIG. 19. We may refer to (V1,V2) as a link in the chain associated with a hardness level defined by the parameter named DIFFICULTY. The inclusion of the value V1, and/or parts thereof, in V2 helps protect against dictionary attacks in which an adversary precomputes a dictionary of values that comprise valid input/output pairs with respect to the function F, in order to later use this dictionary of pairs to speed up computation. This may be made infeasible by the fact that the values, such as V1 and V2, are so long that this may be not practically meaningful.

A validator can determine whether V2 may be a correct output of the function F, where F may be given input V1, in a manner that typically requires significantly less effort than expended by the miner. Namely, the validator, provided V1 and V2 can simply verify whether V2 may be of the format V2=V1|DIFFICULTY|EVENT|NONCE and trunc_DIFFICULTY(h(V2))=trunc_DIFFICULTY(V1). If these relationships hold, then the validators accept the chain link starting with V1 and ending with V2.

The value EVENT describes an event that has taken place, and may, for example, be represented by h(ledger_contents) where ledger_contents comprises one or more ledger entries. EVENT may also contain candidate transaction information, which, when validated by the validator, will become a permanent record on the blockchain. If there are no ledger contents for a particular time period, then EVENT may be set to a value NULL, which may be the empty string and/or a value such as h("no new entries"), and/or data and/or seed information from prior transactions as evidence of a recorded direction of time as may be common with PoH consensus mechanisms. EVENT may also comprise the transaction description.

A miner generates a chain of values of the type described above. For example, using V1 as a starting point, the miner may compute V2=F(V1) as described above. The miner then computes V3=F(V2), V4=F(V3), etc. In this example, all the values in the series (V1, V2, V3, V4), which we refer to as a chain segment, are associated with the same level of hardness, where the hardness may be represented by the value DIFFICULTY. Provided the chain segment (V1, V2, V3, V4), a validator can verify the chain validity by performing three validations of the type described for V2 in the above.

The use of the parameter DIFFICULTY will be explained next. This parameter controls the estimated number of iterations a miner would have to perform to generate a valid output using the function F. However, as seen above, it does not affect the amount of work needed by a validator to verify the validity of a chain link, such as (V1, V2) and/or (V2, V3). A miner may perform multiple evaluations of F in parallel, and/or using a round-robin method. A miner may also, upon receiving a new ledger entry and computing the associated value EVENT attempt to time-stamp this using a high-difficulty chain (such as chain A in our example), and then, e.g., after a fixed time quanta of trying, shift to a lower-difficulty chain (such as chain B). This may be desirable since a successful time-stamping in a high-difficulty chain may be given priority over a successful time-stamping in a lower-difficulty chain. In an alternative strategy, the miner may start with low-difficulty chains since these are more likely to succeed; this results in a lower expected computational load for the miner, but at the potential cost of causing the chain to be longer, which causes an increase in the computational cost for the validators. Various strategies can be maintained and used as needed, e.g., based on the workload of the miner and/or the computational demands on the available validators.

For example, the miner may generate one chain, which we refer to as chain A, using DIFFICULTY=24, another chain, which we refer to as chain B, using DIFFICULTY=12, and a third chain, which we call chain C, using DIFFICULTY=8. These can be set in an arbitrary fashion, e.g., using integer assignments, but for denotational simplicity we let chain A have a larger value for DIFFICULTY than chain B, which in turn may be larger than that of chain C.

For the configuration described above, the probability that a given value NONCE for chain A will cause a prospective output, such as V2, to be considered valid may be 2-24, i.e., two to the power of minus 24, and/or one in approximately 16 million. However, a value NONCE for chain B will cause a valid output with probability 2-12, and/or one in 4096, and a value NONCE for chain C will cause a valid output with probability of 2-8, and/or one in 256.

The chains may initially use the same starting value, which we may denote as V1A=V1B=V1C. From this, the miner generates chain links for each of the chains. Since each of the chains use different values of DIFFICULTY, they have different estimated efforts associated with them, where it may be much more likely that a link for chain C will be find than that a chain link for chain B will be found, which in turn may be much more likely than a chain link for chain A may be found.

If a value may be found for chain A, then all chains are synchronized again. For example, if this new value may be V4A, corresponding to a chain (V1A, V2A, V3A, V4A), then the computation of the next link for all chains may be started with the input V4A, meaning that the previously computed chain portions for chain B and C are abandoned. If a value may be found for chain B, but not for chain A, then the starting value for chain C may be set to be that new value. However, the computation of chain A may be not affected. More generally, we may have more than three parallel chains, e.g., N different chains, where N=10 may be one possible parametrization. When a new value may be found for one chain, then any chain with a smaller DIFFICULTY value may be synchronized, by setting its starting point to the newly computed value. However, the chains with greater DIFFICULTY value are not affected, and their computation continues using their current state. This may be illustrated in FIG. 20. If two chains both have successful time-stamping at the same time, then the element from the chain with the highest value of DIFFICULTY may be selected.

If an EVENT other than NULL may be observed at some point, then all the computations use this new value of EVENT for the computation of their next link. If multiple EVENTs are observed at the same time, the value EVENT will reflect this collection of values, as described above.

We say that an EVENT other than NULL gets time-stamped when it may be an input to the successful computation of a chain link, such as, for example, a link in the chain C above. In one configuration of the disclosed technology, there may be a counter that may be initially set to 0. We may refer to this counter as CNT. When an EVENT may be time-stamped, the counter CNT may be increased by 1. In another embodiment, it gets increased by a value that corresponds to the number of ledger entries corresponding to EVENT. If CNT exceeds a threshold referred to as CLUSTERSIZE, then CNT may be set to 0 and all chains get synchronized to the most recently computed chain link value of the chain associated with the most recent time-stamping. That is, if a non-NULL event takes place and there may be a successful time-stamping for chain B, resulting in an output value such as V87C, then the input value for the computation of F for all chains may be set to the value of V87C.

In one example configuration in which CLUSTERSIZE=1, each time there may be a time-stamping event, the chains get synchronized to the associated output value that was computed, resulting in the time-stamping.

In an alternative example configuration where CLUSTERSIZE=16, the computation of each chain with a higher DIFFICULTY value proceeds without synchronization after a successful time-stamping on a chain with lower DIFFICULTY value. However, chains with lower DIFFICULTY value than that at which the time-stamping took place are automatically synchronized to the chain with the successful time-stamping. As a concrete example, consider a case where EVENT may be successfully time-stamped on chain B, leading to a value CNT that may be less than CLUSTERSIZE. Chain A may be not synchronized with chain B, but chain C may be synchronized with chain B. We refer to the chains that do not get synchronized as "behind", as opposed to being "synchronized". The value CLUSTERSIZE indicates just how much a chain may be allowed to be behind. Chains that are behind have not yet successfully time-stamped EVENT, and for these, the computation proceeds with a new value for EVENT that may be set to a hash of the new combination of ledger entries, including the ledger entries not yet included in a time-stamped EVENT on the chain in question. For a chain that may be synchronized, these ledger entries are not included in the computation of the next value EVENT, but only new ledger entries are included if they have not yet been successfully time-stamped in this chain and/or a chain that has been synchronized with the chain.

Once CNT equals and/or exceeds CLUSTERSIZE, the chains get synchronized to the associated value of the most recent successful time-stamping. Thus, a low value of CLUSTERSIZE, such as CLUSTERSIZE=1, results in the maximum resolution in terms of ordering of events, whereas higher values of CLUSTERSIZE, such as CLUSTERSIZE=16, leads to a higher efficiency for validators in that there may be a greater reliance on chains with high values of DIFFICULTY. This may be due to the greater chance of a chain with a low value of DIFFICULTY leading to a successful time-stamping. Due to that, if the chains synchronize as soon as a successful time-stamping event takes place, this will likely be due to a chain with a low value of DIFFICULTY. In contrast, when CLUSTERSIZE may be greater, the odds of a chain with higher-value DIFFICULTY increases, given that these are prioritized by the synchronization that always takes place.

The parameters, such as the values for CLUSTERSIZE, DIFFICULTY, and the number of different chains such as chain A, chain B and chain C are used, can be modified over time, e.g., by agreement among a set of participants that may comprise the miner and the validators. The modification of the parameters can be made in response to a rate of incoming transactions and/or the speed of mining, e.g., the time between two consecutive time-stampings and the value DIFFICULTY associated with the generated chain element. Example distributed methods to compute parameters are disclosed in co-pending U.S. patent application Ser. No. 17/810,085, titled "Distributed Ledgers with Ledger Entries Containing Redactable Payloads," filed Jun. 30, 2022, incorporated herein in its entirety.

In the co-pending U.S. Provisional Patent Application No. 63/383,217, titled "Green Proof of Stake," filed Nov. 10, 2022, incorporated herein in its entirety, the notion of using NFTs for purposes of staking was disclosed. That technology may be compatible with the optimization methods disclosed herein.

FIGURES

Figure 19:
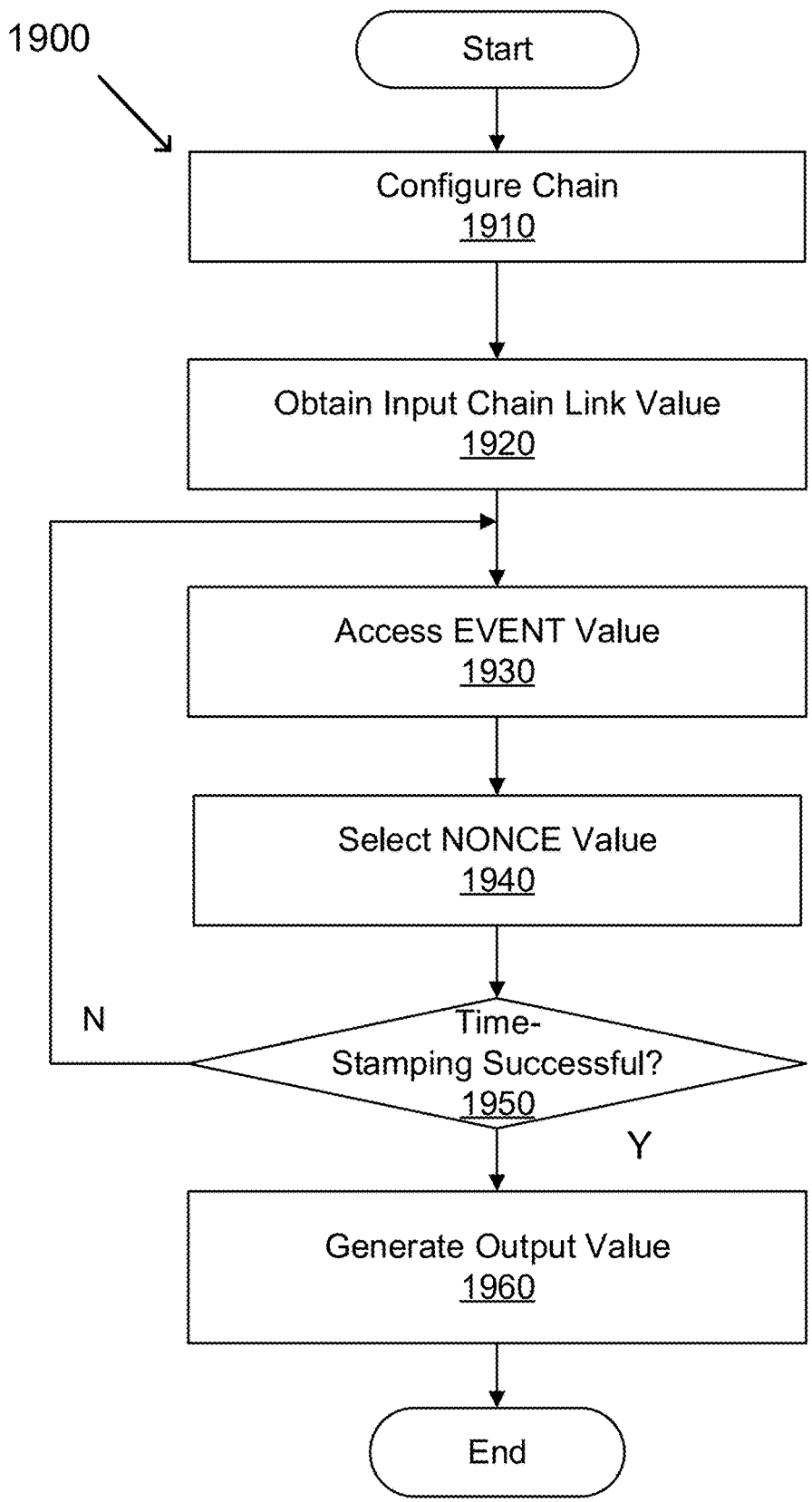
FIG. 19 conceptually illustrates a process followed by miners operating in accordance with many embodiments of the invention.

FIG. 19 illustrates the mining process, in which a miner determines a valid output to a function F. In step 1910, a chain may be configured, e.g., a value DIFFICULTY may be associated with the chain. In step 1920, an input chain link value may be received. An example input chain link value may be the value V1A. In step 1930, an EVENT value may be accessed. EVENT may be NULL and/or it may comprise a hash of a collection of ledger entries, each one of which may correspond to one or more transactions. In step 1940, a value NONCE may be selected; this may be selected by increasing a previously used value NONCE from a prior iteration, and/or by choosing a pseudo-random value. In step 1950, it may be determined whether the value NONCE results in a successful time-stamping associated with the value EVENT, e.g. by determining whether one or more equations hold. For example, it can be determined whether trunc_DIFFICULTY(h(V2))=trunc_DIFFICULTY(V1) for V2=V1|DIFFICULTY|EVENT|NONCE. If these equations hold, then the time-stamping event may be considered successful and the processing continues to step 1960; otherwise, it goes to step 1920, where it may be determined whether EVENT has changed due to the submission of a new ledger entry. In step 1960, an output value may be generated, e.g., the value V2 described in step 1940. This may be then used as the next input chain link value in step 1910, as the computation proceeds. This may be a simplified description of the processing, and additional details are provided below.

Figure 20:
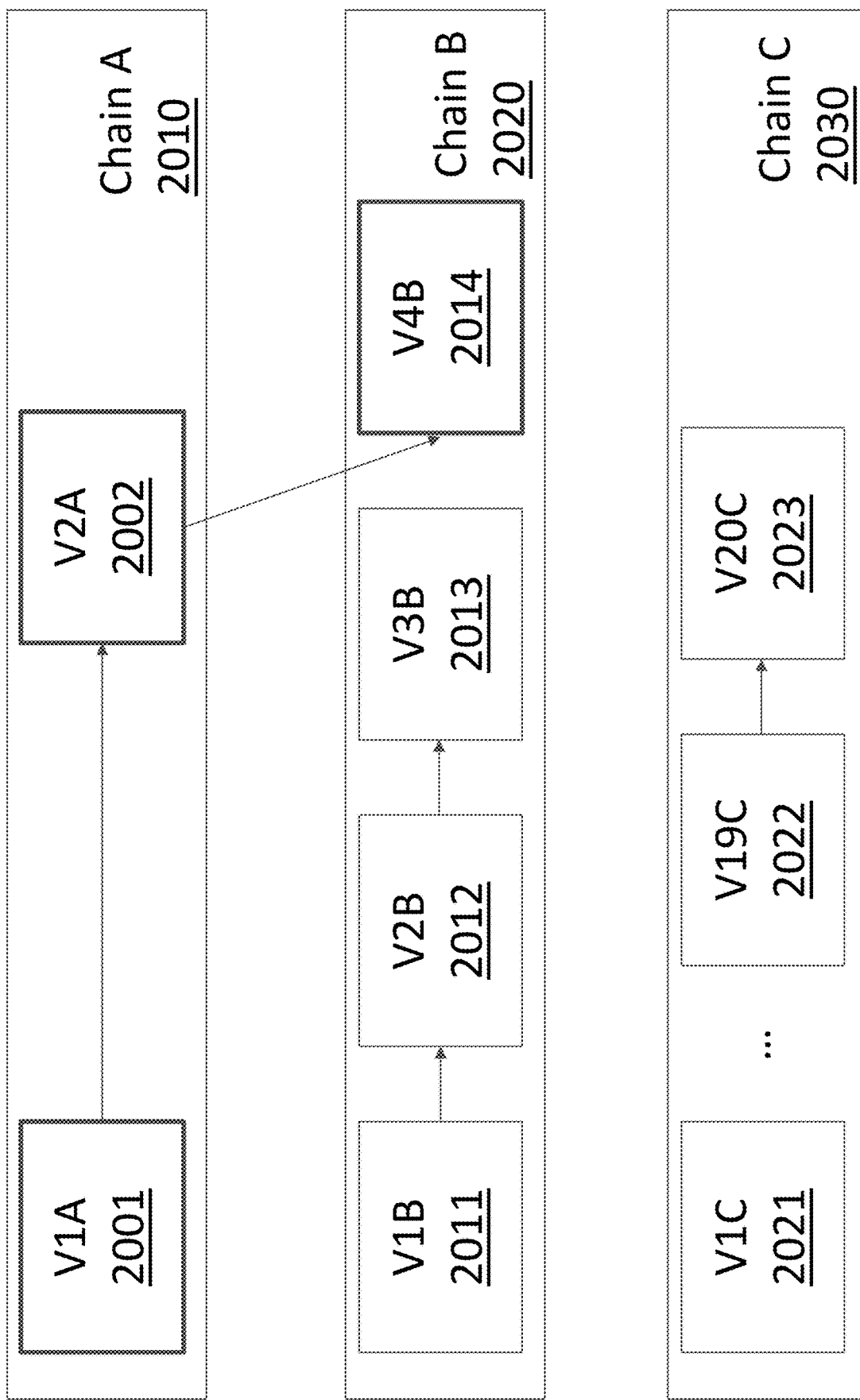
FIG. 20 illustrates a synchronization system implemented in accordance with some embodiments of the invention.
Figure 22:
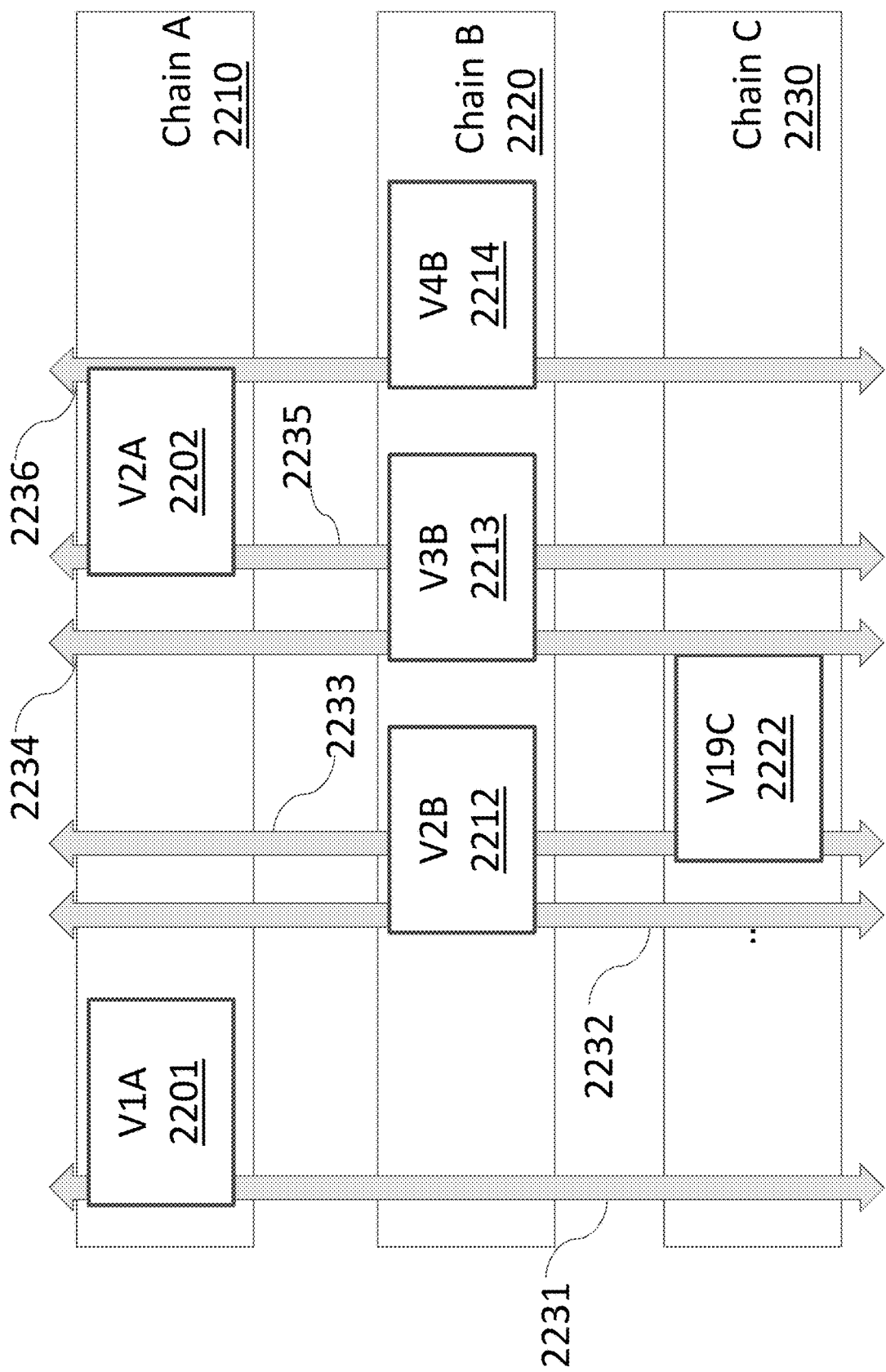
FIGS. 22-23 illustrate the synchronization of blockchains of various sizes in accordance with multiple embodiments of the invention.
Figure 23:
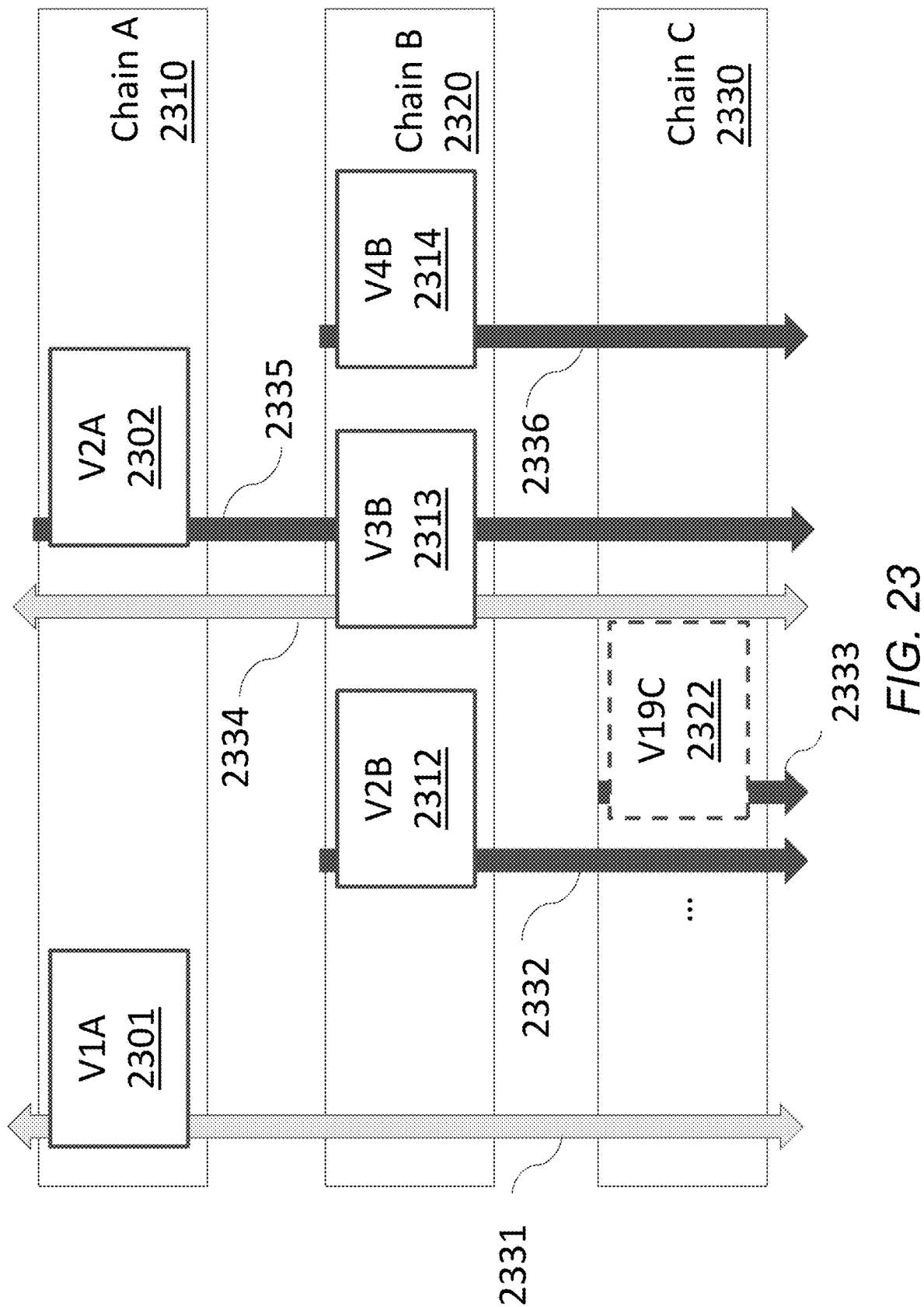

FIG. 20 illustrates the synchronization of chains B and C to chain A when chain A successfully time-stamps EVENT, which may be the NULL event. In this figure, time flows from left to right. Chain A 2010 at first comprises only one value, namely V1A 2001. Chain B 2020 at first comprises only one value, namely V1B 2011. Chain C 2030 at first comprises only one value, namely V1C 2021. At one point in time, chain B 2020 has a successful time-stamping event, causing V2B 2012 to be computed from V1B 2011, and a synchronization (not shown) with chain C 2030. At a later time, chain B 2020 has a second successful time-stamping event, causing V3B 2013 to be computed from V2B 2012, and synchronized to chain C 2030, shown by the arrow from V2B 2012 to V19C 2022, which means that the input value later used to compute V1 9C 2022 may be set to V2B 2012. There may have been several successful time-stamping events on chain C 2030 prior to this, but these are not shown here. At a later time, there may be a successful time-stamping event on chain A 2010, causing V2A 2002 to be computed from V1A 2001, and synchronized to chain B 2020 (described next) and to chain 2020 (not shown for visual simplicity). The synchronization to chain B 2020 means that the value V2A 2002 may be copied to the input value used to compute V4B 2014. Next, chain B 2020 has a successful time-stamping event, at which time V4B 2014 may be generated. The chain segment comprises the bolded elements, namely V1A 2001, V2A 2002, and V4B 2014. In this illustrative example, it does not contain any other element from chain B 2020 and/or from chain C 2030. The values V1A 2001, V2A 2002, and V4B 2014 are output, one by one and provided to validators. A more complex process may be used when the successful time-stamping may be not taking place on the chain with the greatest value DIFFICULTY, as illustrated in FIGS. 22 and 23.

Figure 21A:
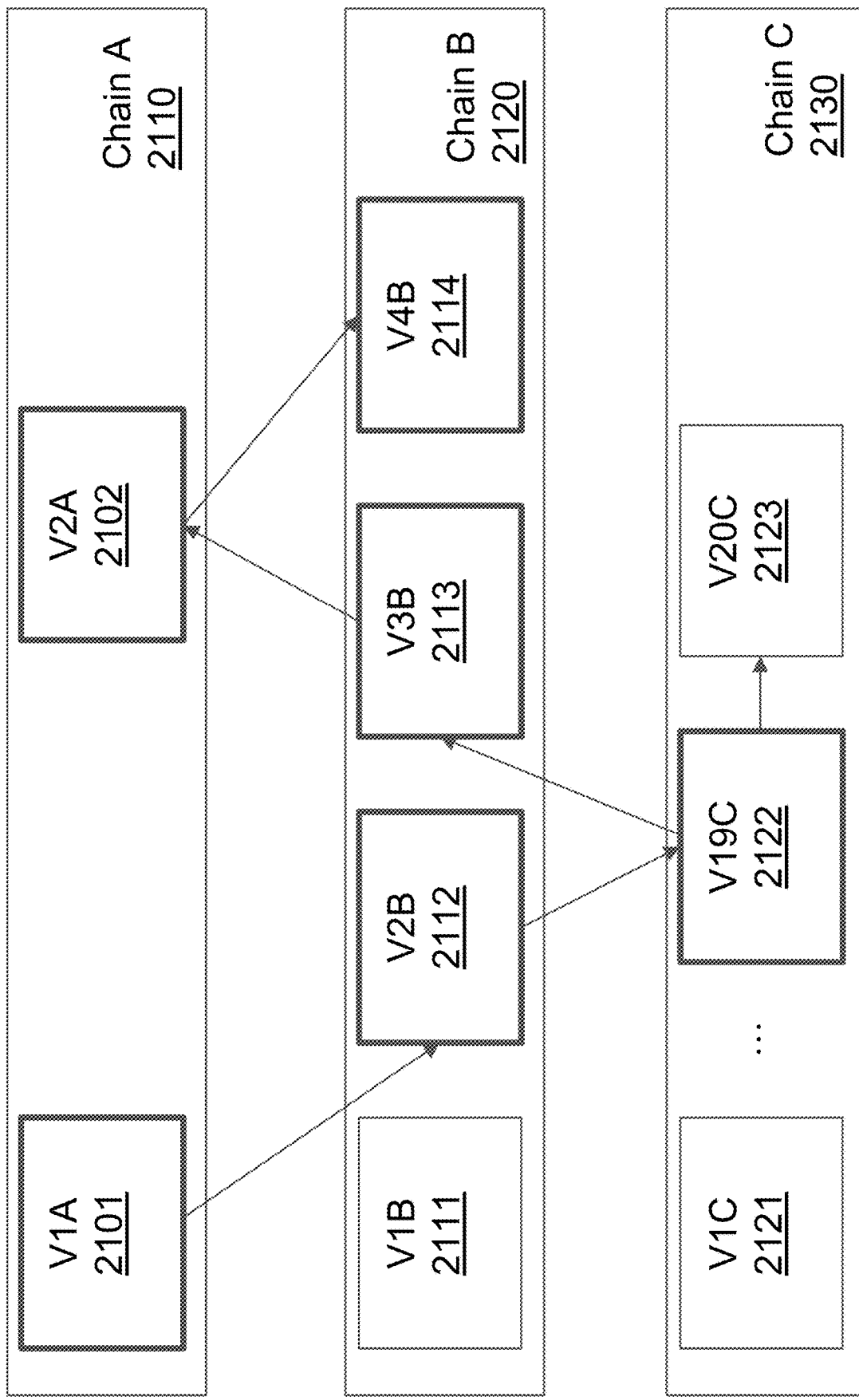
FIGS. 21A-21C illustrate the generation and use of blockchain links utilized in accordance with certain embodiments of the invention.
Figure 21B:
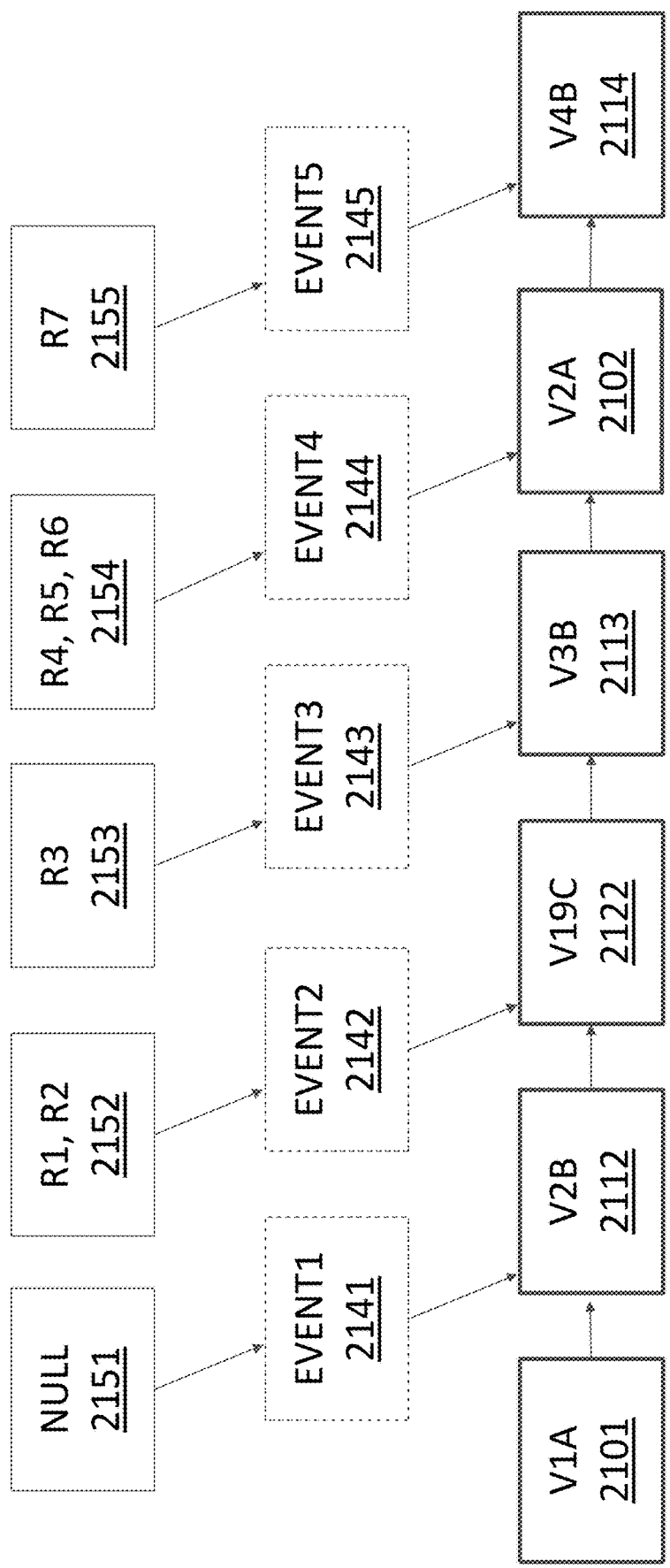
Figure 25:
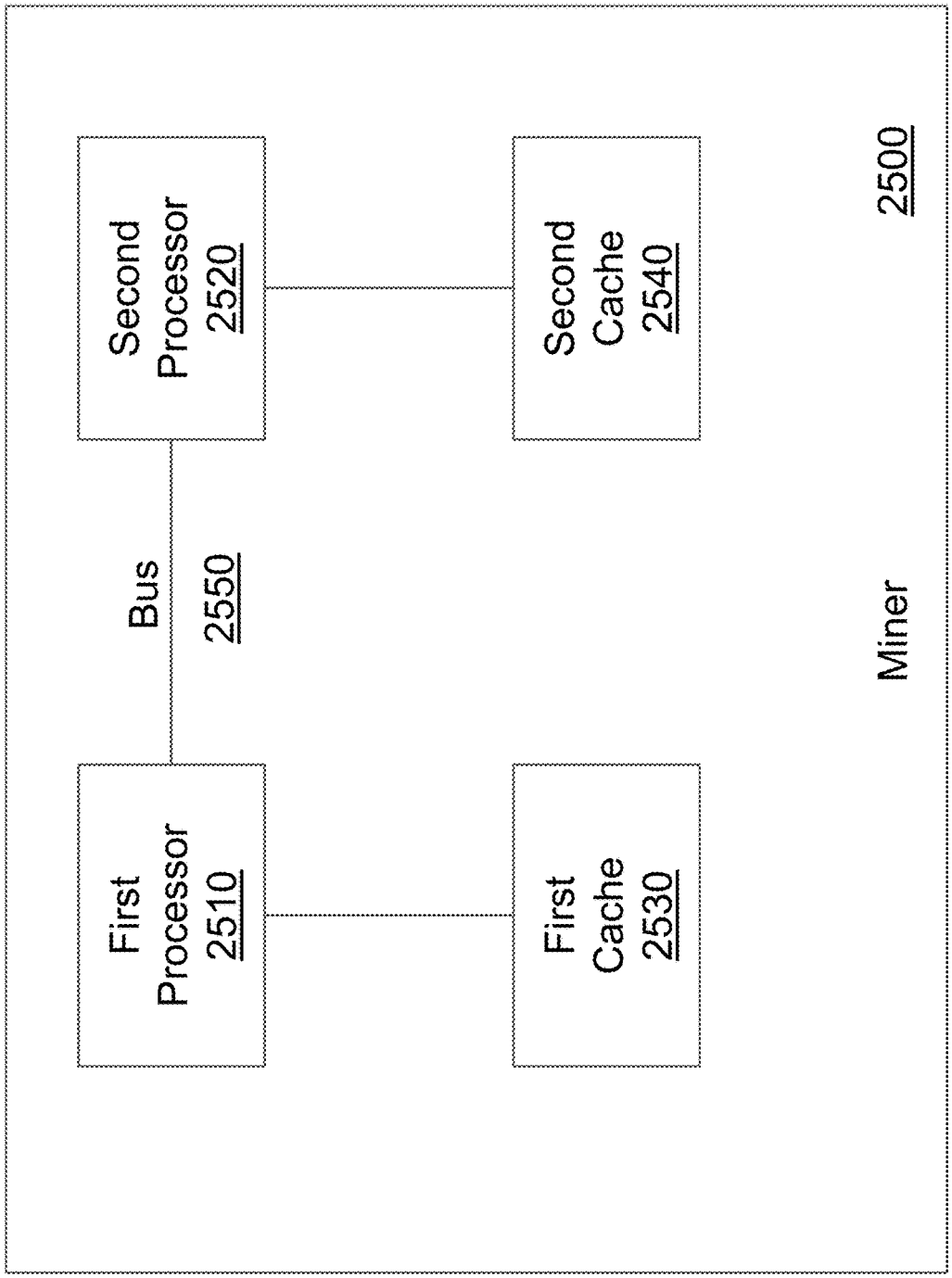
FIG. 25 illustrates a miner system operating in accordance with some embodiments of the invention.

FIG. 21A shows a chain created as a result of the generation of a series of valid chain links. The chain comprises the chain elements in bold, namely V1A 2101, V2B 2112, V19C 2122, V3B 2113, V2A 2102 and V4B 2114. This sequence of chain elements, and the associated EVENT values, will be output by the one or more miners generating the sequence from the originating chains, chain A 2110, chain B 2120 and chain C 2130. Here, the input value to the function F generating V2B 2112 comprised V1A 2101, the input value to the function F generating V1 9C 2122 comprised V2B 2112, the input value to the function F generating V3B 2113 comprised V19C 2122, the input value to the function F generating V2A 2102 comprised V3B 2113, and the input value to the function F generating V4B 2114 comprised V2A 2102. FIG. 21B shows the generated chain from the perspective of the validators. Chain A 2110 may be generated by a first processor, while chain B 2120 and chain C 2130 may be generated by a second processor, as illustrated in FIG. 25.

Figure 24:
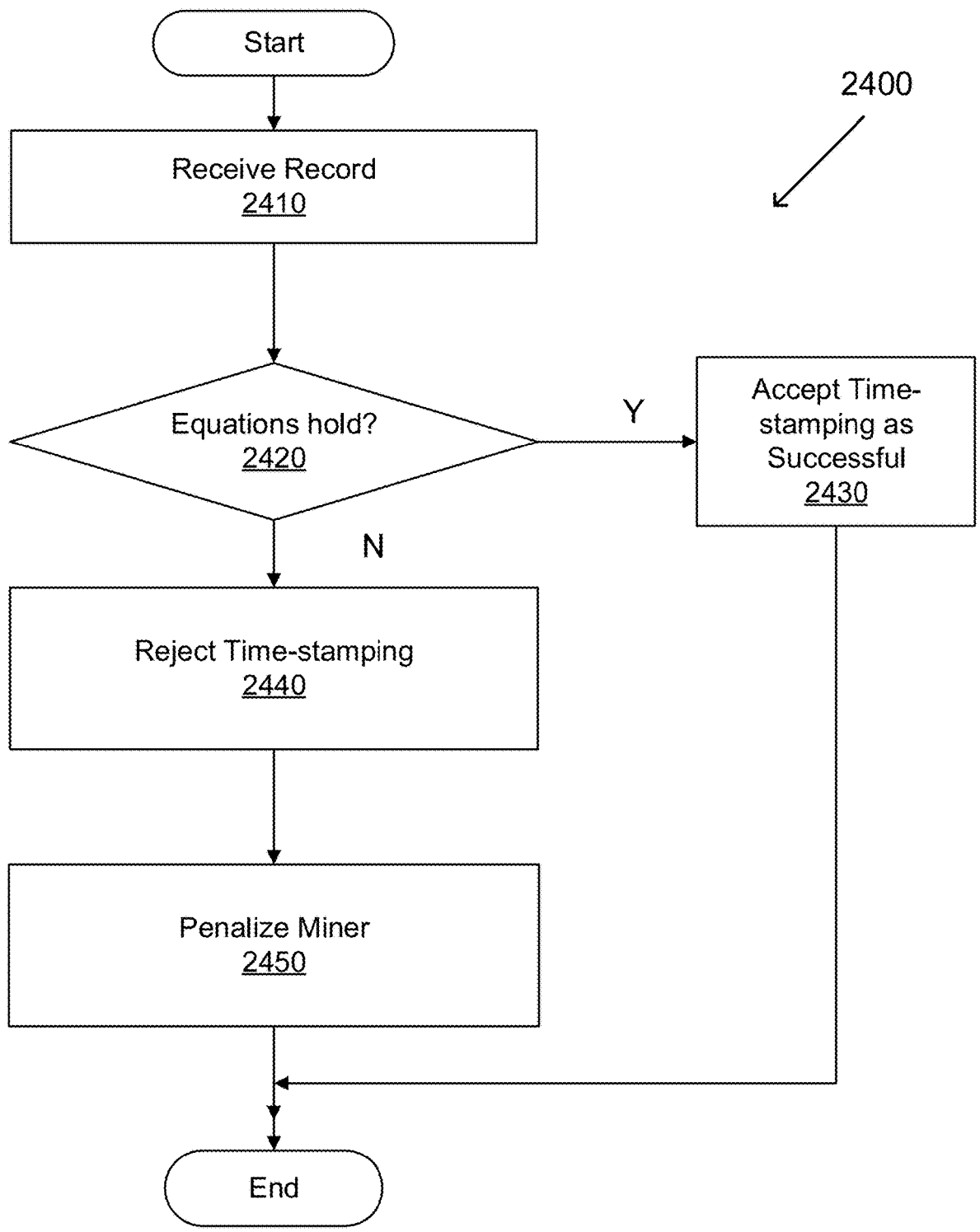
FIG. 24 conceptually illustrates the operation of a validator configured in accordance with numerous embodiments of the invention.

FIG. 21B illustrates the chain generated in FIG. 21A, from the perspective of a validator. The chain value V1A 2101 was already known by the validator. The validator may be first provided with the ledger entries NULL 2151 and the value V2B 2112. The validator computes EVENT1 2141 from ledger entries NULL 2151 and verifies value V2B 2112. The validator may be then provided with the ledger entries (R1, R2) 2152 and the value V1 9C 2122. The validator computes EVENT2 2142 from ledger entries (R1, R2) 2152 and verifies value V19C 2122. At a later time, it may be provided with the ledger entries R3 2153 and the value V3B 2113. The validator computes EVENT3 2143 from ledger entries R3 2153 and verifies value V3B 2113. The validator may be provided with the ledger entries (R4, R5, R6) 2154 and the value V2A 2102. The validator computes EVENT4 2144 from ledger entries (R4, R5, R6) 2154 and verifies value V2A 2102. Then the validator may be provided with the ledger entries R7 2155 and the value V4B 2114. The validator computes EVENT5 2145 from ledger entries R7 2155 and verifies value V4B 2114. The verifications may be performed as illustrated in FIG. 24. The validators may have the same design as the miner, shown in FIG. 25. The ledger entries may correspond to transactions. For example, R1 which may be part of ledger entries (R1, R2) 2152 may represent one transaction, R2 another, and ledger entries R3 2153 a third transaction.

Figure 21C:
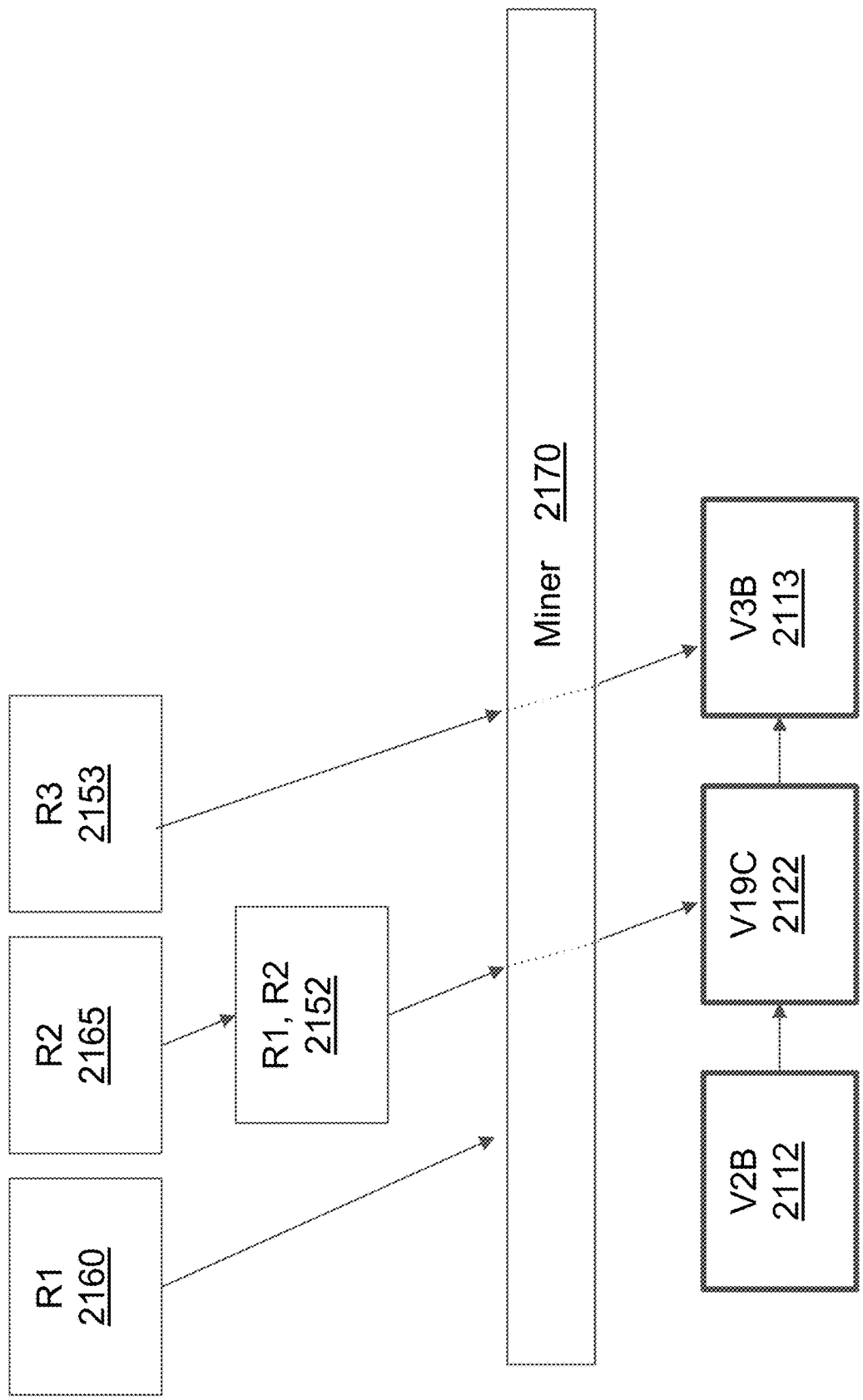

FIG. 21C illustrates an example use of the technology. Transaction records R1 2160, R2 2165 and R3 2153 are recorded on a blockchain, in that order. R1 2160 may be provided as input to miner 2170 at a time when V2B 2112 may be the most recently generated chain element. Miner 2170 does not successfully perform time-stamping of R1 2160 for some amount of time, and then transaction record R2 2165 may be placed on the blockchain. Since R1 2160 has not yet been time-stamped, R1 2160 and R2 2165 are combined to form (R1, R2) 2152, which may be used as an input to the miner 2170. Miner 2170 successfully time-stamps the corresponding value EVENT (not shown), thereby time-stamping R1 2160 and R2 2165, generating chain value V19C 2122. Later on, record R3 2153 may be placed on the blockchain ledger and may be used as input by miner 2170, which produces chain element V3B 2113 as a result. This figure may be slightly simplified, as different chains such as chain A 2310, chain B 2320 and chain C 2330 may use different states for EVENT, based on what input records, such as R1 2160, R2 2165 and R3 2153, have been time-stamped on the corresponding chains such as chain A 2310, chain B 2320 and chain C 2330. The values for EVENT for the different chains are synchronized every time there may be an up-and-down synchronization such as synchronization 2334, but only downwards in response to a down-chain such as synchronization 2332, which leaves chain A 2310 with a different state for EVENT than chain B 2320 and chain C 2330 will have.

FIG. 22 illustrates the synchronization of chains when CLUSTERSIZE=1. Here, every successful time-stamping causes synchronization both up and down, where up corresponds to synchronization to chains with bigger values of DIFFICULTY, and down the opposite. In particular, the successful time-stamping corresponding to the generation of V1A 2201 of chain A 2210 causes synchronization 2231 to chain B 2220 and chain C 2230; the successful time-stamping corresponding to the generation of V2B 2212 of chain B 2220 causes synchronization 2232 to chain A 2210 and chain C 2230; the successful time-stamping corresponding to the generation of V19C 2222 of chain C 2230 causes synchronization 2233 to chain A 2210 and chain B 2220; the successful time-stamping corresponding to the generation of V3B 2213 of chain B 2220 causes synchronization 2234 to chain A 2210 and chain C 2230; the successful time-stamping corresponding to the generation of V2A 2202 of chain A 2210 causes synchronization 2235 to chain B 2220 and chain C 2230; and the successful time-stamping corresponding to the generation of V4B 2214 of chain B 2220 causes synchronization 2236 to chain A 2210 and chain C 2230. Here, the synchronization 2236 to chain A, for example, means that the next element in chain A will be computed using the state associated with V4B 2214 as its input, along with a value EVENT and a value NONCE.

FIG. 23 illustrates the synchronization of chains when CLUSTERSIZE=3. Synchronizations that go both up and down are shown using a light grey up-and-down arrow, as in FIG. 22, whereas downward-only synchronizations are shown in a dark grey down arrow, such as synchronization 2332. Here, every successful time-stamping causes the counter CNT to increase by one, and when it reaches and/or exceeds CLUSTERSIZE, i.e., 3 in this example, then CNT may be reset to 0. Each time CNT may be reset, an up-and-down synchronization may be performed; for successful time-stampings where CNT may be not reset, a downward-only synchronization may be performed.

In particular, the successful time-stamping corresponding to the generation of V1A 2301 of chain A 2310 causes synchronization 2331 to chain B 2320 and chain C 2330. The successful time-stamping corresponding to the generation of V2B 2312 of chain B 2320 causes synchronization 2332 to chain C 2330, but not to chain A 2310. Therefore, should there have been a time-stamping on chain A 2310 right after synchronization 2332, the time-stamping on chain A 2310 would have caused element V2B 2312 to be ignored, as the resulting time-stamping element would have included the ledger entry that was the input to V2B 2312. However, that does not take place in this example. The successful time-stamping corresponding to the generation of V19C 2322 of chain C 2330 causes downward synchronization 2333. Since there are no downward chains, there may be no actual synchronization taking place. Also, since the successful time-stamping corresponding to the generation of V3B 2313 of chain B 2320 does not depend on the state associated with V1 9C 2322 of chain C 2330, that effectively removes V19C 2322 from the output, as V3B 2313 of chain B 2320 will incorporate the ledger entries time-stamped in V19C 2322. We therefore mark V3B 2313 with a dotted line to indicate that it may be excluded from the output chain. Synchronization 2334 may be both up and down since the value CNT exceeded CLUSTERSIZE and was, accordingly, reset. The synchronization 2334 may be both to chain A 2310 and chain C 2330. The successful time-stamping corresponding to the generation of V2A 2302 of chain A 2310 causes synchronization 2335 to chain B 2320 and chain C 2330; and the successful time-stamping corresponding to the generation of V4B 2314 of chain B 2320 causes synchronization 2336 to chain C 2330, but not to A 2310. A validator may receive the sequence of values associated with V1A 2301, then V2B 2312, then with V1 9C 2322. The validator knows the value of CNT and CLUSTERSIZE and will therefore exclude V19C 2322 from the chain once V3B 2313 may be received. If V3B 2313 may be received before V19C 2322 has been verified, V19C 2322 can be removed without first being verified. The validator will later receive V2A 2302 and then V4B 2314.

FIG. 24 illustrates the work of the validators. A validator can verify V2A using the value V1A and the value EVENT provided as input in the computation of V2A. Similarly, V4B can be verified by a validator provided with V2A and the value EVENT provided as input to the computation of V4B. For example, in step 2410, the validator may receive record R1 and record R2. The hash of R1 and R2 may be the value EVENT provided as input for the computation of V2A. Here, record R1 and record R2 may be two records placed on the ledger between the time of the generation of V1A and V2A. In step 2420, the validator verifies the same equations described in step 1950; if these equations hold, then the computation continues to step 2430, otherwise to step 2440. In step 2430, the validator accepts the time-stamping of R1 and R2 to be successful. In step 2440, the validator rejects the time-stamping of R1 and R2. Further, in step 2450, the validator moves to penalize the miner in response to the rejection. The penalty may be to take away part of the miner's stake, for example. Similarly, the value EVENT provided as input for the computation of V4B may be a hash of the record R3, which may be a record placed on the ledger after the successful time-stamping of the value generated from R1 and R2. Thus, as the validators approve the values V2A and V4B, they establish that they agree that R1 and R2 took place before R3 did.

FIG. 25 illustrates a miner 2500 comprising a first processor 2510 with associated cache 2530, and a second processor 2520 with associated cache 2540, where the first processor 2510 and the second processor 2520 are connected using a bus 2550. The miner may be also connected to a network (not shown) to which validators (also not shown) are also connected.

C. Systems and Methods for Token-Based Tradable Proof of Work in NFT Platforms

Methods in accordance with some embodiments of the invention may involve hybrid systems, whereby the right to submit the next block to the chain relies on a proof-of-stake algorithm, but in which the asset used to stake such a claim may be no longer the underlying native cryptocurrency of the blockchain and/or some otherwise utility-less token, but instead may be evidence of work conducted. That is, a token forming a record generated and updated through proof-of-work is disclosed. Just as gold acts as a "battery for value", the token acts as a "battery for proof-of-work". A number of different implementations and parameterizations of the solution are presented in order to further illustrate the strengths of the proposed system.

The generation of tokens that represent a storage of work committed to their generation in a manner that allows the conducted work to be verified at any later date enables the creation of markets for the subsequent trading of the work in a more efficient manner, as it removes the immediacy of current sales of available resources in the form of mining hardware and energy to power the hardware. An inherent ability to perform work when energy resources are plentiful instead of during peak demands may be beneficial to society, as shown, for example, by solar power used to store electricity in a battery, and/or wind power used to pump water up into a reservoir.

Furthermore, the generation of tokens representing storage of work allows for the creation of derivative products based on the underlying assets and the history of their production in an analogous manner to commodities markets and their derivative markets. Tokens representing proof-of-work may be stored, staked, used as loan collateral, conglomerated and/or merged, split, and/or traded using futures and/or options contracts.

In one variant of the disclosed technology, the token indicating an effort may, for example, depend on a proof of memory instead of depending on a proof of work. Proof of memory may be also referred to as proof of space. One example of such a technology is disclosed in a co-pending U.S. patent application Ser. No. 16/743,503, titled "Robust and Secure Proof of Space Based Mining," filed Jan. 15, 2020, incorporated herein in its entirety. Moreover, the token may depend on hybrids of mining paradigms, such as disclosed in co-pending U.S. patent application Ser. No. 17/806,060, titled "Composite Cryptographic Systems with Variable Configuration Parameters and Memory Bound Functions," filed on Jun. 8, 2022. In one embodiment, the token may comprise a collection of proofs of various types, and/or a collection of tokens selected according to a formula that may be determined by the markets of proofs of different types, with their relative value being set by their relative ease of mining.

In another variant of the disclosed technology, the token may, for example, depend on a proof of disk space. A blockchain relying on a proof of disk space protocol may at regular intervals publish a challenge that may be computationally impossible with current computing resources to calculate a response to within a limited period of time, and subsequently publishing the response on the blockchain without extensive look-up tables stored on a hard drive and/or solid-state drive. A record of a number of correct responses to challenges made may be recorded against a token on the blockchain. Whereas the results of current proof of space resource locking may only be utilized by a first party tying up their own hard drives and/or solid state drives, with the token disclosed in this paragraph, the party may subsequently sell, rent, and/or gift the token to a second party, who may then benefit from the results of the disk space owned by the first party being committed to proof of disk space without the first party needing to transfer the physical hard drives and/or solid state drives.

In one embodiment, a first participant may commence actions by issuing and/or minting a token with an identifier, subsequently referred to as a proof token. The identifier may be generated randomly, and/or may be generated from a key derivation function taking as input parameters one or more of: a permanent identifier of the first participant, a timestamp, a block height, prior data retrieved from blocks forming part and/or all of the blockchain, and/or one or more hash functions digests of some and/or all of the preceding inputs. Subsequently the first participant may perform proof-of-work and/or some other proof of effort and/or resource allocation. In an exemplary implementation provided for illustration only and not intended to be limiting, the first participant may engage in proof-of-work activity using repeated hash calculations on the identifier combined with a set of nonces, using a hash function, to obtain a resulting hash digest. For example, the hash function may comprise SHA256 and/or BLAKE, the set of nonces may comprise the natural numbers, and the algorithm for combining the identifier and each nonce may comprise a logical XOR operation on the identifier and each nonce. A measure of the success of the proof-of-work may then be determined, and may comprise one or more of: the number of leading zero and/or one bits of the resulting hash digest, the number of trailing zero and/or one bits of the resulting hash digest, the number of bits the resulting hash digest has in common with the identifier, the number of bits the resulting hash digest has in common with the nonce, and/or some other quantifiable measure. A result may be valid for a duration that may be determined by the quantifiable measure, with a result that has higher quality may be valid for longer than a result with a lower quality, and wherein a valid result can be exchanged for a coin if it may be valid and meets additional criteria, such as solving a problem that may be specified by a second participant providing input problems to be solved. Higher quality may also correspond to a determination of a higher associated security in the context where the result may be used, e.g., exchanged for the right to stake, exchanged for a coin, and/or exchanged for another token. Instead of users paying higher gas fees during times of higher congestion, they may pay higher gas fees for the use of higher quality measures associated with tokens used for staking. This can encourage a marketplace for exchange of tokens based on bidding among users paying gas fees.

The measure of the success of the proof-of-work and some and/or all of the input parameters may subsequently be announced on the blockchain. This enables a plurality of participants maintaining and extending the blockchain to determine the quality and/or validity of the proof-of-work token and to calculate a probabilistic measure of the amount of proof-of-work that has been conducted on the proof-of-work token.

The first participant may subsequently hold the token, trade the token, and/or use the token to participate in a consensus system for the blockchain.

In an embodiment, a holder of the proof-of-work token may submit a next block of transactions for appending to the blockchain along with a transaction burning the proof-of-work token. Burning the token may comprise sending the token to a burning address, for example the zero address, and/or it may comprise some other transaction documented in the protocols of the blockchain as a burning transaction that invalidates any subsequent transactions using and/or referencing the token.

In a second embodiment, a holder of the proof-of-work token may submit a next block of transactions for appending to the blockchain accompanied by a transaction locking the token for a given period of time. The given period of time may be one of: a fixed predetermined period, a period of time proportional and/or inversely proportional to the estimated measure of work conducted on the token, a period of time calculated from the time at which the token was first minted, a period of time calculated from the time at which evidence of the proof-of-work conducted was provided on the blockchain, a period of time that has elapsed since the token was last locked and/or unlocked, and/or some other measure for determining the period of time the token must be locked in order for the next block to be a valid submission to the blockchain.

In some embodiments, the canonical chain of blocks may be determined by nodes on the blockchain operated by the plurality of participants, by comparing a plurality of candidate chains and selecting a successful chain with the most proof-of-work as calculated by the sum of the measures of successes of proof-of-work of the proof-of-work tokens burned and/or locked in the successful chain.

In some embodiments, proof-of-stake tokens for submitting candidate blocks to the blockchain may be obtained by transferring a proof-of-work token to a decentralized exchange smart contract running on the blockchain, and whereby the decentralized exchange mints and issues proof-of-stake tokens in proportion to the proof-of-work conducted on the proof-of-work token. The decentralized exchange may then subsequently burn and/or lock the proof-of-work token.

The disclosed technology enables the off-line creation of proofs, such as proofs of work and proofs of memory, where there may be no immediate need for communication between a miner and the distributed system. Instead, miners may operate offline at times. Moreover, whereas traditional mining requires tie-breaking mechanisms to identify a relative quality of competing solutions, the need for this may be reduced using the disclosed technology. For example, a pool of tentative tokens may be kept, where the pool may be of a fixed size. As a new proof may be submitted, the quality level of this new proof may be assessed and the new proof entered in a sorted list corresponding to the pool. As staking proceeds, the highest quality tokens are selected. Lower quality tokens may be given additional considerations until they are pushed out from the queue associated with the disclosed pool. A miner may not submit a proof whose quality measure falls below the current minimum quality level of the last proof in the queue, but may choose to hold on to this proof in the hope that the minimum level will change onwards. By not submitting the proof until it may be qualified to be entered in the queue leads to a collective reduction of verification effort.

In some example uses, the tokens disclosed herein do not need to be generated from inputs to a ledger. The tokens, whether proofs of work, proofs of space, and/or a combination of these, are simply used as proofs of scarce resources and/or capabilities, and do not need to take as input a list of events posted on a ledger. The closing of a ledger would be done using consensus among a limited number of parties (the plurality of participants) who have staked sufficient resources to be allowed this role. These parties may be the same as the ones generating the tokens, and/or they may have acquired the tokens from miners and/or token marketplaces. This optionally frees the mining effort from having an on-line connectivity requirement, again introducing additional flexibility into the system. A miner may use a fixed input as the challenge from which it performs mining of tokens, and/or it may use a predictable value, such as an indicator of time. If an indicator of time may be used, that may be another aspect of the token, and may be used to "flush out" old tokens from the queue associated with the pool of potential solutions. For example, a subset of members of the plurality of participants managing this pool may specify that no token may have a time in the future, and no token may have a time that may be more than 1 week in the past. That automatically flushes the queue to provide new opportunities for new miners, but without placing severe constraints on the miners having to be online. Alternatively, every day and/or every passing of an other predetermined period of time, a new challenge element can be generated, e.g., as a hash of all the tokens in the pool at the time of a new day in a specified time zone and/or a hash of some and/or all of the data content of a predetermined number of prior blocks appended to the blockchain, where this challenge may be concatenated with a time element and/or a counter and used as input to the miners. Each miner may, additionally, have a different state that provides one miner with the ability to find a solution to a proof whereas another miner may not be able to. For a proof of work, that input may be a random number. For a proof of space it may be a commitment to a graph representing the proof of space. One example of such a graph is disclosed in U.S. Pat. No. 11,017,036, titled "Publicly Verifiable Proofs of Space," filed Mar. 14, 2019 and issued May 25, 2021, incorporated by reference in its entirety.

In one embodiment, the proof of work may be the generation of an algorithm, the training of an artificial intelligence (AI) agent in a reinforcement learning environment, the training of a machine learning (ML) algorithm, the selection of parameters that optimizes a yield, the factorization of a large integer, etc. A first party can pose a problem, for instance this could entail providing a dataset and a problem statement related to the dataset, providing an untrained and/or partially trained neural network architecture with a training dataset, providing an AI simulation environment such as an "AI gym" and potentially also an architecture for an untrained and/or partially trained AI agent, providing a function that may be to be minimized and/or maximized as well as potentially constraints on its parameters and/or additional information such as the ability to compute its derivatives and/or estimates thereof. A second party, which we refer to as the miner, may provide a solution. This solution may be an algorithm, a set of parameters, a graph structure and/or set of weights corresponding to a trained neural network, a trained AI agent, etc. Or, the solution may be one or more numbers, for instance in the format of a vector, matrix, and/or tensor, for instance representing the output of a neural network and/or other trained AI and/or machine learning model for a particular set of parameters and/or a particular set of inputs, such as examples in a test dataset. A miner may determine a solution to a problem and post the solution, and the best solution, e.g., the one that satisfies the problem statement the best, may be determined to be the winner. The determination of the best solution may be performed by a measuring function determining a fit, an error rate, a computational effort, the size of the function, the speed with which an acceptable solution may be computed, the performance of an AI agent in a simulation environment, and/or a combination of these, for example. Multiple miners may compete in providing solutions, where the miner with the best solution according to the problem statement and as comparatively assessed using the measuring function, may be rewarded with a token. This can be determined using a consensus mechanism, and/or it can be determined by the first party evaluating the one or more solutions to the problem and assigning already committed resources to the winner.

In one embodiment, there may be a need to address race conditions between multiple miners competing for the reward associated with submitting the best solution. An example race condition may be when one dishonest miner may identify a submission of a solution from an honest miner and perform what may be referred to as front-running, in which the dishonest miner steals the solution from the honest miner and pays higher gas fees, and/or otherwise corrupts the system, to have the stolen solution be attributed to the dishonest miner instead of the honest miner. A version of this attack may be that a dishonest miner accesses the solutions of one or more other miners and uses these to determine a minor improvement and then submits the minor improvement. A version of this may be when the dishonest miner simply submits a variant of one or more observed solutions submitted by others, in the hope that the variant may, by accident and/or luck, be determined to be more desirable than the solutions of the honest miners. If this succeeds, even with a relatively small probability, that may be a common strategy of dishonest miners. The existence of a viable strategy for dishonest miners may discourage honest miners from participating, therefore reducing the utility of the proposed solution. To address this problem, the disclosed technology introduces a collection of novel countermeasures.

One countermeasure may be for miners to be given a deadline for the submission of commitments to solutions. A commitment may be an encrypted version of the solution, the result of a cryptographic hash function evaluation on the solution, and/or a combination of such. The commitment may be associated with the miner preparing it, e.g., comprise a reference to the miner's public key in addition to an indication of the solution. The commitment may be associated with a token held by an address controlled by the miner, which may be held for the duration of the commitment rounds in order for the solution to be classified as valid, but may subsequently be traded and/or transferred to other miners. Thus, such commitments cannot be stolen, as they would not be possible to disassociate with the miners generating them. After a second deadline, e.g., occurring thirty seconds after the first deadline, no more commitments are accepted. After a third deadline, e.g., occurring yet another thirty seconds after the second deadline, the miners are requested to de-commit to their previous solutions. This may involve publishing the solutions and any nonces and/or keys used to generate the commitments, thereby enabling verifiers, and the first party, to determine what solutions were properly committed to. Among those, a winner may be identified. By setting the time difference between the first and the second deadline, and between the second and third deadline, to be sufficiently long the risk of different perceptions of time may be reduced. Here, what may be sufficient depends on typical network lags, and may be set as a parameter by a system designer and/or an admin, and/or it may be determined in real-time based on measurements of round-trip lags, e.g., as performed by the first party and/or a group of parties that perform a consensus-based decision. This may be part of the mining effort performed in another blockchain system, e.g., the one in which tokens are used for staking. Another method for determining the parameter may comprise a protocol algorithm that takes as inputs the number of prior commitment and decommitment events recorded on the blockchain over a given number of blocks and/or period of time as established from timestamps within the recorded and accepted blocks, and deterministically calculates the immediate future parameter value accordingly. For example, in one embodiment the algorithm may comprise nodes: scanning the prior set of commit/pause/decommit blocks for commit transactions, determining the number of successful commit transactions present in the commit blocks, X, determining the number of failed commit transactions present in the pause and decommit blocks, Y, and increasing the number of commit blocks in the subsequent commit/pause/decommit round by (100*X/Y) %. Similarly, the algorithm may comprise: determining there are no failed commit transactions present in the pause and decommit blocks and in the last N commit blocks, and reducing the number of commit blocks by k*N, where k may be a predetermined constant less than 1 but greater than 0.

Another countermeasure against various attacks associated with race conditions may be the use of encrypted circuits. These can be seen as commitments to functions, where the encrypted circuits can be queried and solutions generated. The generated solutions may be indicative of the results that would be produced by the solution on which the encrypted circuit depends, but the generation of these solutions may be significantly less efficient than the use of the algorithm and/or configuration that comprise the solution. Therefore, the encrypted circuit commits to the functionality of the algorithm and/or the set of configurations without enabling efficient copying of the same. This provides a disincentive against abuse.

Another problem that may be solved using the disclosed technology may be the finding of solutions to complex computational problems, such as finding multiple local minima to a function. Here, the winning solution may be the input to the function that results in the local minimum, and the commitment comprises the associated function output. The first party, which posed the problem, may compare multiple such commitments and select the best one, and contact the miner that provided this value, and/or verifying a zero-knowledge proof of knowledge of the input corresponding to the output value, where this proof was generated by the miner and submitted along with the function output value as part of the commitment. The winning miner may be rewarded with a token, and provides the input to the first party.

Other problems to be solved may include graph traversing problems, such as what may be commonly known as "traveling salesman problems" where the fastest and/or least expensive route between two nodes while visiting a specific subset of nodes may be to be found as applied to traffic optimization issues and/or network data routing, packing problems involving sorting and organizing packages of varying sizes into containers and/or boxes in the most efficient manner for logistics and supply chain, fuzzy integer programming problems to find matrices that when multiplied by a given vector produce a best approximation for a desired output matrix as used in, for example, satellite navigation solution computations, and/or perfect matching problems for the allocation of resources to candidates in large systems. In some circumstances it may become apparent that a given miner has determined a previously unknown superior algorithm for determining the solution to a given proof-of-work problem used, for example, by over a period of time determining winning solutions to the problem at a statistically significant higher rate given resources expended.

In an embodiment of the present disclosure, a time-limited and/or permanent royalty may be assigned to a particular miner for revealing the superior algorithm and "leveling the playing field" for other miners participating. Through this miners that invent an improved process and/or method of computation may receive a regular stream of income through the royalty, guaranteed by protocols embodied in a blockchain protocol and/or smart contract in return for disclosing the improved process and/or method of computation.

In another embodiment, miners may also use the same algorithm, which may be probabilistic, and compete with each other in terms of the fit of the generated output. One example of an output may be a set of parameters that maximizes a benefit for a set of inputs. Another example of an output may be a local minimum and/or local maximum of a graph described by the input problem.

A miner may exchange a solution to a problem for a payment using a fair exchange protocol. This trade may be performed using secret exchange protocols, e.g., as disclosed in "Ripping Coins for a Fair Exchange" by Markus Jakobsson, available at http://markus-jakobsson.com/papers/jakobsson-eurocrypt95.pdf and/or using another fair exchange protocol, such as "Usable Optimistic Fair Exchange" by Alptekin Kupcu and Anna Lysyanskaya, available at https://eprint.iacr.org/2008/431.pdf.

In one embodiment, a first party has a computational problem P it wishes to find a solution S to. However, the description of P may contain sensitive information that the first party does not wish to expose. Therefore, the first party transforms the problem description P to a new problem description P2, and requests a solution to P2. A second party provides a solution S2 to the problem P2, and the first party uses S2 to determine a solution S to P.

In another but compatible embodiment, the first party generates two or more computational problems (P1 . . . Pn) from the problem statement P, and requests solutions to at least some of the problems (P1 . . . Pn) from other parties, such as the second party and a third party. The second party and the third party may not know that the problems they are solving are related to each other. The second party and third party provide solutions to the problems they solve, to the first party. The first party may solve some of the problems in the list of problems (P1 . . . Pn), and receive solutions from other parties for other problems in the list. The first party determines a solution S to the problem P by combining the received and computed solutions (S1 . . . Sn) to the problems (P1 . . . Pn).

The first party may generate multiple problems (P1 . . . Pn) from one problem P and provide these multiple problems (P1 . . . Pn) to different parties, each one of which provide a corresponding solution Si to a problem Pi. The first party may combine two or more such solutions, some of which may contain errors, whether accidental and/or intentional, and use the determination to determine the likely presence and/or absence of errors. If a likely error may be detected, the first party may discard one or more of the received solutions, and/or request additional solutions for other parties, in order to determine what parties provided solutions that had errors.

Each party providing solutions can be associated with a reputation score that indicates their past performance, including how many problems have been solved, how many solutions were selected as being the best solution to a problem, scores indicating the quality of solutions, and the time for providing a solution. A party requesting solutions to problems may use the reputation score to select what parties are asked to provide solutions to problems, and/or as a tie-breaker when two or more parties provide solutions whose relative quality cannot be determined. The party requesting solutions to problems may, for example, use the reputation as a tie-breaker wherein parties that have provided high-quality solutions in the past are favored. The party requesting solutions to problems may select two or more competing solutions and combine these.

The disclosed technology may be compatible with the technology disclosed in co-pending U.S. Patent Application No. 63/383,217, titled "Green Proof of Stake," filed Nov. 10, 2022, incorporated herein in the entirety, wherein one type of token, e.g., the green NFT, may be used to control access to staking. Instead of using green NFTs (gNFTs) for this purpose, other tokens can be used, where such tokens may be issued in response to users solving problems, such as a problem P, as disclosed in the instant invention. Alternatively, the access control to being allowed to stake may be the provision of a solution S to a problem P, without the issuance of a token used to verify access rights, and/or wherein the token comprises a digital signature generated by the party wishing to find a solution S to problem P, and/or associated with this party. This may be consistent with the use of gNFTs, as disclosed in co-pending U.S. Patent Application No. 63/383,217, titled "Green Proof of Stake," filed Nov. 10, 2022, incorporated herein in the entirety, for purposes of furthering a social good, which in this context may be the use of computational power to find solutions such as S to problems such as P, in return for capabilities, such as being allowed to perform mining by committing (i.e., staking) a resource (such as the token and/or the solution S). Whereas in traditional contexts involving staking, a party performing staking may receive the resource back at the end of the participation in the mining, the disclosed technology may instead require a new token (such as a gNFT) and/or a new winning solution S to continue the participation in a mining effort, after a given time has elapsed and/or a new party may be admitted to the mining pool by presenting a new gNFT and/or a gNFT with greater value. This may cause older and/or less valuable gNFTs to expire and the participants rotated accordingly.

In one embodiment, one or more NFTs are used for staking, where at least some of the one or more NFTs are provided to users as rewards for achievements, where an achievement may be obtaining a score of at least 10,000 in a given game; purchasing at least 10 songs from an indicated label and/or collection of artists; investing in a specific DAO, etc. Staking may be allowed if a provided function may be evaluated and matches a target value, where the input to the function may be data, contents of wallets, events associated with a user, etc. Alternatively, different activities and/or events may be associated with different points, and a score computed for a given user and/or user wallet, where the score may be a sum of the points associated with the user and/or user wallet. Users interested in staking may then be ranked based on their scores where the 100 highest ranked users are provided round-robin access to staking functionality. As yet another alternative, a raffle may be held where the chances of winning the raffle are associated with the score of the associated user, e.g., where a using who has a score that may be a fraction x of all determined scores may be provided an opportunity to be selected to stake with a probability corresponding to x.

In one embodiment, NFTs may be traded for fungible tokens on a decentralized and/or centralized exchange (DEX and/or CEX). In an exemplary implementation of a decentralized solution provided as a non-limiting example, a DEX smart contract may instantiate fungible tokens, for example ERC20 tokens on the Ethereum blockchain, representing proof-of-work. For the purpose of illustration, we may call these tokens POW tokens. A unit of the POW token may represent a mining effort of one repetition of a double application of the SHA256 cryptographic hash function to a nonce concatenated with a data payload.

An address (either externally owned and/or through a second smart contract operated by an owner of the smart contract) owning a proof-of-work NFT may transfer the proof-of-work NFT to the DEX smart contract, and receive a number of POW tokens in return from the smart contract, with the number proportional to and/or equal to an effort of proof-of-work conducted and recorded against the proof-ofwork NFT. Through this, an owner of a proof-of-work NFT representing an indivisible block of proof-of-work may convert said indivisible block into a fungible representation of the proof-of-work, which may subsequently be used for trading, staking, loan collateral, exchanging, and/or other decentralized finance activities.

The POW tokens may, at a later time, be converted back into a proof-of-work NFT. In one embodiment, on a second address transferring a second number of POW tokens to the DEX smart contract, the DEX smart contract may find and transfer a proof-of-work NFT representing an amount of proof-of-work less than and/or equal to an amount of proof-of-work represented by the second number of POW tokens, and/or a collection of proof-of-work NFTs, the sum of the collection's representation of the amount of proof-of-work being less than and/or equal to the amount of proof-of-work represented by the second number of POW tokens, and may transfer the proof-of-work NFT and/or the collection of proof-of-work NFTs to the second address, returning any remainder of POW tokens back to the address as well, minus any transaction fee subtracted from the remainder. In other embodiments the transaction fee may be subtracted before searching for a suitable proof-of-work NFT and/or collection of proof-of-work NFTs.

In an embodiment of an analogous centralized implementation of the above, a centralized exchange (CEX) may receive the proof-of-work NFT and may mint and return an equivalent number of POW tokens, with calculations of the amount of proof-of-work represented and the appropriate number of POW tokens calculated off-chain.

Fungible POW tokens may enable anonymization of proof-of-work. For example, a mixer smart contract may accept POW tokens, effectively placing them in a pool, and may at a later time pay out an equivalent number of POW tokens from the pool, minus any transaction fee. Through this, an audit trail connecting ownership and transfer of POW tokens may be broken, thereby providing a level of anonymity.

Similarly, the proof-of-work NFT smart contract may comprise functionality that allows the contract to mint proof-of-work NFTs on demand with a given level of proof-of-work recorded against them, and to burn proof-of-work NFTs. Thus the DEX smart contract above, instead of holding and releasing proof-of-work NFTs, may optionally burn and/or mint proof-of-work NFTs and mint and/or burn an equivalent number of POW tokens in response. In some embodiments a single contract may comprise the proof-of-work NFT smart contract and the DEX smart contract. In other embodiments the proof-of-work NFT smart contract may only mint proof-of-work NFTs with the given level of proof-of-work recorded against them if the minting request comes from the DEX smart contract, and the DEX smart contract may ensure that for every creation of a proof-of-work NFT with a given level of proof-of-work recorded against it, an equivalent number of POW tokens are burned, and vice versa.

In one embodiment, two or more participants compete to provide a solution to a problem posed by a requestor. The requestor may be an entity with a computational problem to be solved. An example of such a problem may be to find a local maximum of a function specified by the requestor. Each of the competing participants, which we may refer to as "miners" attempt to find local maxima, e.g., by determining parameter choices for the function that result in a local maximum. The winner of the miners may be the miner whose parameter choices result in the local maximum of the greatest value. This may be the global maximum of the function, but it may also be merely a local maximum. In a related embodiment, the requestor may specify requirements on the solutions, e.g., a threshold value that the local maximum found must exceed. The winner may be the first participant to find a parameter choice that satisfies this requirement when evaluated for the associated function; we refer to this as a satisfactory solution. The winner may also be the party that, within a given time period after the submission of the first satisfactory solution, submits the solution with the greatest value of the associated function, when evaluated. We refer to the specifications identifying the rules of the competition as the mining rules. In this example, the mining rules can be described as "parameters with resulting value that may be the highest, submitted within 2 h of the first satisfactory value being submitted, wherein ties are broken to favor the first submitted mining solution among two or more competing mining solutions resulting in the same value of the function". In one example use situation, only one participant submits a mining solution, which may comprise parameter choices. The mining rules may specify the goal of the competition, e.g., finding an input such as the disclosed parameter choices, whose corresponding output satisfies some requirement. Here, the input may be the input to a function, e.g., one specified by the requestor, and the output may be the result of evaluating this function on the input value. The function may correspond to what we refer to as a "mathematical problem". Examples of such functions include algorithms describing problems known to be polynomial-time problems, NP complete problems, NP hard problems as well as problems with other complexity; one applied example of a function may be a traveling salesman problem (TSP) wherein the requestor provides a graph specifying the constraints of the TSP problem and requests a solution that satisfies some criteria that may be implicit and/or explicit in the problem. Another applied example may be an approximation problem wherein an upper bound for a function may be known, and wherein the requestor specifies that a satisfactory solution may be one that results in a function value that lies within a specified range of the known upper bound, such as "no more than 4% less than the known bound".

FIGURES

Figure 26:
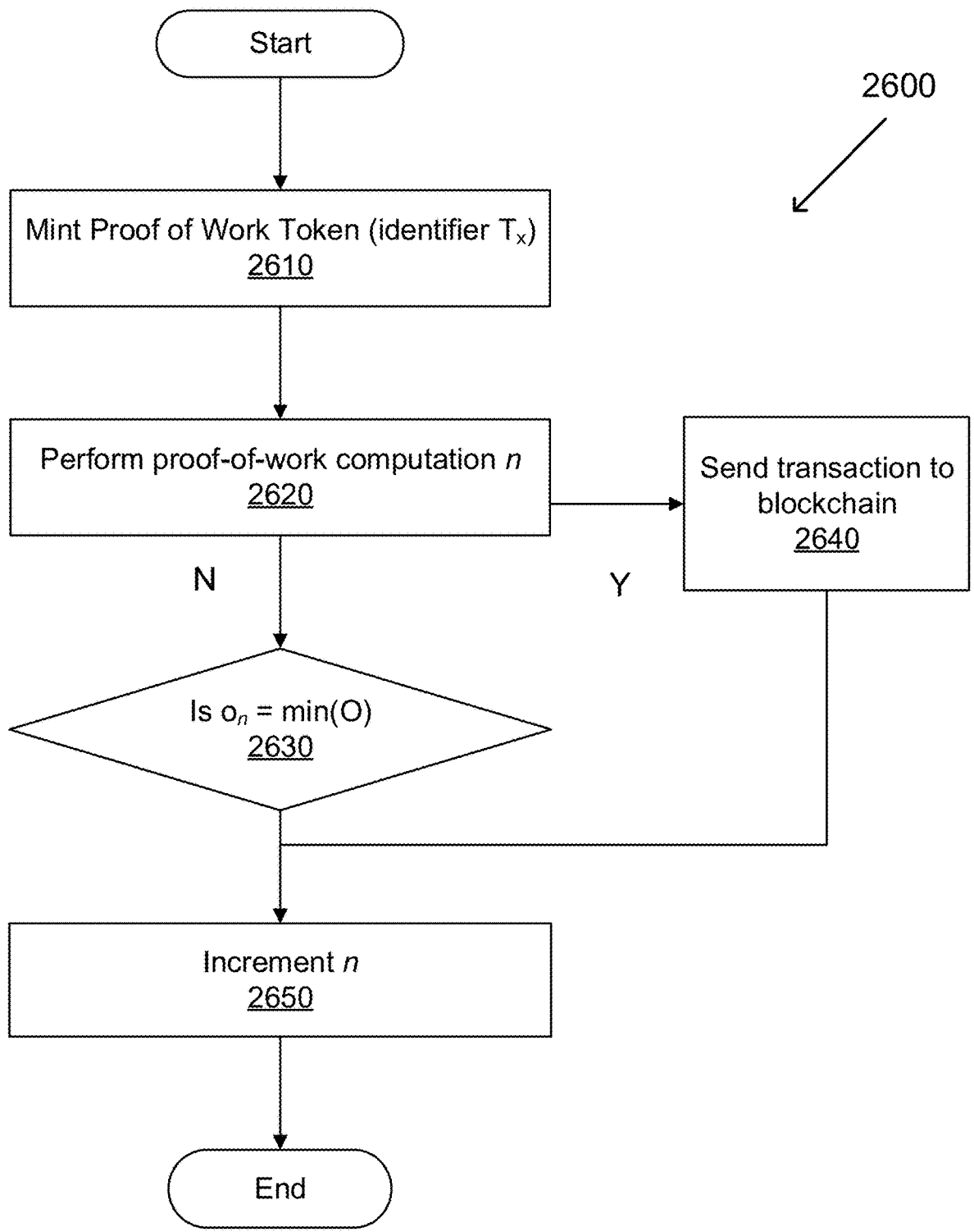
FIG. 26 illustrates a process for recording a successful proof of work in accordance with several embodiments of the invention.

FIG. 26 is a flowchart of an exemplifying embodiment of a method for recording a successful proof of work on a proof of work token Tx. Activities may commence with a minting of the token Tx as shown in step 2610.

Activities may then proceed to step 2620, in which an nth element of a set of random numbers S may be selected using a counter n, combined with an identifier of the token Tx, which in one embodiment may be through conversion to a string and concatenation. In another embodiment combination may comprise multiplication. The combined token Tx and nth element rn may then be hashed with a cryptographic hash function, such as one or more of: SHA2, SHA3, Keccak256, and/or BLAKE, to produce a proof of work output on. The output may then be recorded in a list O.

In step 2630 a success and/or failure of the proof of work computation from step 2620 may be determined. In the present embodiment this may be established by determining whether output on may be the smallest output in the set O. In other embodiments another measurement function may be used, for example, may be on=max(o). If the measurement function determines that element n results in a success, activities may proceed to step 2640, otherwise activities may proceed to step 2650.

In step 2640, activities may proceed with a sending of a transaction to a blockchain, said transaction comprising Tx and rn. The transaction may be sent to the blockchain through sending the transaction to a smart contract instantiating token Tx on the blockchain. The transaction may comprise other information, for example, a timestamp, the measurement function used, the cryptographic hash function used, and/or other information pertinent to the computation.

In step 2650, the counter n may be incremented. In other embodiments the counter n may be decremented, and/or may be changed to another randomly selected number. Activities then proceed back to step 2620 where the new value of the counter n may be used.

Figure 27:
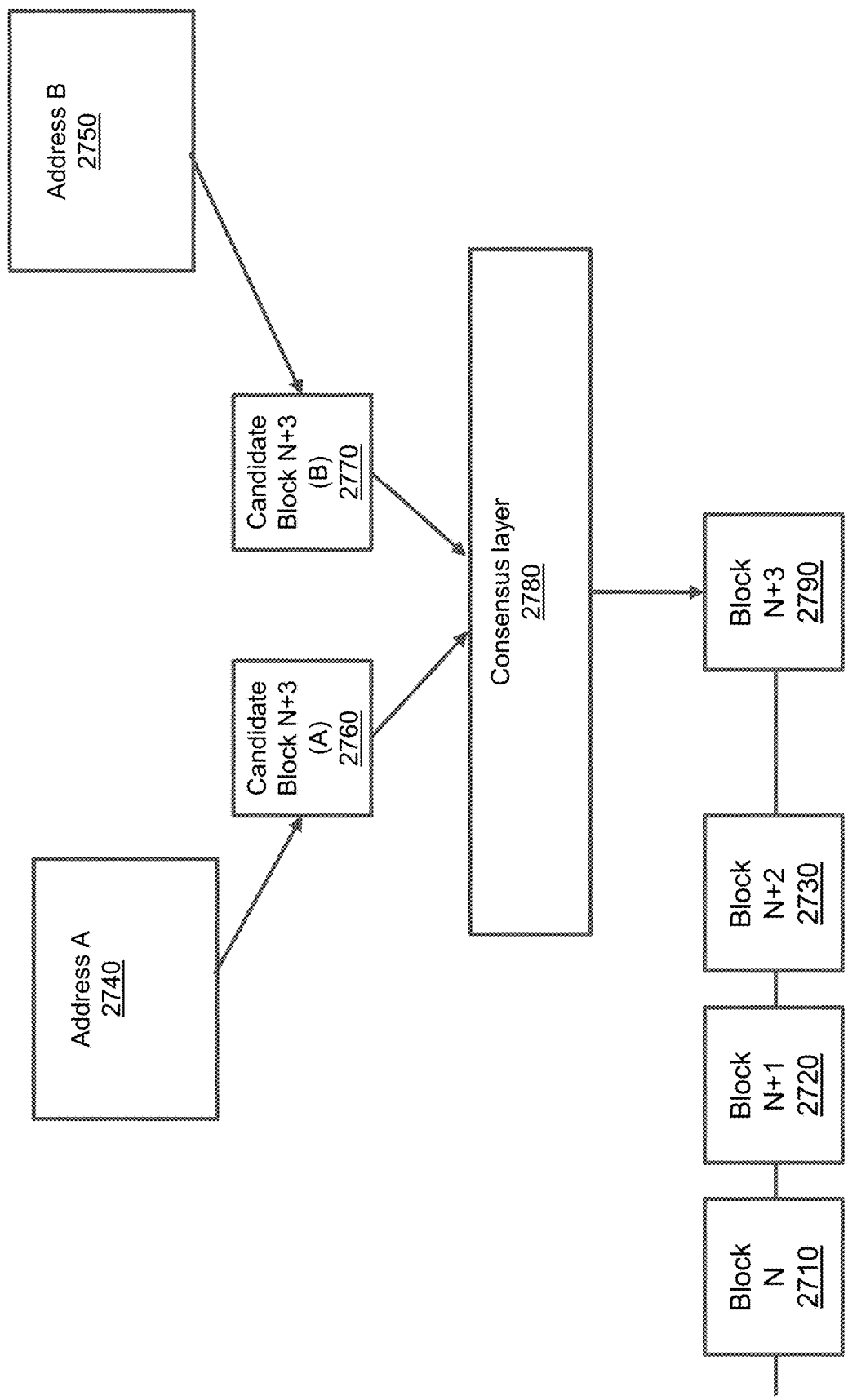
FIG. 27 conceptually illustrates a proof of stake blockchain utilizing proof of work tokens configured in accordance with some embodiments of the invention.

In FIG. 27 a block diagram providing a possible embodiment for a proof of stake blockchain utilizing proof of work tokens may be presented. The blockchain may comprise a sequence of prior blocks N, N+1, N+2, N+3, as denoted by 2710, 2720, 2730. A first account A 2740 with address A may generate a first candidate block 2760 for block N+3 2790, and a second account B 2750 with address B may generate a second candidate block 2770 for block N+3. The first candidate block 2760 may comprise a pointer to a proof of work token TA, and the second candidate block 2770 may comprise a pointer to a second proof of work token TB.

In some embodiments, a consensus layer 2780 may comprise a consensus protocol for determining which candidate block may be appended to the blockchain for each additional block. As an example of the current embodiment, which may be presented for illustrative purposes only and may not be meant to be limiting, the consensus layer may assess the relative merits of candidate block 2760 and candidate block 2770 using the consensus protocol. The consensus protocol may comprise one or more of: determining that NFT TA may be owned by Address A, that NFT TB may be owned by address B, and may exclude a candidate block from consideration if the respective token may be not owned by the respective address. The consensus protocol may further compare the level of proof of work stored against each NFT, and may select the candidate block based on the associated token comprising a highest level of proof of work. Other factors that may be used in assessing the merits of candidate blocks within a proposal set may include: determining how recently a given address has submitted a successful candidate block, a metric computed from the address of the candidate block submitter, and the amount of work recorded against the token.

The consensus layer 2780 may subsequently append a selected candidate block to the blockchain as a new block 2790, with the selected candidate block becoming a part of a canonical list of blocks.

Figure 28:
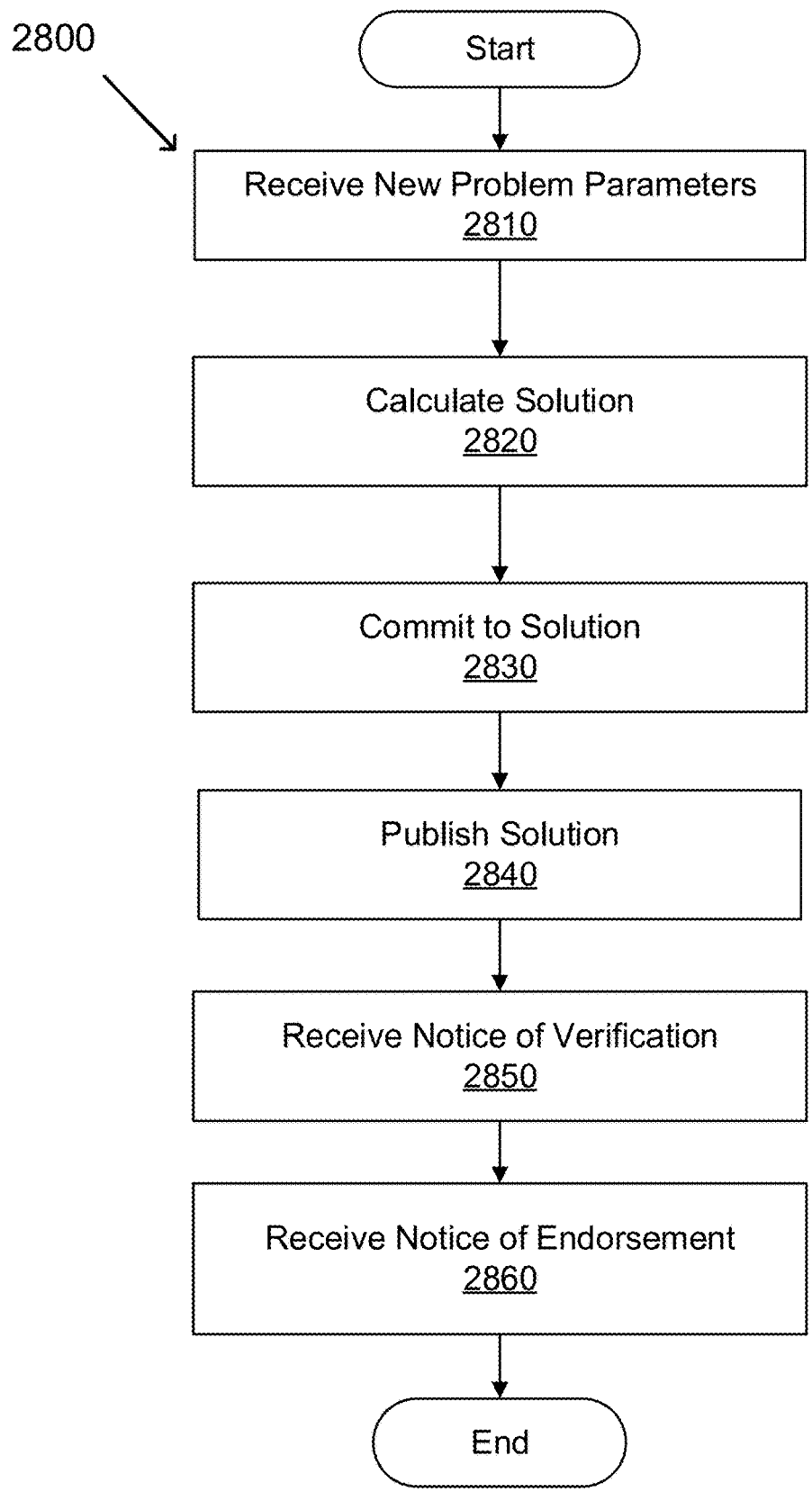
FIGS. 28-30 illustrate processes followed by consensus mechanisms in determining modifications to blockchains in accordance with multiple embodiments of the invention.

FIG. 28 is a flowchart of an exemplifying embodiment of a method 2800 for determining a winning participant from a set of competing participants solving a solution to a mathematical problem, with a winning solution selected by a verifier, and with a mechanism for preventing front-running of solutions proposed by a plurality of participants, with FIG. 28 illustrating the method 2800 comprising:

A step 2810 whereby problem parameters for a class of problems are presented to the plurality of mining participants.

A step 2820 wherein each of the plurality of mining participants calculates a solution to an instance of the class of problems using the problem parameters.

A step 2830 wherein each of the plurality of mining participants publishes a hash of the solution, thereby committing their solution on the blockchain, A step 2840 following step 2830, in which some and/or all of the plurality of mining participants publish their solution, resulting in a plurality of solutions published on the blockchain, A step 2850, in which the verifier determines which of the plurality of solutions may be the winning solution, which in some embodiments may be achieved through the use of a measuring function. The verifier then verifies that the solution may be valid, and verifies that the hash of the solution that was selected as winning was committed by publication in step 2830. The verifier may then publish a verification on the blockchain, allowing mining participants to receive notice of verification.

A step 2860 in which a plurality of consensus participants endorse the verification. The mining participants may then receive notice of endorsement.

The cycle then repeats by returning to step 2810, with a new set of problem parameters, and in some embodiments a new problem, selected and presented to the plurality of participants.

Figure 29:
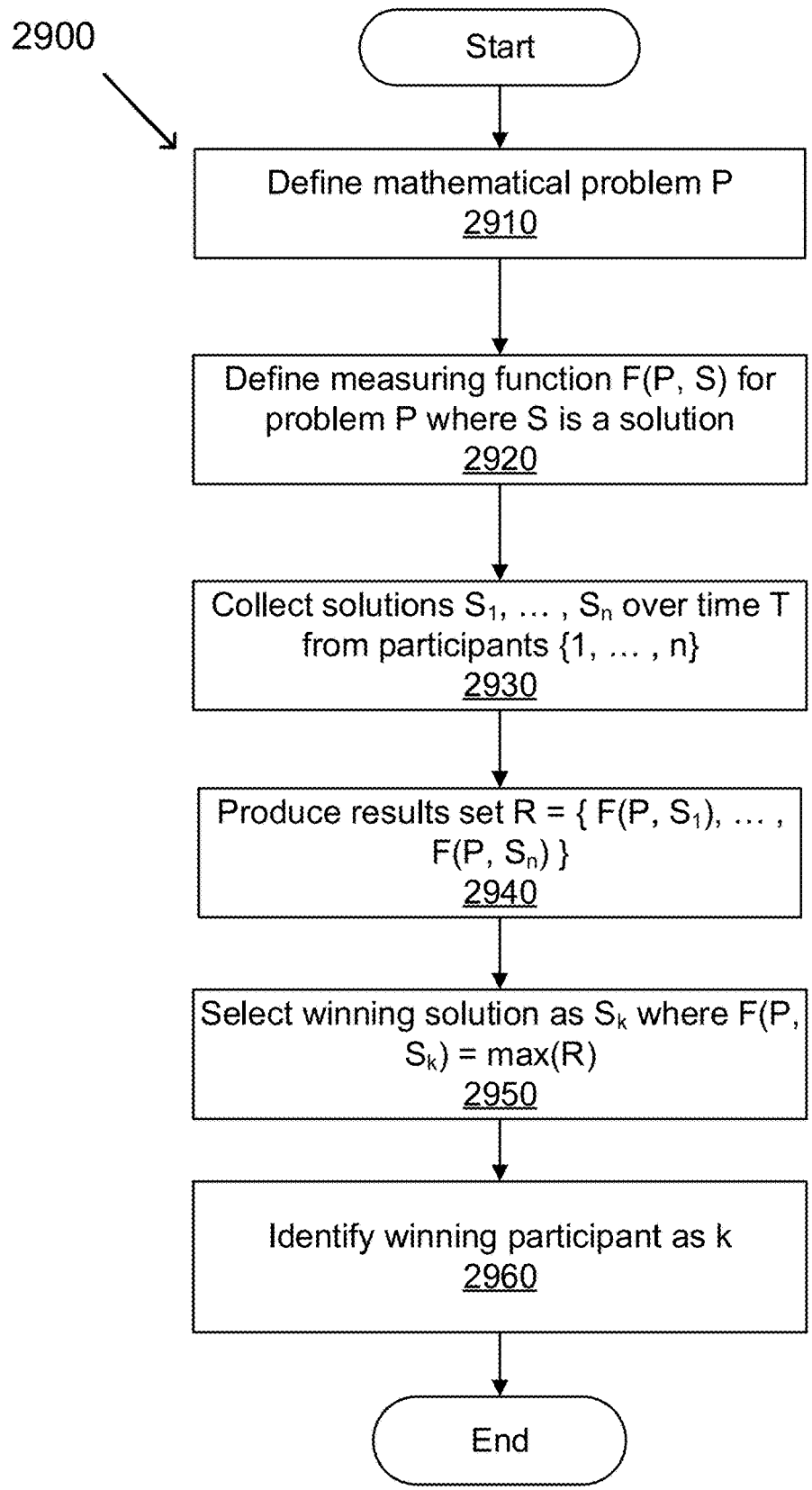

FIG. 29 is a flowchart of an exemplify embodiment of a method 2900 for defining a mathematical problem and selecting a best solution using a measuring function comprising:

A step 2910 of defining a mathematical problem P;

A step 2920 of defining a measuring function F for problem P taking as its input a solution S and returning a value F(P, S), with a range of F forming a result set with a total ordering and a binary total ordering operator.

A step 2930 in which a plurality of solutions from members of the set of competing participants are collected over a predefined period of time during which solutions may be submitted;

A step 2940 in which a results set R (a subset of the range of F) may be produced, and for which each result F(P, Si) comprises a value calculated using the measuring function F applied to a solution Si. In some embodiments, the measuring function may be embodied in instructions stored and executed on a node and/or plurality of nodes maintaining and extending a blockchain as part of a consensus system for the blockchain. In other embodiments a validator may be nominated prior to step 2940, with the validator applying the measuring function to the plurality of solutions;

A step 2950 in which a winning solution Sk may be selected from R, where F(P, Sk) equals the maximum value in R, as determined using the binary total ordering operator. In some embodiments the validator may perform a process of selecting the winning solution using the binary total ordering operator. In other embodiments each of the plurality of nodes may perform the process, thus independently reaching an identical selection and hence achieving consensus; and A step 2960 in which a winning participant may be identified from the set of competing participants as participant k producing solution Sk, through, for example, the validator publishing an identity of the winning participant on the blockchain.

Figure 30:
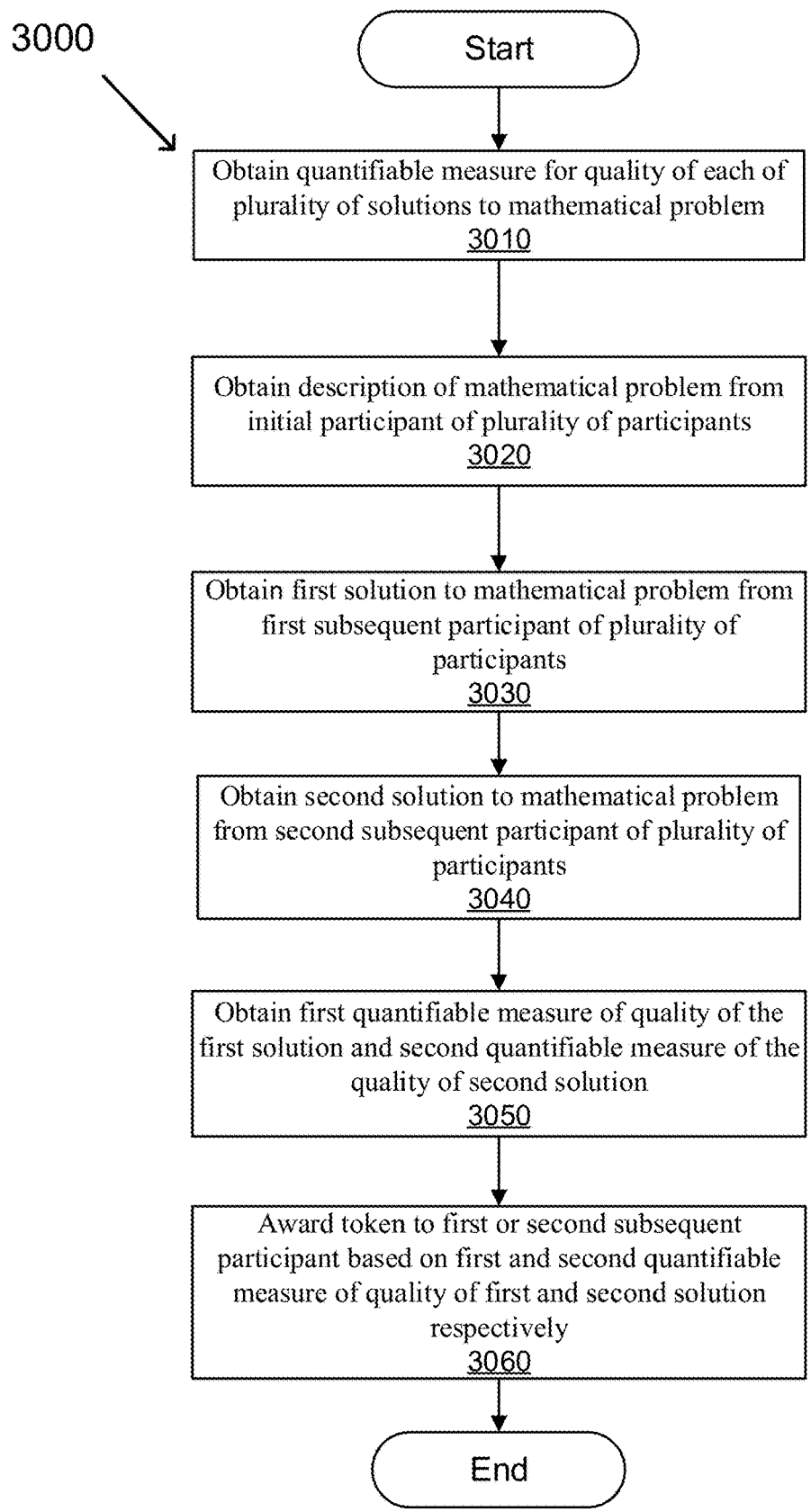

FIG. 30 is a flowchart of an exemplifying embodiment of a method 3000 for determining a solution to a mathematical problem through an awarding of a token by means of a plurality of participants determining a solution to a mathematical problem through an awarding of a token. FIG. 30 illustrates the method 3000 comprising a step 3010 of obtaining a quantifiable measure for a quality of each of a plurality of solutions to the mathematical problem by a measuring function, a possible embodiment of which was previously presented in FIG. 29. FIG. 30 also illustrates the method comprising the step 3020 of obtaining a description of the mathematical problem from an initial participant of the plurality of participants. The method also comprises the step 3030 of obtaining a first solution to the mathematical problem from a first subsequent participant of the plurality of participants. The first subsequent participant may read the mathematical problem that the initial participant posed, e.g., by reading it on a blockchain on which the initial participant published (or posed) the problem. Thus the first subsequent participant may also publish his/her solution to the mathematical problem on the blockchain. In this manner, the method may obtain the first solution to the mathematical problem from the first subsequent participant. A problem may also be published in other manners, e.g., written to a shared database other than a blockchain, and accompanied by a digital signature of the requestor, asserting the validity of the request comprising the problem. The request may also comprise a description of what may be required of the solution, the manner in which the winner may be to be selected, timing requirements, and more.

In a similar manner, the method also comprises the step 3040 of obtaining a second solution to the mathematical problem from a second subsequent participant of the plurality of participants. Then the method comprises the step 3050 of obtaining a first quantifiable measure of the quality of the first solution and a second quantifiable measure of the quality of the second solution by applying the measuring function to the first solution and the second solution to obtain a first quantifiable measure of the quality of the first solution and a second quantifiable measure of the quality of the second solution. The quantifiable measures of quality may, for example, be the results of Monte Carlo simulations, evaluation of functions and/or responses on a test set, a computation of an error estimate, a computation of a fit, a measurement of a maximum likelihood function, the determination of a risk score, and/or a variation of such methods, and/or combinations thereof. The method may then comprise the step 3060 of awarding the token to the first and/or second subsequent participant based on the first and second quantifiable measure of the quality of the first and second solution respectively.

Figure 31:
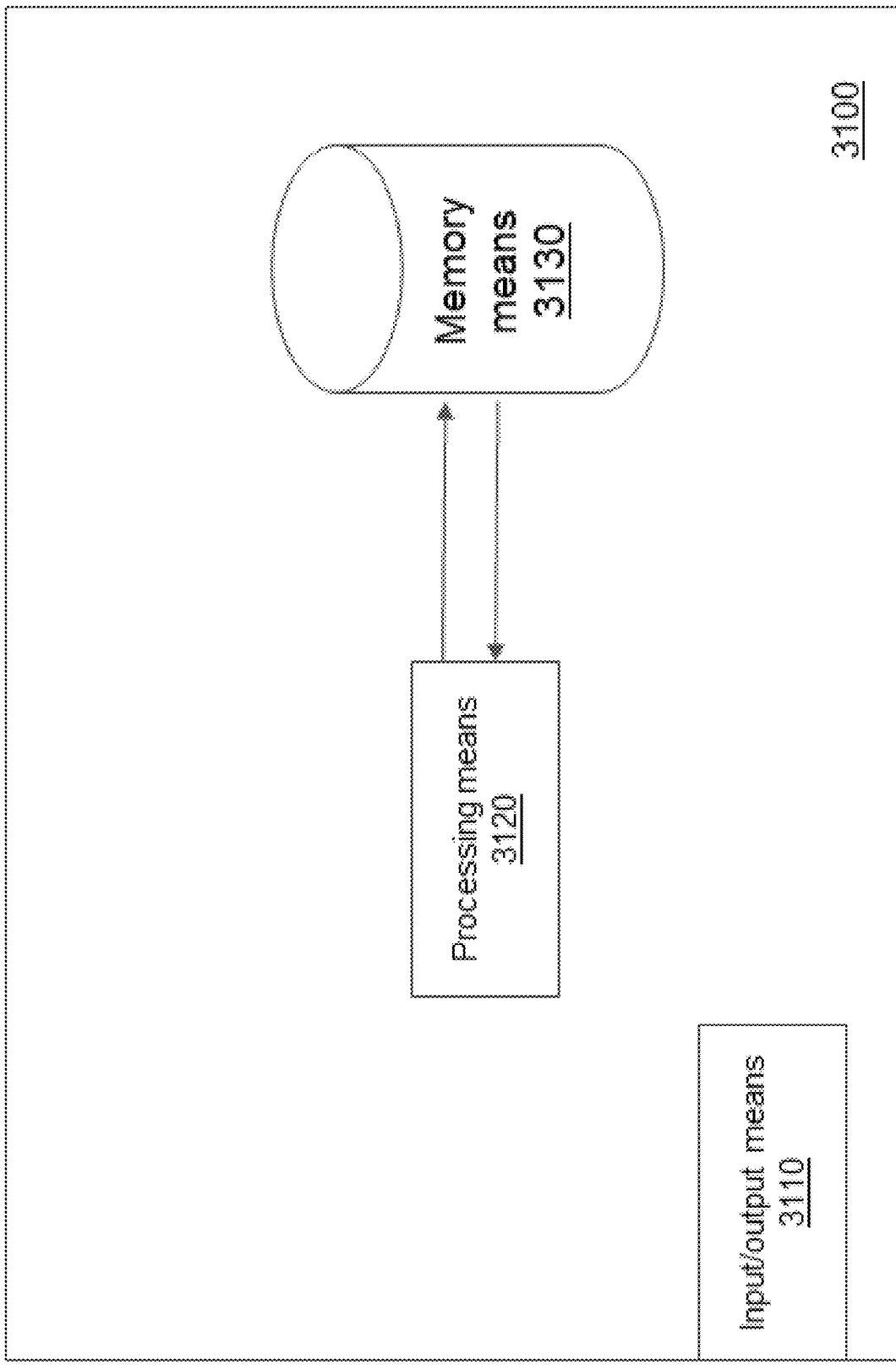
FIG. 31 depicts a device utilized for implementing processes in accordance with certain embodiments of the invention.

FIG. 31 is an illustration of a device 3100 for determining a solution to a mathematical problem through an awarding of a token by means of a plurality of participants determining a solution to a mathematical problem through an awarding of a token. The device may be illustrated comprising input/output means 3110 by means of which the device may receive information and transmit and/or provide information to other units, devices and/or entities. FIG. 31 also illustrates the device comprising processing means 3120 and memory means 3130, the memory means 3130 comprising instructions, which when executed by the processing means 3120 causes the device to perform the methods described herein.

D. Consensus System for Blockchains Based on "Know Your Customer" Functionality

Methods in accordance with many embodiments of the invention may be used to maximize benefits associated with mining, recognizing that different parties have different constraints, and creating a more flexible mining solution, backwards compatible with existing systems, that improves the utility of the resulting system, based on "know your customer" (KYC) concepts.

Throughout this disclosure the term "KYC exposure" may be used to describe what level of KYC an entity has participated in, with a lowest form of KYC exposure corresponding to fully anonymous usage, and a highest form of KYC exposure consisting of publication of identity, location, and other claims related to the entity.

a. Staking Requirements Linked to KYC Exposure

Taking proof of stake as an example, the disclosed system provides for flexibility in terms of the amount of and types of stake that may be provided for a given type of participation. Whereas in a traditional Proof of Stake (PoS) system, a participant may be required to bind an amount of currency, such as 32 ETH, in order to be able to participate. If the participant misbehaves, some and/or all of the stake may be rescinded. In the disclosed system, a participant may be given the option of staking 32 ETH, and/or staking 16 ETH and provide full identity information, including certifications of identity by trusted parties. At a yet more granular level, if a user provides full identity information certified by a first trusted certificate authority, he and/or she may be required to stake 16 ETH to be allowed to participate, and/or optionally, provide full identity information certified by a second trusted certificate authority along with a stake of 8 ETH. In this example, the second certificate authority may have a more thorough process of vetting, may require users to take out insurance in order to be certified, and/or may require a thorough analysis of past participation in mining efforts by said party being certified. A user who may not be willing to provide full identity information to the other PoS participants, but who may be willing to provide such identity information to the certificate authority, who performs verifications of identity, may be offered to participate if he and/or she stakes 12 ETH. Thus, the revealing of full identity information to the public may come at a financial cost, but users unwilling to do so can still obtain a "discount" if they are willing to be scrutinized by a trusted certificate authority. The trusted certificate authority may escrow encrypted identity information and associate this encrypted identity information with the pseudonymous PoS participant, only to reveal the associated plaintext if there may be evidence of abuse being provided.

In FIG. 32 an exemplary table may be presented, illustrating a possible embodiment and configuration for a staking requirement based on differing levels of KYC.

Escrow techniques that are suitable for this use are disclosed in co-pending application Ser. No. 17/806,724 titled "Escrowed Wallet and Transaction Tracking Technology" by Markus Jakobsson and filed on Aug. 22, 2022, incorporated herein in the entirety.

b. Incentivization and Reward Structures Based on KYC Exposure

Another type of incentive is, instead of lowering the entrance requirements (such as the amount to be staked), to increase the rewards associated with mining and/or validating, e.g., to provide two or more tiers of rewards, where these two or more tiers are associated with two or more levels of disclosure, e.g., of identifying information, and/or two or more levels of scrutiny for the verification of identity, past behavior, etc.

For example, an anonymous validator, a basic KYC exposed validator, a full KYC exposed validator, and an escrow KYC validator may all be required to provide a stake of 32 ETH to participate in a consensus system, however, on selection as a validator for a next block they may receive 1, 2, 4, and 3 ETH respectively for their contribution, as shown in FIG. 33.

c. Contribution Difficulty Proportional to KYC Exposure

The same type of incentive methods can also be applied to other consensus mechanisms. For example, instead of providing a lowering of entrance requirements and/or an increase of the rewards for PoS systems, such incentives may be applied to Proof of Space (PoSp) based mining approaches. For example, two miners with different levels of verification of identity information may be presented with two different PoSp difficulties, e.g., a requirement to match a 20-bit pattern and/or a requirement to match a 21-bit pattern. Conversely, and/or in addition, the miner may be provided with rewards whose size depend on the certification of the miner in question. In both of these example situations, the graphs used by the miner may be associated with the certification, to directly tie the requirements and/or the rewards to the user (and her associated certification) and to avoid the "resale" of solutions from less-verified to more-verified miners. PoSp mining may be disclosed, among other places, in U.S. Pat. No. 11,017,036, titled "Publicly Verifiable Proofs of Space," filed Mar. 14, 2019 and issued May 25, 2021, incorporated by reference in its entirety.

For a Proof of Work (PoW) system, in a possible embodiment, miners may participate in the generation of candidate blocks anonymously, pseudonymously, and/or fully exposed. An anonymous miner may submit candidate blocks with a different blockchain address each time, thus restricting the ability of others to link their obtained block rewards to the same entity. A pseudonymous miner may not reveal their identity, but may mine with the same blockchain address, thus easily providing others with the ability to link block rewards to the same entity, but not being able to determine who that entity is. A fully exposed miner may, prior to mining, submit to "know your customer" procedures, and in some embodiments may submit evidence of the KYC process to the blockchain with their blockchain address.

In some embodiments, the consensus mechanism may then accept candidate blocks with a lower level of difficulty from exposed miners than it does from pseudonymous miners, and similarly with a lower level of difficulty from pseudonymous miners than it does from fully anonymous miners. For example, the difficulty for an exposed miner may be a base level of K, for a pseudonymous miner it may be K+d, where d may be a predetermined positive integer, and for an anonymous miner it may be K+m*d, where m may be a real number greater than 1.

Figure 34:
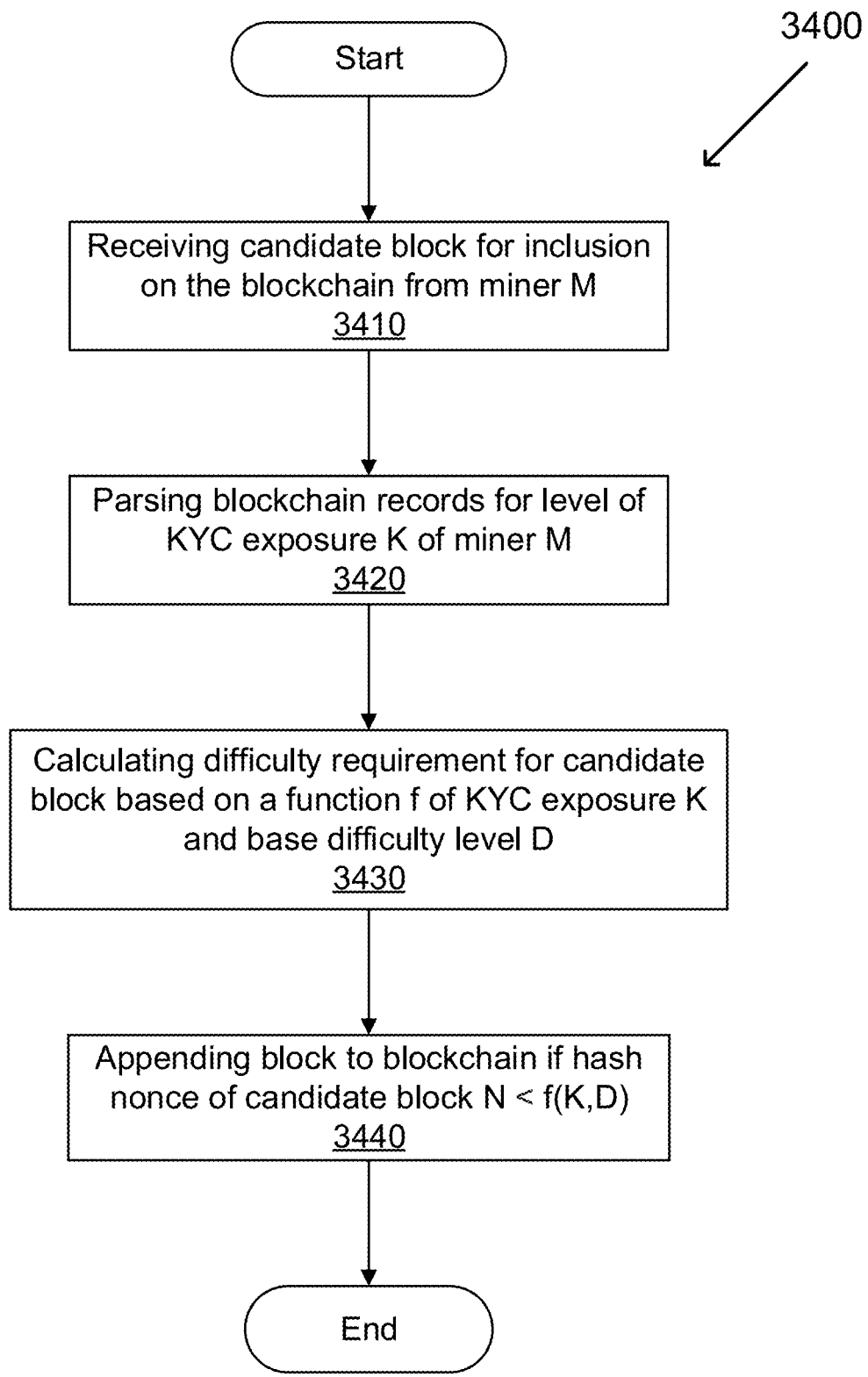
FIG. 34 illustrates a process for adjusting difficulty parameters in blockchain consensus system configured in accordance with numerous embodiments of the invention.

FIG. 34 may be a flow chart illustrating a possible embodiment for a KYC-based consensus system, in which a difficulty of finding a next block may be a function of a miner's KYC exposure.

Actions may commence with receiving a candidate block mined by a miner M for inclusion on a blockchain, as shown in step 3410.

Actions may proceed to step 3420, comprising a parsing of blockchain records to determine a level of KYC exposure of miner M. In some embodiments, the level of KYC exposure may be allocated a numerical value K based on a points scoring system, for example, one point each for disclosure of and attestation of name, location, social security number, address, phone number, email address, and other aspects of identity of miner M.

Actions may then proceed to a calculation of a difficulty requirement for the candidate block, as shown in step 3430. In an embodiment, a base level for the difficulty for a next block may be D, and factors influencing an adjustment of a specific difficulty for miner M may be based on the KYC exposure of miner M as determined in the previous step 3410 to be K. The adjusted difficulty may be calculated using a function f. For example, in one embodiment presented for illustrative purposes and not meant to be limiting, f(K,D) may be determined as follows, where T may be a total number of KYC points that may be obtained in the point scoring system disclosed in step 3420:

$$f(K, D) = D \times \left(2 - \frac{K}{T}\right).$$

Equation 1 ensures that the difficulty for a completely anonymous miner will be twice that of a completely KYC exposed miner.

Actions may then proceed to step 3440, in which the candidate block may be appended to the blockchain if the hash nonce of the candidate block N produced through proof of work may be less than f(K,D).

In other embodiments, the difficulty of finding a candidate block may be equivalent for exposed, pseudonymous, and anonymous miners, however, the block reward may be increased in proportion to the level of exposure the miner has submitted to.

d. KYC Point Scoring Systems for Determining Exposure and Associated Benefits

The identity information that may be verified and associated with a miner may be the type of information typically used in Know Your Customer (KYC) based financial systems. KYC information may include name, location and jurisdiction, photograph, credentials such as passport, bank account details, tax records, social security number, and associations with public keys such as wallet addresses of which the user has control.

For example, in FIG. 35 an example of a point scoring table provided for illustrative purposes and not meant to be limiting in any way, may be presented, whereby a numerical value may be assigned to a specific miner and/or validator for use in calculating a reduction in mining difficulty, increase in probability of validator selection, and/or adjustment of block selection rewards. In FIG. 35 a KYC indicator column comprises options for information that may be disclosed such as name, location and jurisdiction, photograph, bank account details, passport details, a signed list of public addresses controlled by the participant in question, and a second verified party attestation, with associated points allocations. In the example, the participant in question may have revealed name, location and jurisdiction, bank account details and a signed list of public addresses, thus achieving a KYC score of 27 out of a possible 50. This score may then be used in equation 1, resulting in the value of K/T in equation [1] equaling 27/50.

e. Hybrid Systems

The disclosed mechanisms also enable practical hybrid mechanisms. For example, the disclosed technology can be used to create a hybrid between proof of work (PoW) and PoS consensus mechanisms. This can be done by providing two or more tiers for PoW mining, corresponding, for example, to different levels of difficulty as described above, where a first level of difficulty may be associated with an input to the mining algorithm comprising a certificate that the miner has provided a stake, and the second level of difficulty may be associated with an input to the mining algorithm not comprising a certificate that the miner has provided a stake. For example, the second level of difficulty may correspond to comparing competing mining results of different miners with respect to a 25-bit portion of the output of the respective mining results, whereas the first level of difficulty may correspond to setting the most significant bit of the 25 bit portion to zero for the mining outputs associated with a miner with an appropriate certificate, and to compare this modified string to the 25 bit portions associated with the other competing mining instances, as illustrated in FIG. 36 as a possible embodiment of the present disclosure, presented as an illustrative example and not meant to be limiting.

Figure 36:
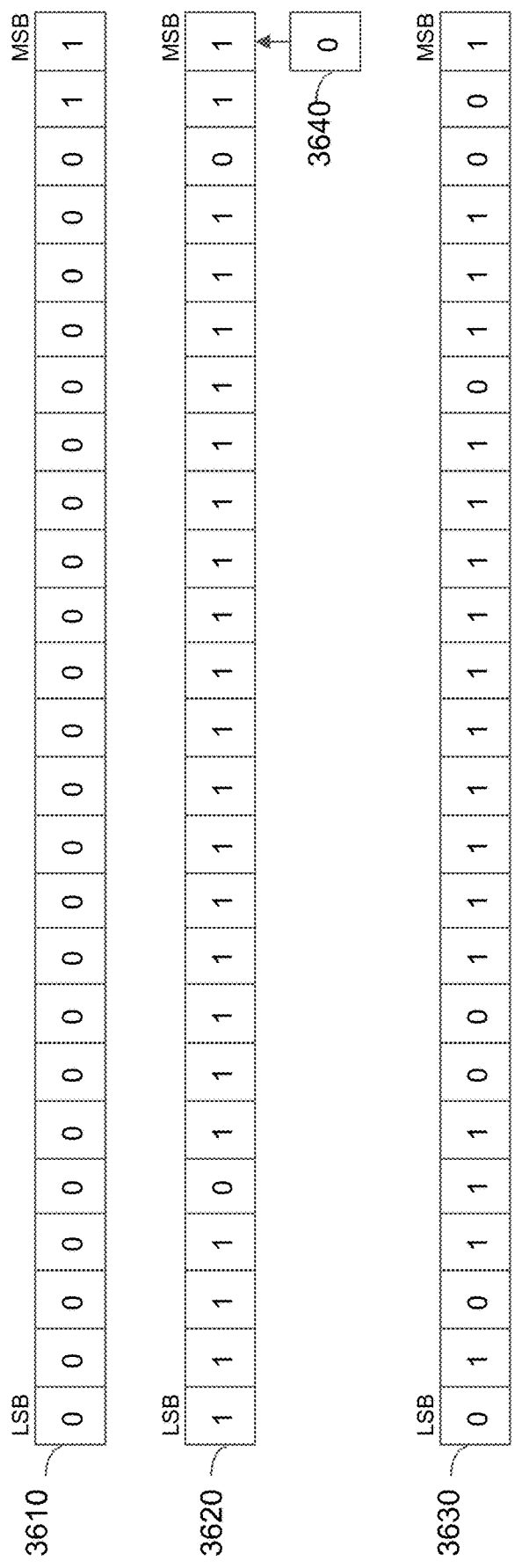
FIG. 36 depicts a data configuration, in accordance with some embodiments of the invention, reflective blockchain consensus systems with modified difficulty levels.

In FIG. 36 a target difficulty 3610 may set an upper limit for accepting a candidate block based on a hash output of the candidate block being lower than the target difficulty 3610, and the target difficulty may comprise one 25 bit value, for example a value least significant bit first of 0000000000000000000000011.

A first miner with a stake certificate may produce a first candidate block with a first hash output of 1111011111111111111111011 3620, and a second miner mining anonymously without a stake certificate may produce a second candidate block with a second hash output 3630 of 0101110011111111110111001.

In the present possible embodiment, as the first miner has provided a stake and a certificate providing evidence of the stake, the consensus may mandate substituting the most significant bit of the first hash output with 0, as shown by 3640.

As a result, although the first hash output 3620 was initially higher than the target difficulty 3610, and the second hash output 3630 may be lower than the target difficulty 3610, after substitution the first hash output 3620 may be lower than both the target difficulty 3610 and the second hash output 3630, and therefore under the consensus system rules the first candidate block may be selected in preference to the second candidate block.

FIG. 36 thus illustrates an advantage provided by KYC to the first miner.

Other ways of creating incentives for select classes of miners, based on actions associated with these, may be used instead. For example, tie-breaking solutions can be created to favor miners with greater assurances. These assurances may correspond to inputs corresponding to indications that sufficient funds and/or NFTs valued at sufficient amounts have been staked; they may alternatively, and/or in addition, correspond to having registered KYC data, whether such data may be made public, being held by a trusted party such as a certification authority, and/or that such data may be escrowed, as described above, after having been verified. Using the same principles, hybrid consensus mechanisms may also be constructed based on other types of consensus mechanisms, e.g., a PoSp and a PoS mechanism.

A mining output in the context of the disclosed technology comprises two or more components, where each of the two or more components may be a reference to an element and/or an element, and wherein an element may comprise a certification, evidence of a membership, KYC information and/or an assertion, wherein the assertion indicates one or more elements of a mempool, and wherein the assertion may be based on a consensus mechanism, such as PoS, PoW, PoSp and/or proof of authority, and/or a hybrid of such mechanisms. The certification may indicate a trusted party having vetted the miner, where the vetting may relate to verification of KYC information and/or auditing of prior actions associated with the miner. A miner may be identified using a public key associated with a registered graph, e.g., in the context of a PoSp consensus mechanism, a public key associated with a wallet, and/or with a record, such as a record comprising escrowed information. The escrowing of information may comprise encryption of such information, and optionally, a proof that two or more encrypted components satisfies a specified relationship such as corresponding to the same plaintext data.

f. Probabilistic Improvements to Success in a KYC Consensus System

There are many different ways in which to incentivize miners that have presented information and/or performed actions that are desirable. In the above, we have described the provision of increased rewards and a reduction of the effort needed to be invested by the miner to succeed. Another example incentive may be a skewing of the probabilities of being selected, e.g., in the context of PoS mining, wherein a miner may be selected among the stake-holders using a pseudo-random method. This method of selecting can be augmented to favor miners that have provided extra information, who have performed desirable actions, etc. For example, a PoS miner who has registered KYC information, whether to remove anonymity and/or to replace anonymity with pseudo-anonymity (e.g., using an escrowing of KYC information), may be rewarded for this by having the associated probability of being selected increased. Similarly, a miner that has staked a "green" resource instead of an equal-valued non-green resource may be given a reward, e.g., using a modification of the probability of being selected. Green staking, which may be disclosed in co-pending U.S. Patent Application No. 63/277,472 titled "Green Proof of Stake" by Markus Jakobsson and filed on Nov. 9, 2021, incorporated herein in the entirety, can co-exist with traditional staking, and can be favored by such a skewing of probabilities, by a reduction of the size of the stake, by an increase of mining rewards, by another reward mechanism, and/or by a combination of such.

Figure 37:
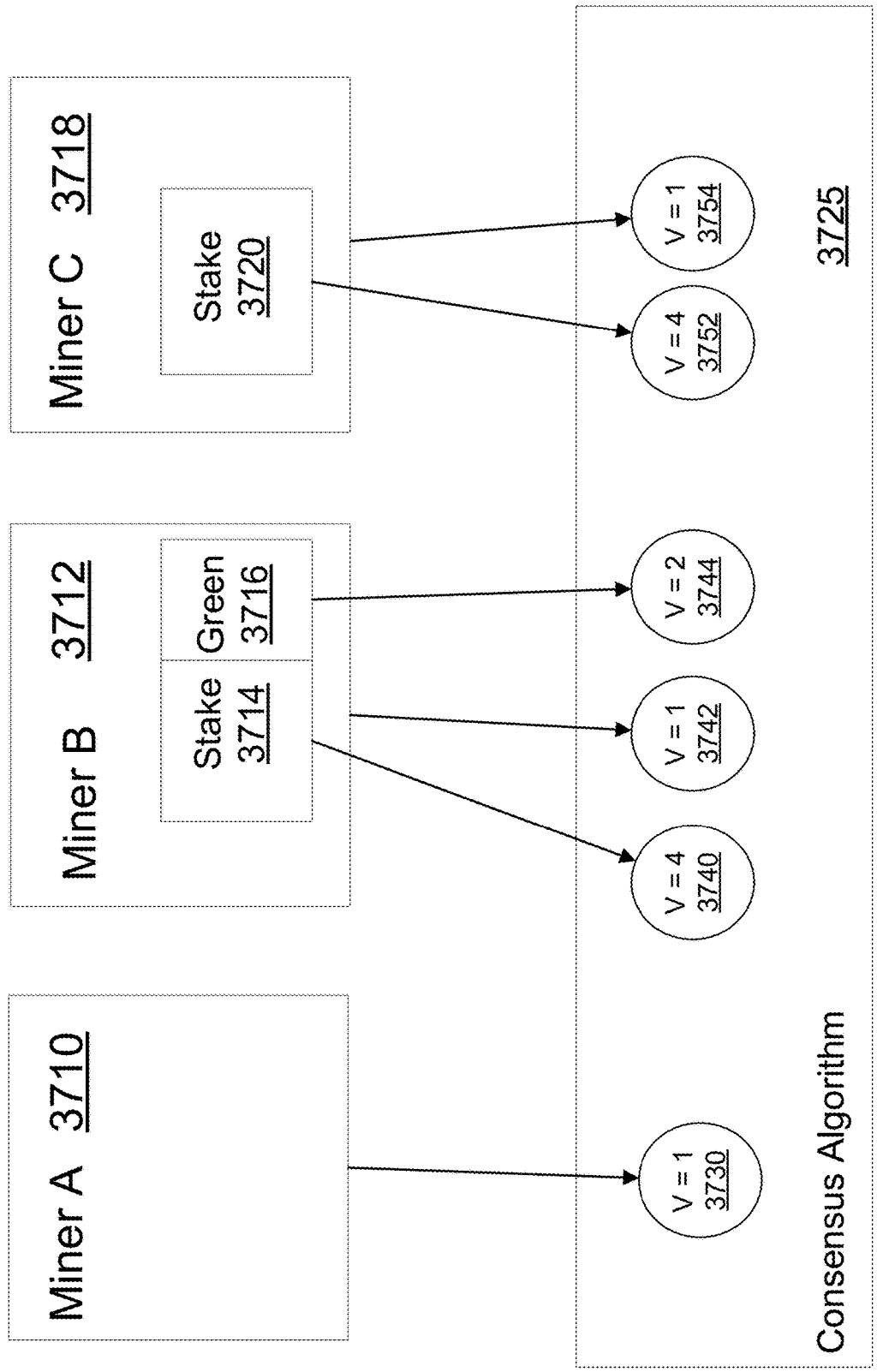
FIG. 37 illustrates a system of managing staking contributions, used by blockchain consensus mechanisms configured in accordance with certain embodiments of the invention.

An exemplary illustration of the above disclosure may be presented in FIG. 37. Three miners, miner A 3710, miner B 3712, and miner C 3718 may participate in a consensus system implemented as an algorithm 3725.

By virtue of participating in the consensus system, each miner may be allocated a participation token, for example token 3730 for miner A 3710, token 3742 for miner B 3712, and token 3754 for miner C 3718, with each participation token having a value of 1.

In this example, miner B 3712 has also provided a stake, as evidenced by a first staking certificate 3714, for example, by locking up digital assets of value, and may be allocated a first staking token 3740, and similarly miner C has provided a stake, as evidenced by a second staking certificate 3720, and may be allocated a second staking token 3752, with both staking tokens having a value of 4.

Finally, miner B has obtained a "greenness" certificate 3716 evidencing that the stake associated with the first staking certificate 3714 may be backed by a green resource, and may be thus allocated a green token 3744, having a value of 2.

Those skilled in the art of addition will readily appreciate that miner A 3710 has a total participation value of 1, miner B 3712 has a total participation value of 4+1+2=7, and miner C has a total participation value of 4+1=5.

In one embodiment, miner B 3712 may be thus seven times more likely to be selected and miner C 3718 may be five times more likely to be selected than miner A 3710 for producing a next blockchain block.

In an alternate embodiment, when selected, miner B 3712 may receive seven times a standard block reward than miner A 3710 and similarly miner C 3718 may receive five times the standard block than miner A 3710.

g. Dynamic Adjustment of Consensus Protocols

Reward mechanisms can be dynamic and be automatically reconfigured (e.g., by the consensus system itself) to modify parameters that favors one action over another. For example, the increase of a reward for a successful mining can be governed by parameters that identifies what contexts (such as provision of KYC information) should result in incentives for miners, and how much these incentives should be. This can be modified over time, e.g., to address societal concerns, to rebalance system loads, to incentivize desirable collaboration, to increase participation to reduce risks of 51% attacks, etc. The modifications may also be based on a location of a miner, e.g., to incentivize participation in some geographical and/or political areas. Modifications may also act as a tax, e.g., to reduce rewards. This tax may be used to disincentivize undesirable behavior, but may also be applied for legal reasons, for reasons related to liability, due to geopolitical considerations, etc. Rewards may be based on measurements related to the loyalty of the miner, e.g., whether a miner has participated on a given blockchain in the past, and for what length of time. Examples of loyalty may be holding, staking and/or stacking of previous rewards. Rewards may also be based on contributions to other entities, such as a well-reputed Decentralized Autonomous Organization (DAO).

h. Consensus Protocols Affected by the Computation Environment

In one embodiment, a miner may be provided with an incentive, using one of the methods described above, for associating the mining apparatus with an identifier of a trusted execution environment (TEE) in which the mining apparatus may be executed at least in part. For example, by associating the mining process with a TrustZone identifier, and authenticating the output of the mining operation using an authentication method tied to the TrustZone identifier, the miner provides verifiable evidence that the mining process was executed, at least in part, in the TrustZone environment. This provides an assurance indicating that there may be an absence of abuse since the TrustZone environment will only execute certified code. The mining result may also comprise a reference to the code version used. This way, a verifier would know that the mining result may not be, for example, performing an "uncle making" attack, such as described in the August 2022 publication titled "Uncle Maker: (Time) Stamping Out The Competition in Ethereum" by Aviv Yaish, Gilad Stern and Aviv Zohar. To incentivize the use of (and disclosure of evidence related to) TEEs such as TrustZone, one or more benefits, as disclosed in the instant invention, may be provided to the miner and/or associated entities. Similarly, a miner that operates within the confines of an approved digital rights management (DRM) module may be provided benefits of these types. The benefits may stack up, allowing an entity who mines using in a DRM associated with a TEE to gain yet additional benefits, compared to a miner who only uses (or discloses evidence showing the use of) one of these constructs.

i. Consensus Systems Adjusted by Reputation Values

An entity such as a miner may be associated with a reputation value, where the reputation value represents previous actions associated with the miner, e.g., whether a miner has contributed to a given blockchain, and how much; whether the miner has disclosed associations between different mining entities controlled by one and the same party (which may be performed using methods relating to the KYC methods and escrow methods described above); and/or whether the miner appears to be part of a collection of miners that may pose a political risk by controlling close to or more than 51% of the control over a given blockchain. The rewards may be determined based on the evaluation of reputation values of a miner that closes a ledger. If there are disagreements of what elements from the mempool should be selected, and the disagreement causes a miner's suggested selection to be rejected, which may negatively affect the reputation of the miner.

Figure 38:
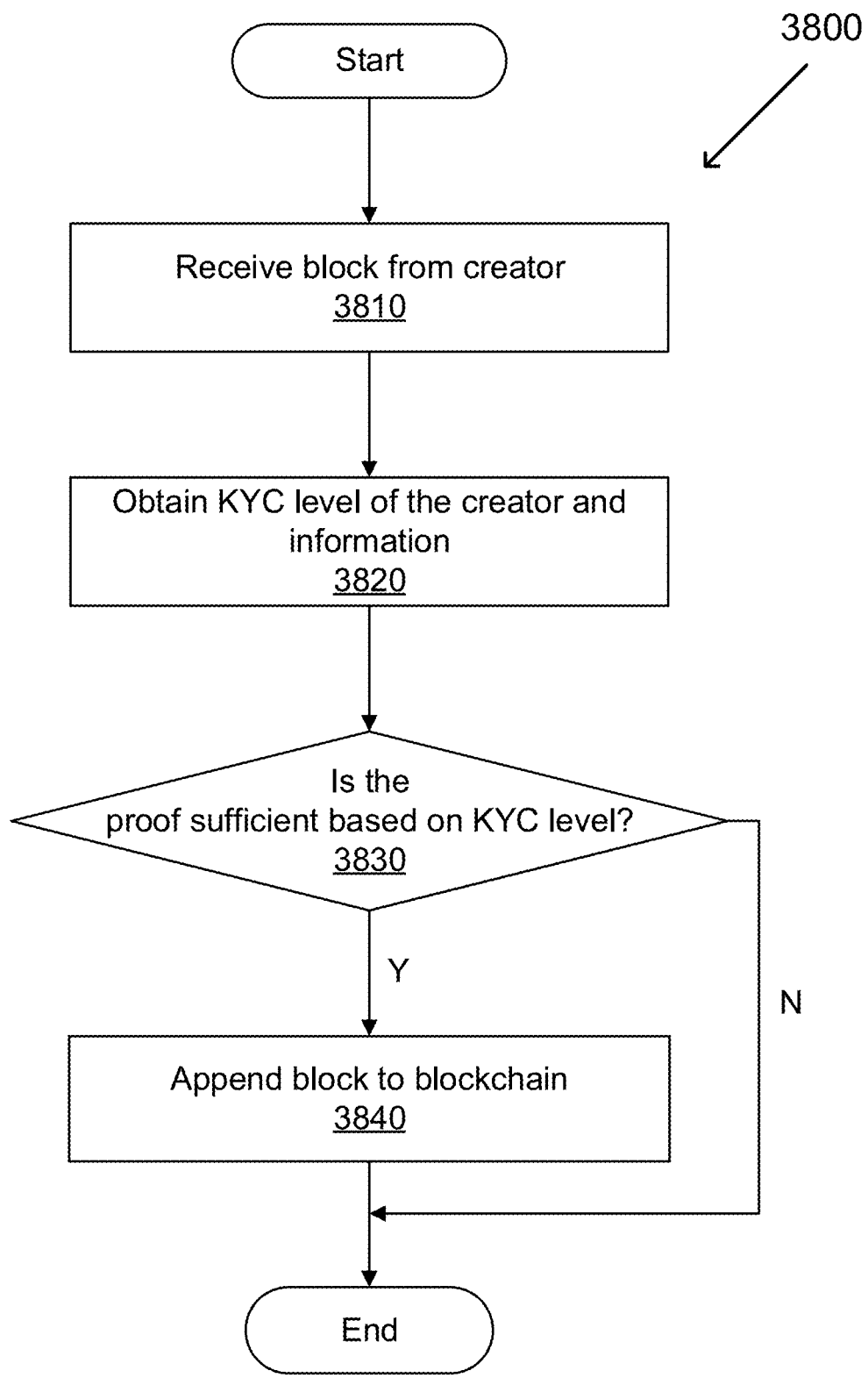
FIGS. 38-39 depict a system for appending new blocks to blockchains configured in accordance with various embodiments of the invention.

FIG. 38 may be a flowchart of an exemplifying embodiment of a method 3800 performed by an entity of a consensus system for accepting/appending a block, created by and received from a block creator, to a blockchain. The consensus system employs a consensus mechanism. Any consensus mechanism may be possible. Some illustrative and non-limiting examples are proof-of-work and/or Nakamoto consensus, delayed proof-of-work, proof-of-stake, Ouroboros, delegated proof-of-stake, pure proof-of-stake and/or Algorand consensus, proof-of-stake-velocity, proof-of-authority, proof-of-history, proof-of-elapsed-time, proof-of-space, and/or any combination therebetween. FIG. 38 illustrates the method 3800 comprising a step 3810 of receiving a block from a creator. A creator may also be referred to as a minter and/or a validator. FIG. 38 also illustrates the method comprising a step 3820 of obtaining a KYC level of the creator and information pertaining to (i) the consensus mechanism to be used for accepting/appending the received block to the blockchain and (ii) a corresponding proof. FIG. 38 also illustrates the method comprising a step 3830 of determining that the proof may be sufficient based on the KYC level, and a step 3840 of accepting/appending the received block to the blockchain when the proof may be determined to be sufficient.

Figure 39:
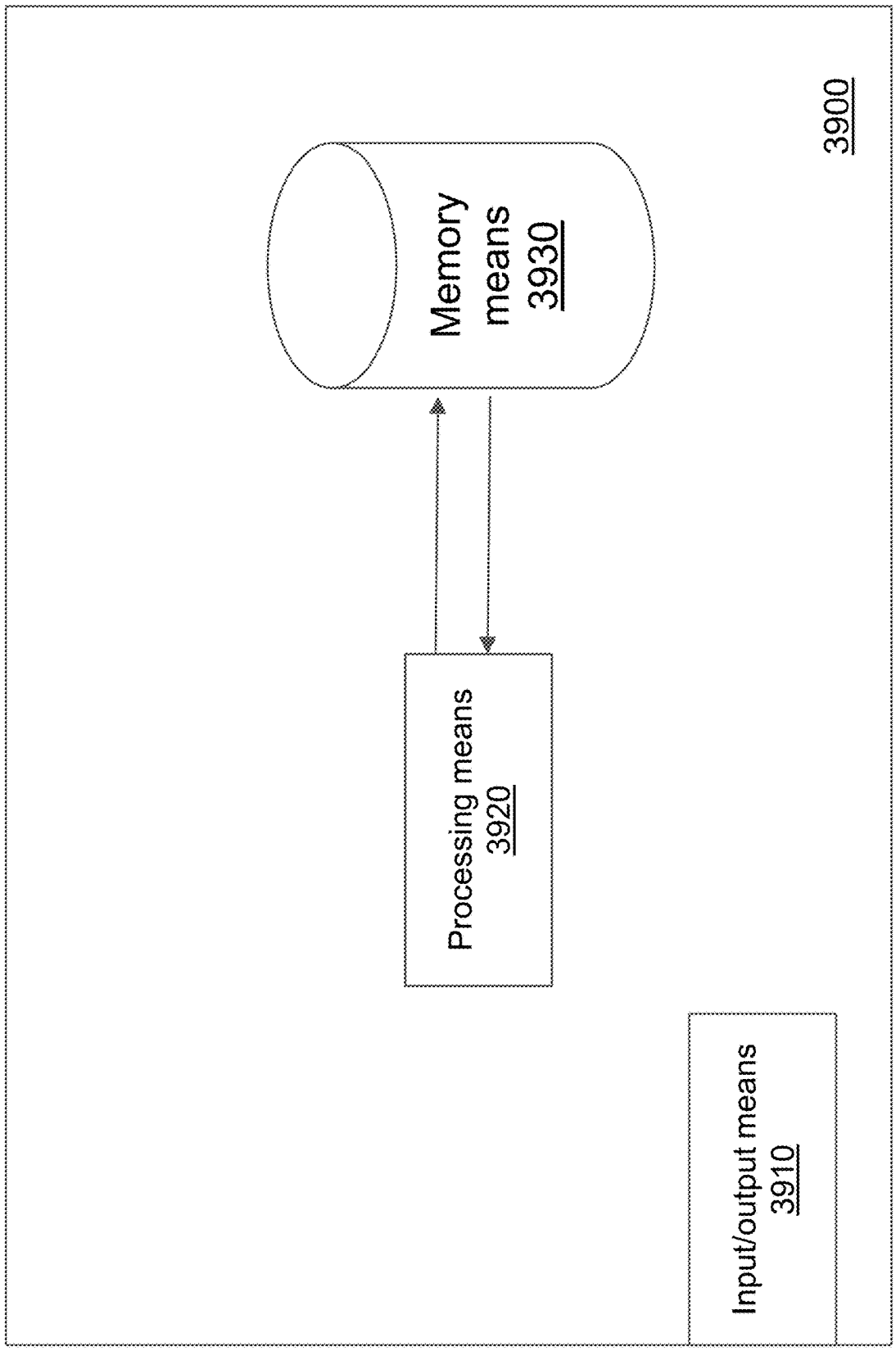

FIG. 39 may be a block diagram of an exemplifying embodiment of an entity of a consensus system for accepting/appending a block, created by and received from a block creator, to a blockchain. The consensus system employs a consensus mechanism. Any consensus mechanism may be possible. Some illustrative and non-limiting examples are proof-of-work and/or Nakamoto consensus, delayed proof-of-work, proof-of-stake, Ouroboros, delegated proof-of-stake, pure proof-of-stake and/or Algorand consensus, proof-of-stake-velocity, proof-of-authority, proof-of-history, proof-of-elapsed-time, proof-of-space, and/or any combination therebetween. FIG. 39 illustrates the entity 3900 of the consensus system comprising input/output means 3910 by means of which the entity 3900 may receive information and transmit and/or provide information to other units, devices and/or entities. FIG. 39 also illustrates the entity 3900 comprising processing means 3920 and memory means 3930, the memory means 3930 comprising instructions, which when executed by the processing means 3920 causes the entity 3900 to perform the method described herein. The entity 3900 may for example be, and/or be implemented in, a server, a computer, a cloud server and/or any entity and/or arrangement comprising processing means for executing the method.

FIGURES

FIG. 32 presents a table illustrating a possible embodiment of a categorization of participants in a blockchain consensus system based on the level of "know your customer" information provided by the participants.

FIG. 33 presents a table illustrating a possible embodiment of a block reward allocation and staking requirement for participants in a blockchain consensus system based on the level of "know your customer" information provided by the participants.

FIG. 34 presents a flow chart illustrating a possible embodiment of a method for adjusting a difficulty parameter for a participant in a blockchain consensus system.

FIG. 35 presents a table illustrating a possible embodiment of a scoring system for a participant in a blockchain consensus system based on an allocation of points assessing a level of "know your customer" information and validation of said "know your customer" information.

FIG. 36 presents a diagram representing a computer data configuration illustrating a possible embodiment of an adjusted difficulty level for a blockchain consensus system.

FIG. 37 presents a diagram illustrating a possible embodiment of a blockchain consensus algorithm based on an assessment of a staking contribution by a plurality of participants.

FIG. 38 is a flowchart of an exemplifying embodiment of a method 3800 performed by an entity of a consensus system for accepting/appending a block, created by and received from a block creator, to a blockchain.

FIG. 39 is a block diagram of an exemplifying embodiment of an entity of a consensus system for accepting/appending a block, created by and received from a block creator, to a blockchain.

E. Replication-Based Blockchain Security in NFT Platforms

Methods operating in accordance with many embodiments of the invention may be used for replicating representations across multiple blockchains. A token and its associated ownership, instead of being represented by one blockchain record, may be represented by multiple blockchain records, where these records may preferably reside on different blockchains. Thus a token may be represented by a multiplicity of elements, where we refer to these individual token representations as tokenettes. Two tokenettes are said to be family members if they correspond to the same token.

If one of the blockchains used to store tokenettes suffers a 51% attack, causing double-spend and/or other related abuse, then the family member tokenettes of the affected tokenette, residing on other blockchains, would not be affected by this abuse. Similarly, if one processor of tokens and tokenettes, such as a bridge, may be corrupted and a tokenette may be improperly transferred to an adversary by changing its ownership information, then the representations of the family members of this tokenettes, residing on other blockchains and/or transferred by other bridges and/or at different times, would not be affected by the same breach.

To determine what set of tokenettes corresponds to an authoritative record of ownership and/or access, a trusted entity would identify and assess inconsistencies. However, an inconsistency may not be immediate evidence of abuse, as a legitimate modification may be requested for a token, causing two or more modifications of the associated tokenettes, wherein the tokenette representations may not be performed in a synchronized and/or atomic manner. Thus, one modification may be performed before another may be performed. Such inconsistencies can be assessed in multiple ways, using heuristic and other rules. Some inconsistencies may be resolved quickly whereas others may require several rounds of processing to resolve them. Some analysis of inconsistencies may be automated whereas others may involve some form of authoritative feedback, wherein an example authority may be a user corresponding to a participant of a Decentralized Autonomous Organization (DAO). The rule may be expressed using one or more sets of machine learning (ML) algorithms and associated weights, using an artificial intelligence (AI) algorithm and associated weights, and/or using risk and volume based rules. Cases that cannot be resolved with high certainty, wherein the certainty may be computed using another set of algorithms, can be referred to another round of analysis. We refer to the entity that resolves the inconsistencies as the guardian. The guardian may be in charge of also detecting the presence of the inconsistencies, and/or may be aided by other entities, such as bounty hunters, for this. Bounty hunters were disclosed in co-pending U.S. patent application Ser. No. 17/806,065, titled "Perpetual NFT Assets" by Markus Jakobsson, Stephen C. Gerber and Guy Stewart and filed on Jun. 8, 2022, incorporated by reference in its entirety. There may be multiple competing guardians, and each token may be represented by one or more such entities. The guardians may be centralized and trusted entities, and/or they may be distributed entities. In one example embodiment, a guardian may be operated using a consensus mechanism, similar to how mining may be performed. In this example embodiment, the guardian may be represented, for example, by a multiplicity of parties that have each staked a resource and which perform actions such as the resolving of inconsistencies that are being judged by the other members of the consensus mechanism.

Figure 40:
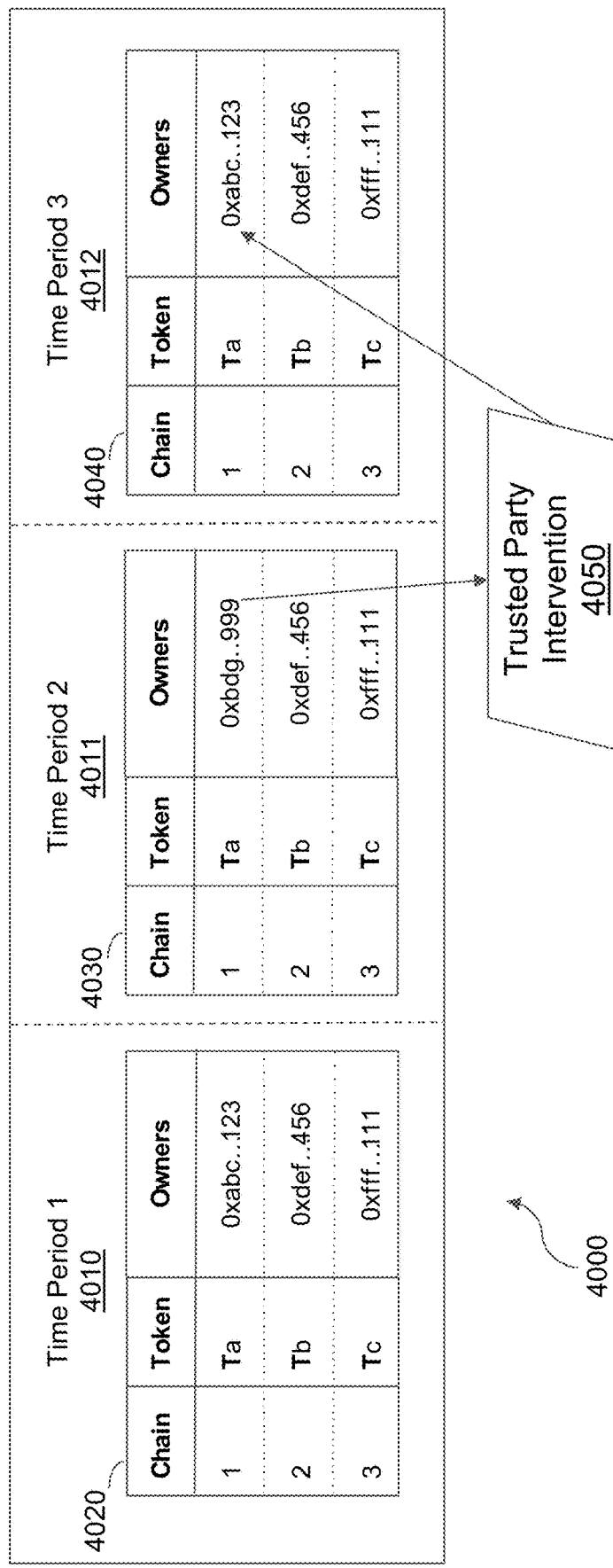
FIG. 40 illustrates a system for identifying inconsistent tokenettes in accordance with multiple embodiments of the invention.

FIG. 40. Illustrates the aforementioned example of a tokenette being identified as inconsistent and reverted by a trusted party. In 4000 a sequence of time periods may be shown 4010, 4011, and 4012, that represents a moment in time and/or blockchain state for each of three example blockchains 1, 2, and 3. Each chain has a tokenette which may be a member of a token family. Chain 1 has token Ta, Chain 2 has token Tb, and Chain 3 has token Tc as represented in chain state snapshot 4020. In Time Period 2 4011, Chain 1 token Ta ownership may be indicated as changed from Time Period 1 4011. A trusted party 4050 may determine that the change was inconsistent for one or more of a variety of reasons, such as, but not limited to fraud. Trusted party 4050 may be able to correct Chain 1 Token Ta in Time period 3 4012 by reassigning the token on Chain 1 to its prior owner 0xabc . . . 123. While the time periods are shown as sequential in the figure, there may be any duration time period and/or block counts between the 3 time periods indicated.

a. Tokenette Implementation Examples

One example implementation of a tokenette may be in the form of a mirror token, as disclosed in co-pending U.S. Provisional Patent Application No. 63/370,099, titled "Mirror Tokens and Parallel Addresses" by Keir Finlow-Bates and Markus Jakobsson and filed on Aug. 1, 2022, incorporated by reference in its entirety. Another approach may be to generate one or more tokenettes by wrapping the "mother" token using non-fungible tokens. Wrapping can be performed, for example, by signing the mother token using a private key associated with the NFT used for wrapping. The signature may also be a function of a serial number and/or other identifier, one or more references to policies and/or requirement statements, and/or executable elements such as smart contract and/or executable content. The executable elements may comprise freestanding code, code elements used for configuration of entities evaluating the NFTs (i.e., tokenettes), and/or other executable components, such as plugins. Tokenettes can be generated using techniques, such as the notion of derived tokens, disclosed in co-pending U.S. patent application Ser. No. 17/808,264, titled "Systems and Methods for Token Creation and Management," filed Jun. 22, 2022, incorporated by reference in its entirety. A tokenette can be implemented as a derived token, where this may be derived from the mother token.

b. Generation of Tokenettes

A family of tokenettes can be generated in lieu of the minting of a token, on the request of a content creator. A family of tokenettes may also be generated from a token, e.g., as described above, by a token owner wishing to obtain the benefits associated with the use of distribution of token representation as may be enabled by the tokenettes. The generation of tokenettes from a token may also be performed by a bridge, a consensus mechanism, and/or a security service provider, e.g., in response to an event such as an increased risk of abuse, a valuation of the token such as the token becoming valued at more than $10 k, and/or in response to a request by a content creator, token owner, enterprise gateway, jurisdiction into which the token may be to be transferred, etc. Policies governing when to generate a family of tokenettes from a token may be comprised in and/or associated with the token. Such policies may also govern how many tokenettes are generated from a given token, and what the thresholds are for determining what tokenettes to apply remedial actions to based on a detection of inconsistencies. The policies may also be associated with networks processing a token, with token owners, and/or with jurisdictions that may require some functionality enabled by the use of tokenettes instead of tokens, and where there may be a transfer of access rights into and/or out from said jurisdictions. Tokenettes may also be deconstructed and/or burned under specified conditions, e.g., to limit the degree of distribution in a context where security risks are assessed to have gone down. This may be governed by policies associated with the tokens, which may be the same set of policies that govern the creation of tokenettes, and/or may be separate policies. The reduction of the degree of distribution may be also a cost matter, and the owner and/or creator of a token may be able to control the extent of replication (i.e., degree of distribution) by setting a budget. Since costs may depend on traffic and congestion, the distribution degree may be a function of such matters. Since the speed of having a transaction recorded affects the cost as well, there may be a tradeoff in terms of the time granularity of transactions, i.e., the speed with which transactions complete, and the cost. One or more policies may govern, at least in part, all these aspects. The aspects may also be governed by user input, e.g., signals relating to budget limits for specified transactions, which may be provided along with the transaction requests.

Figure 41:
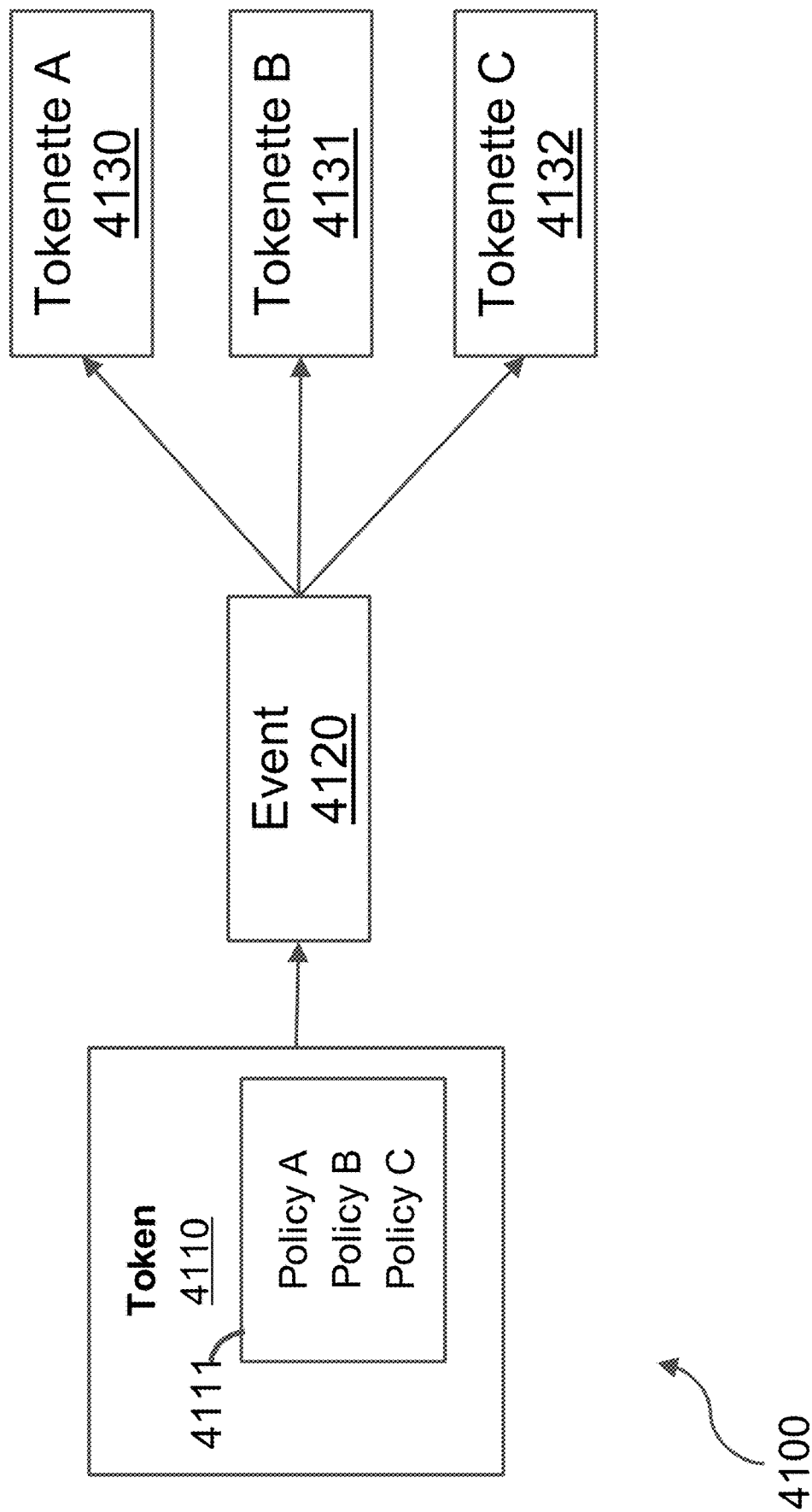
FIG. 41 illustrates a system for creating tokenettes in accordance with many embodiments of the invention.

FIG. 41. Illustrates the aforementioned example of a tokenette being created based upon an event and a policy. In 4100 a token 4110 exists with a policy table 4111 that defines tokenette-generation behavior in the event of a change such as a recent change in ownership of the token 4110. Policy tables may be incorporated in, but not limited to, smart contracts, token assets, and token metadata. For example, this may occur when the token transfers to a previously unused wallet address. When the event 4120 occurs, tokenettes a 4130, b 4131, and c 4132 are automatically generated.

c. Detection of Inconsistencies

For example, a token may be represented by three tokenettes. In one example situation, one of these tokenettes may be transferred from one blockchain to another, e.g., using a bridge. This may be performed in order to reduce costs, prepare for a transfer of ownership, and/or in response to the blockchain from which the tokenette may be to be transferred having too low volume of transactions to satisfy a requirement associated with the token. In this example, the bridge may be assumed to be corrupted, causing the illegitimate transfer of ownership of the tokenette (as well as a large number of other tokens and tokenettes) to a third party associated with the attacker. At some point in time, the guardian(s) detect that there may be an inconsistency between the ownership of the tokenettes of the same family. The guardian may then realize that this inconsistency affects not just one tokenette, but a multiplicity of tokenettes and tokens, wherein a large portion are associated with the same bridge and for which the suspect transaction was performed at the same and/or similar points in time, and/or with ownership assigned to the same and/or associated parties. This may be an indication of abuse. Based on one or more indications of abuse, the guardian determines that the transaction affecting the tokenette being transferred by the bridge should not have been performed, and initiates a remedial action. An indication abuse can also be determined by reviewing a multiplicity of inputs, each corresponding to a given ownership of the token associated with the related tokenettes, and to determine based on the number of transactions and the platforms on which they are performed which one(s) may be and/or are likely corresponding to abusive transactions. This may require the collection of more data, over a period of time, thereby allowing pending transactions to take place, where such pending transactions may be requests for ownership transfers in the mempool(s) of the associated blockchains. The guardian may also inspect the mempools of these blockchains directly to determine whether there are legitimate-appearing pending requests relating to a given token, e.g., directed to a tokenette associated with the token and residing on the given blockchain. The inconsistency determination performed by the guardian may be implemented using a Consensus-driven AI (CAI). This notion was introduced in U.S. patent application Ser. No. 17/810,085, titled "Distributed Ledgers with Ledger Entries Containing Redactable Payloads," filed Jun. 30, 2022, incorporated by reference in its entirety. It can be implemented using machine learning (ML) wherein each participating node determines new weights for the ML engine and the nodes collectively agree on what weights to use, based on consensus. Policies governing detection and resolution of inconsistencies, and/or governing remedial action may be comprised and/or referenced in part in the token/totenette, e.g., in the form of metadata, in the smart contract, in references and/or as part of the content data. Tokens may also comprise data detailing the policies for creation of and management of tokenettes, e.g., the conditions under which tokenettes should be generated by the system, what entities may generate the tokenettes, how many tokenettes are generated for a given context, and more. Policies, including policies governing the detection of inconsistencies, remedial action, and/or management of tokens and/or tokenettes, may also be maintained by the guardian(s) associated with a token and its associated tokenettes.

In another usage scenario, a first blockchain may be affected by a 51% attack, which enables the attacker to double-spend any coin, for example. However, it may not be clear in such situations exactly what transfers were caused by the attackers, and therefore should be canceled, and a network that decides to undo all transactions within some time frame during which the 51% attack may be believed to have been effective could potentially cause much greater damage than the double-spending attacker would. This may be addressed by the instant invention which uses the inconsistency detection mechanisms disclosed herein to identify the tokens that are transferred in an anomalous manner on the blockchain that suffered the 51% attack. These transactions can then be selectively undone, in the manner described herein. Moreover, the very existence of the mechanisms we disclose can be used to determine the likely presence of the 51% attack, e.g., by detecting a number of related and/or inconsistent transactions during the time of the suspected 51% attack. This may be achieved by comparing the tokenette transfers on other blockchains, which would not be affected by the same attack at the same time as the first blockchain.

In some embodiments, instead of and/or in addition to detecting inconsistencies, the system may be configured to detect anomalies and/or high-risk scenarios. An anomaly may correspond to a highly unusual number of transfers of ownership related to one given recipient. A high-risk scenario may correspond to the transfer of ownership to an entity known to be associated with fraud and/or other forms of abuse, and/or which has been ban-listed for performing undesirable actions. The detection of anomalies and/or high-risk scenarios may, like the detection of inconsistencies, trigger careful analysis of related tokenettes and the environments (such as blockchains, bridges, wallets) they are associated with, and the initiation of remedial actions.

In yet another usage scenario, it may be determined that one tokenette was caused to be transferred, in terms of ownership rights and/or access rights, in a manner that may be inconsistent with how other tokenettes of the same family are processed. The guardian may determine that this may be a temporary inconsistency, e.g., due to the "inconsistent" tokenette being operated on faster than the related tokenettes are, said operation being the effectuation of the transfer. The guardian may collect information, e.g., related to other inconsistencies, in order to determine whether there may be a collection of associated inconsistencies, such as several co-occurring inconsistencies associated with the same time period and bridge having processed the affected tokenettes for which inconsistencies are detected. In this example, the guardian may determine that there may not be a collection of correlated inconsistencies. The guardian may determine that it may be unlikely, based on actions related to the blockchains of the related blockchains, that there are pending transactions affecting said related tokenettes belonging to the same family as the tokenette associated with the inconsistency. This may be determined after a threshold amount of time has passed after the inconsistency has been determined, where the threshold amount of time may be set based on the observed speed of logging entries on the blockchains on which the related tokenettes reside; it may also be determined based on the examination of the mempools of said blockchains, e.g., by determining that there are no pending transactions associated with actions on the tokenettes related to the tokenette with the detected inconsistency. The guardian may, in the end, determine that one of the most likely reasons for the inconsistency may be malware and/or other corruption of at least part of the wallet with which the identified tokenette may be associated. This may be remediated by undoing the transfer request leading to the inconsistency, potentially after verifying whether this may be desirable with the user of the wallet initiating the transfer request. This may be described in more detail below. It may also cause other remedial actions, such as determination of the nature of the malware, e.g., by identifying characteristics such as the operating system of the identified wallet component, suspect files having been accessed by the identified wallet component, etc. This may lead to better understanding of the characteristics of the malware, enabling automated patching, automated alerts, etc.

d. Remedial Action

Once an inconsistency has been analyzed and it has been determined what the proper action is, a remedial action may be taken. This may involve the destruction (e.g., burning) of the "improper" tokenette(s), and an associated minting of a replacement tokenette. Here, a tokenette may be referred to as improper if it may be determined to have been processed in a manner that was abusive, e.g., corresponding to an attempt to a heist, an attempt to theft, etc. The remedial action may alternatively involve the forcible ownership change of the improper tokenette(s), where this can be effectuated by consensus mechanisms and/or bridges associated with the blockchain(s) where such tokenettes reside and/or with remediation provided via smart contract, as disclosed in co-pending U.S. patent application Ser. No. 17/810,085, titled "Distributed Ledgers with Ledger Entries Containing Redactable Payloads," filed Jun. 30, 2022, incorporated by reference in its entirety. This can utilize a watchful mechanism, for example. Examples of methods of forcefully modifying the ownership using watchful mechanisms are disclosed in co-pending PCT Patent Application No. PCT/US23/62851, titled "Systems and Methods for Abuse Safeguards in NFT-Directed Environments," filed on Feb. 17, 2023; and Ser. No. 63/384,737, titled "Automated Wallet and Transaction Control" by Markus Jakobsson and Keir Finlow-Bates and filed Nov. 22, 2022, incorporated by reference in their entireties.

In one embodiment, the remedial action may be selected based on a classification of the likely cause of the inconsistency that triggered the remedial action. For example, the remedial action may be different if it may be determined that a marketplace and/or a bridge was likely breached and/or corrupted, and/or if it may be determined that the likely cause of the inconsistency may be malware affecting the wallet of a user. Yet other remedial actions may be initiated if it may be determined that the inconsistency was due to a 51% attack, and/or yet another form of attack that leads to inconsistencies such as those described herein. Thus, the classification of the likely reason for the inconsistency may be helpful to select at least some aspects of the remedial actions. If no classification can be made, yet another remedial action may be taken. In some instances, the remedial action may be automated, whereas in others it may involve the approval of a user, such as an admin, a DAO member, a wallet operator, etc.

One example remedial action may be to block a transfer associated with a tokenette that may be identified as being associated with an inconsistency, an anomaly and/or a high-risk operation. Undoing transactions can be performed, for example, using a watchful system as described in disclosures on watchfulness cited herein. This can be performed, for example, in a watchful bridge and/or using a consensus mechanism implementing watchfulness. It can also be performed by the system ban-listing the tokenette with the identified inconsistency, where ban-listing of a token and/or tokenette may be equivalent to the burning of the token and/or tokenette. This action causes the affected tokenette to cease to exist in the sense that its ownership may be no longer relevant. The system may, additionally, create one or more replacement tokenettes, e.g., as described above, and associate this and/or these with the related tokenettes of the same family as the burned tokenette.

In some contexts, a guardian may identify an inconsistency that corresponds to a false alarm. For example, a user may instruct his and/or her wallet to transfer a token from one address to another, where this may correspond to moving the token to another wallet of the same user, and/or to transfer ownership to another user. This will correspond to requests from the user's wallet, which may comprise one or more UIMs and one or more TMUs, but which may also be an atomic wallet. These requests should cause the transfer of ownership of the tokenettes that correspond to the implementation of the token the user perceives. In some situations, such as in this example situation, some of these requests may fail to be delivered, e.g., due to lossy communication, and some may cause requests that are buffered in the mempools of the corresponding blockchain consensus mechanisms. If the gas fee the user was willing to pay may be low and/or there may be a large amount of traffic at the time, some of the requests may be buffered for a long period of time. Some of the consensus mechanisms may lose some requests, e.g., due to the buffer sizes being limited, crashing hardware, etc. As a result, a large portion of the requests may occasionally, such as in this example situation, fail to be responded to as rapidly as they would most times, but yet other requests and/or at least one other request may be responded to, causing a transfer of ownership for that associated tokenette. This may be detected as an inconsistency. The guardian and/or associated entities (such as bounty hunters, which may be incorporated with the entities that comprise the consensus mechanism) may at some point, as a result, determine that the situation corresponds to a potential attack. These entities may then attempt to resolve the situation by determining whether the mempools comprise pending transaction requests, but at times, such requests may fail, e.g., due to loss of messages and/or requests. The entities may then identify the situation as one in which a remedial action needs to be taken. That remedial action may involve the reversal of the identified transaction, for example, and/or the notification of a party associated with the transaction request underlying the transaction that may be deemed inconsistent. In case the transaction may be reversed, this particular tokenette will return to its previous address, and optionally, the wallet controlling it may be notified that this took place. As the other transactions eventually are carried out, the guardian will recognize that this corresponds to yet another inconsistency, and will determine, e.g., based on action logs, that the reversal was not correct, after which this can be undone and/or ignored. If the other transaction requests truly were lost, e.g., due to communication failures, then the requesting wallet may determine that a time-out has occurred and no transaction acknowledgment has been received, and/or a reversal notification was received, and re-initiate the transaction requests for the tokenettes to be transferred. This does not require user approval in situations where the wallet has a policy to re-initiate failed transactions. However, the notification of the inconsistency and the associated reversal may cause a notification to the user, e.g., in the form of an error message and/or a warning, and the user may be asked to verify the transaction request and manually re-initiate it if it was valid. Based on the identified source of a problem, different remedial actions are performed, and as the system determines that a remedial action was performed in error, corresponding reversal of the remedial actions already taken may be performed. Thus, the guardians may implement robustness measures that include maintaining an oversight of false alarms and associated mistaken remedial actions, and to address such situations. Such situations will be very rare for a system that may be well tuned, but may increase in commonality for a system in which the rules of engagement rapidly change over time as new types of abuse arise. Such systems may be based on automated detection and remedial initiation based on machine learning methods, for example, and during times when the selection of parameters and weights for the machine learning model have not yet converged based on rapid changes of the threats, it may be important that the system automatically and/or semi-automatically corrects remedial actions that were taken in error according to later assessments and observations.

e. Structure to Defend Against Wallet Malware

In one embodiment, a user may be represented by one or more token management units (TMUs) and one or more user interface modules (UIMs). A UIM may be connected to the one or more TMUs using restrictive interfaces that are constrained in the sense that a malware infection in one unit (such as either one TMU and/or one UIM) cannot propagate across the restricted interface. Examples of restricted interfaces include but may not be limited to physical connections with constrained protocols for exchange of information (such as an API), and to software interfaces that limit the types of requests and data that can be conveyed, e.g., using an API that may be associated with a specified protocol for exchange of information. A user requests information from the TMUs using the UIM, where such information may be rendered on equipment associated with the UIM. The user may also initiate actions related to tokens (that may be described by the information received by the UIM from the TMUs), where requests corresponding to such actions are conveyed to the TMUs from the UIM. The UIM may have at least a portion of a private key associated with a public key that may be associated with a TMU. The TMU may have another portion of said private key, requiring the TMU and the UIM to collaborate on the generation of any digital signature authorizing transfers of tokens associated with the TMU. If one TMU may be affected by malware, this will not cause the infection of the UIM, due to the use of the restricted interface. In addition, different TMUs may be isolated from each other, e.g., execute on different computational machinery, and to the extent that they exchange messages, the channels over which such messages are exchanged may be monitored (e.g., by the UIM and/or another trusted entity) and/or comprise restricted interfaces. This limits the risks of infection spreading from one TMU to another. The TMU may be connected to the Internet, whereas the UIM may be connected only to one or more TMUs, i.e., not have a direct connection to the Internet. Alternatively, the UIM may have internet access but limited computational functionality, e.g., may not enable typical users to install and/or run arbitrary executable code, but only pre-approved code such as code that has been determined to be safe and which has been certified by a trusted entity to be allowed for the UIM to install. TMUs may also be limited in similar manners in terms of their functionality. The TMUs are associated with the public key(s) of a wallet. Different TMUs may be associated with different public keys. One TMU may be associated with multiple public keys. The TMUs may also cache tokens, including content, to which the TMU has permission to access. A set of TMUs may be associated with multiple UIMs, each one which may be associated with different access rights with respect to access to content, the right to transfer ownership of content, etc. The latter may be reflected by what private key portions the different UIMs have access to, but may also be implemented using digital rights management (DRM) techniques.

Figure 42:
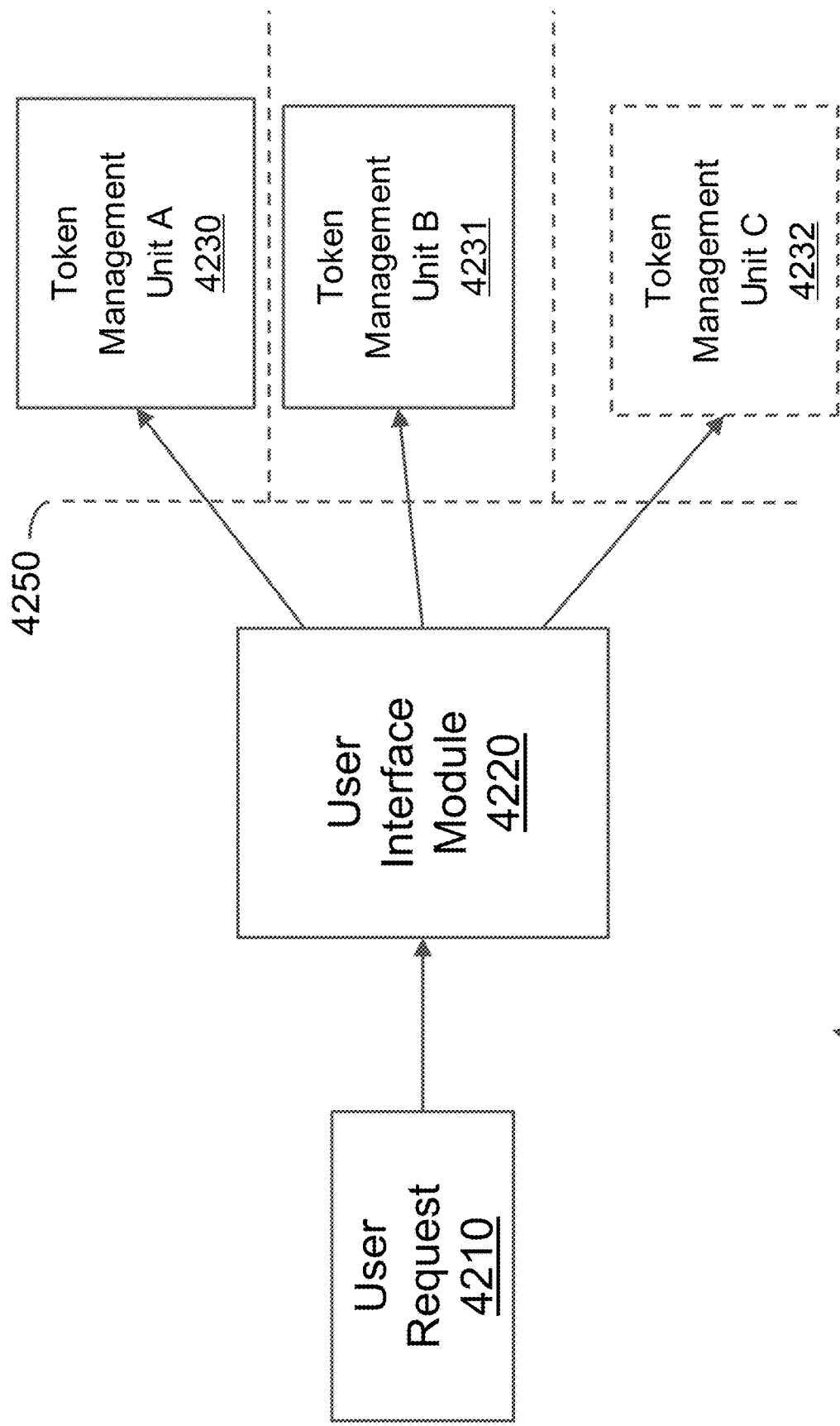
FIG. 42 depicts a system for token management and user interface facilitation configured in accordance with multiple embodiments of the invention.

FIG. 42. depicts an example UIM and TMU structure with a restricted interface. In 4200 a user request 4210, such as a token transfer request, may be received by a user interface module 4220. The user interface module 4220 operates on Token Management Unit A 4230, Token Management Unit B 4231, and Token Management Unit C 4232 across a restrictive interface 4250 which isolates the various Token Management Units.

f. Use of TMUs to Control Ownership of Tokenettes

Different tokenettes may be associated with different TMUs, enabling a user to transfer the ownership rights of a token, using an authorized UIM in connection with a sufficient number of TMUs to authorize the transfer of each tokenette required for the associated token ownership to be updated. This may correspond to a control over all of the available tokenettes via a similar number of TMUs, but this may not be necessary. In some instances, it may be sufficient for the user to cause the transfer of ownership to a threshold number of tokenettes satisfying the policies associated with the related token, for the token to be considered transferred by the guardian(s) associated with the given token. Therefore, even if a small number of TMUs are corrupted (e.g., by malware), this will not cause the loss of control over tokens. Additionally, once an undesired transfer request has been identified (e.g., as disclosed above), the guardian and/or associated party will identify one or more likely sources of corruption (e.g., breach of a service provider, malware infection of a TMU, etc) and notify the appropriate entities (e.g., a user and/or admin associated with the likely source of corruption. This enables a rapid rectification of the problem, whether by shutting down the affected nodes, disconnecting them from the network, replacing the software on them, auditing them in terms of the event logs they have stored, etc. This rapid response further enhances the security of the system. In addition, if the source of the problem may be determined to likely be a software vulnerability, entities with similar software use, and/or providers of such software, may be automatically notified in order to proactively address potential security issues they may have. Such notifications can be done in a way that does not require the divulging of what entity and/or entities suffered abuse.

g. Example Remedial Action Related to a Corrupted TMU

In one example described above, a guardian determines that it may be likely that an inconsistency associated with a tokenette may be due to malware and/or other corruption of a TMU. In response to this determination, one of the remedial actions may be for the guardian to communicate to the UIM associated with the identified TMU, and/or with other TMU related to this UIM. Such communication would be received by these entities, at least some of which are assumed not to be corrupted, allowing a notification to be conveyed to the user of the associated wallet (e.g., via the UIM). Alternatively, the TMUs receiving the communication may be configured to initiate a reset of the corrupted TMU, said reset only being possible when a threshold number of collaborating TMUs perform the initiation of the reset. One manner of resetting may be by means of controlling the power supply, another may be to control the delivery of messages via a gateway, and yet another may be to control routing of messages by controlling DNS lookups and/or routing tables. The UIM can be notified to switch off and/or ignore corrupted TMUs, and/or to initiate the resetting of such units.

h. Wallet Implementation Examples

A wallet may be implemented on a single hardware unit, such as a cellular phone, with at least one of TMU(s) and/or a UIM executing in a secure environment, such as in TrustZone and/or another trusted execution environment (TEE). In some embodiments, both TMUs and UIMs comprise code that may be executing in the TEE. They may also have code elements that are executing in a non-secure environment. The private keys would preferably only be accessible inside the TEE, e.g., by the authorized software module. Different TMU(s) and/or UIM may execute in different sandboxes, running in the TEE, where the processes in these sandboxes can only interact with each other using a restricted interface, e.g., cannot freely read and write to each other's data spaces. In one embodiment, at least some TMUs may be hosted by cloud services, preferably executing in different execution environments (such as operating systems and/or other software packets) to limit the homogeneity so as to limit exposure to vulnerabilities. It may be also possible to host clones of TMUs on cloud servers and/or other external entities, as a fallback option if user-possessed TMUs become unavailable and/or lost. Similarly, UIMs may be hosted on hardware other than user-possessed hardware. All units may be protected by means of access control and encryption, wherein one example encryption may be using a key stored on the cloud server and only available after access control has been verified, and another example encryption uses a key provided by the user. The stored units may also be provided to a user having provided evidence of rights to access the units. The units may comprise stored state. The instant invention may be compatible with the techniques disclosed in co-pending U.S. patent application Ser. No. 18/155,662, titled "Crypto Wallet Configuration Data Retrieval," and filed on Jan. 17, 2023, incorporated by reference in its entirety. Hosting TMUs and/or UIMs on external servers may improve availability and limit the risk related to loss of equipment. A wallet may also be run by an execution environment that sandboxes the TMU(s) and the UIM(s) from each other using software mechanisms, such as what may be used for virtualization and sandboxing applications, optionally supported by anti-virus software identifying any risks associated with the execution environment.

i. Cross-Blockchain Logging

In one embodiment, as a consensus mechanism operates on a block comprising a tokenette associated with a given token, the consensus mechanism will also identify the tokenettes that are in the same family and attest to their location of the blockchain they are located on, e.g., by including a recent block of that blockchain as an input to the consensus mechanism. This results in cross-chain proofs. This may be required by a policy comprised in the tokenette. It strengthens the security not only of the transfer of the token in question, but also of all other contents on the blockchains whose transactions get cross-validated.

j. Intentionally Inconsistent Tokenette Transactions

In some instances, some transactions are intentionally only recorded on some blockchains. For example, one blockchain may be lower security than another but provide faster operation and/or lower gas fees. Low-risk transactions may be recorded only for tokenettes on this lower-security blockchain. One example low-risk transaction may be records changing access rights, e.g., due to rental of content, whereas a high-risk transaction may be to transfer the ownership of the token corresponding to the two or more tokenettes. Whereas such changes cause inconsistencies across chains, they would not cause guardians to trigger remedial actions, e.g., since policies associated with the tokens affected indicate that such inconsistencies are not cause for remedial action. This offers cost improvements for the logging of low-risk transactions without negatively affecting the security of the system.

In one embodiment, the smart contract of the token dictates that when tokenettes are created then these tokenettes would be stored on different blockchains, and that these different blockchains would additionally be controlled by different entities, to the extent that some of the blockchains are operated by centralized parties, such as a given company. This reduces the risk of failure should one blockchain fail and/or stop being updated, as the reason for this may not be the technology underlying the blockchain in question, but rather, its governance.

A related use of the technology may be to protect assets stored in custodial wallets. Such storage may be achieved, practically speaking, by assigning the asset to the custodial wallet, e.g., by transferring ownership to the custodial wallet with the trust-based understanding that the custodial wallet will act as a fiduciary for the user owning the token and transfer it on behalf of the user when requested by the user to do so. The asset may be a crypto coin and/or an NFT, and/or a token wrapping one or more such tokens. Wrapping a token could be implemented by the wrapping token taking ownership of the assets being wrapped, for example. Such a token may then be transferred to the custodial wallet with the understanding that it still belongs to the party that initiated the transfer, e.g., what may be commonly referred to as the "actual owner" of the token. Placing assets in custodial wallets may be a problem if such wallets are not properly managed, and/or managed by a company that ceases to operate, and/or operated by a company that suffers a breach and/or an insider attack. A family of tokenettes may be stored in a collection of custodial wallets, enabling a transfer of ownership to a party by causing a threshold number of these tokenettes to be transferred to the party that acts as a recipient of the associated resource. The resource here corresponds to the token, which may be a virtual resource made up from the individual tokenettes of the family. If one of the operators of a custodial wallet service fails, may be compromised, etc., then the owner can still log in to the other custodial wallets and transfer out the tokenettes stored there, thereby collecting enough tokenettes to transfer the virtual token corresponding to these. The transfer of ownership of individual tokenettes to different public keys corresponding to the addresses of the different custodial wallet services would be recognized by the guardian not to correspond to an inconsistency, but to a special case. The guardian may be involved in the transfer and/or audit it to make sure that each custodial wallet service provider associates the stored tokenette with one and the same entity. Alternatively, the transfer may be staggered, and the party performing the transfer providing information to the guardian, optionally in response to a notification of an inconsistency as described above. Such responses may be provided automatically by a user wallet and/or other representative of the user, which also may act as a password manager and/or manager of access credential for the use of the custodial wallet. In one embodiment, this may use a biometrics-based technique in which user hardware verifies the operator biometrics and uses a private key to initiate the transfer of an asset to a collection of custodial services. In one example use situation, not all tokenettes of a token are stored with custodial services, but only some, the remaining ones stored by physical wallets controlled by the operator. Replication of resources in this manner, and in other ways disclosed herein, protects not only against theft and failure of custodial resources, but also against losses of physical wallets by users, e.g., where a physical wallet may be lost in a move, a fire, and/or as a result of a burglary. A user can then re-instantiate another device to access the custodial servers and recover otherwise lost assets from these; but without risking the loss of such assets in situations where the company providing the custodial wallet service goes bankrupt and/or gets breached.

A guardian may keep a list of exceptions corresponding to inconsistencies that should not trigger remedial actions. Some of the exceptions may be global, and address, for example, the use of well-known and trusted custodial services, such as wallets and marketplaces. Some may be user-specific, and either be in the form of learned heuristics based on interactions with a wallet of a user, and/or correspond to rules conveyed by the wallet of the user to the guardian(s) representing the wallet. The guardian may associate different thresholds with different contexts of inconsistencies. For example, it may be sufficient for two independent highly trusted custodial services to support the same indicated transaction for this transaction to be considered valid, whereas it may require three or more consistent blockchain changes indicating the change of ownership of a resource for the associated tokenettes are transferred according to the indicated ownership changes. A transaction between two parties that have a long history of interaction may require a lower threshold of consistency, such as three supporting blockchain transactions that are consistent, whereas a transaction from a low-competence party to a high-risk party such as an unknown and/or poorly reputed party may require four supporting blockchain transactions to be consistent. Here, a low-competence party may be one that may not be a professional trader and/or which has a trading volume below a threshold volume, and/or which has configured its wallet to make abuse harder. A poorly reputed party may be one that has had a large number of complaints of abuse lodged against it, such as more than 10.

Systems and techniques directed towards optimizing blockchain-directed techniques, in accordance with many embodiments of the invention, are not limited to use within NFT platforms. Accordingly, it should be appreciated that applications described herein can be implemented outside the context of consensus and/or transaction facilitation mechanisms. Moreover, any of the systems and methods described herein with reference to FIGS. 18A-42 can be utilized within any of the NFT platforms described above.

While the above description contains many specific embodiments of the invention, these should not be construed as limitations on the scope of the invention, but rather as an example of one embodiment thereof. Accordingly, the scope of the invention should be determined not by the embodiments illustrated, but by the appended claims and their equivalents.

What is claimed is:

1. A method for selecting personalized token-directed actions, comprising:
   determining:
      a tag associated with a token, wherein the tag:
         comprises metadata describing the token; and
         corresponds to a weight, indicative of an accuracy of the tag in describing the token; and
      an aggregate profile associated with a user, wherein the aggregate profile comprises a set of records representing token items accessed by the user across a plurality of constituent profiles;
   performing a clustering based on at least one of the tag or the aggregate profile, wherein the clustering comprises a collection of tokens sorted according to at least one of a first set of one or more shared categories of tokens or a second set of one or more shared categories of token users;
   identifying an action corresponding to the token, based on the clustering, wherein the action governs future token access by the user; and
   initiating the action.

2. The method of claim 1, wherein the metadata comprises at least one of a smart contract associated with the token; a consumer-based quality score associated with the token; or a set of one or more user preferences associated with the token.

3. The method of claim 1, wherein the action concerns access to a recommendation selected from the group consisting of a content recommendation, an advertisement recommendation, and a product placement recommendation.

4. The method of claim 1, wherein the tag is generated, at least in part, by a generating party corresponding to a token-associated party selected from the group consisting of the user, an entity mining the token, and a third-party appointed by the user.

5. The method of claim 4, wherein the weight is:
indicative of a trust level reflecting a reputation, of the generating party, for generating accurate tags; and
used in performing the clustering.

6. The method of claim 1, wherein the aggregate profile comprises data describing at least one of a need of the user, a capability of the user, a reputation of the user in a corresponding community, or a usage statistic associated with the user.

7. The method of claim 1, wherein the aggregate profile is:
generated, at least in part, by an entity selected from the group comprising a wallet associated with the user; an aggregating entity associated with the user; and an automated component;
stored in at least one of a wallet associated with the user, a public database, an enterprise gateway server, or an encrypted database; and
based on input from at least one of the user or an administrator.

8. The method of claim 1, wherein:
the first set of one or more shared categories is associated with the tag;
the second set of one or more shared categories is associated with the aggregate profile; and
performing the clustering comprises determining a fit score reflecting a likelihood that a given token user, belonging to the second set of one or more shared categories, would access a given token, belonging to the first set of one or more shared categories.

9. The method of claim 1, wherein the clustering is performed using an algorithm selected from the group consisting of a machine learning algorithm, an artificial intelligence algorithm, and a maximum likelihood assessment.

10. The method of claim 1, wherein:
the action transfers the token from a first blockchain to a second blockchain; and
the second blockchain is a level-two (L2) blockchain that is selected based on at least one of an optimization or a cost estimate.

11. A non-transitory computer-readable medium storing instructions that, when executed by a processor, is configured to cause the processor to perform operations for selecting personalized token-directed actions comprising:
determining:
a tag associated with a token, wherein the tag:
comprises metadata describing the token; and
corresponds to a weight, indicative of an accuracy of the tag in describing the token; and
an aggregate profile associated with a user, wherein the aggregate profile comprises a set of records representing token items accessed by the user across a plurality of constituent profiles;
performing a clustering based on at least one of the tag or the aggregate profile, wherein the clustering comprises a collection of tokens sorted according to at least one of a first set of one or more shared categories of tokens or a second set of one or more shared categories of token users;
identifying an action corresponding to the token, based on the clustering, wherein the action governs future token access by the user; and
initiating the action.

12. The non-transitory computer-readable medium of claim 11, wherein the metadata comprises at least one of a smart contract associated with the token; a consumer-based quality score associated with the token; or a set of one or more user preferences associated with the token.

13. The non-transitory computer-readable medium of claim 11, wherein the action concerns access to a recommendation selected from the group consisting of a content recommendation, an advertisement recommendation, and a product placement recommendation.

14. The non-transitory computer-readable medium of claim 11, wherein the tag is generated, at least in part, by a generating party corresponding to a token-associated party selected from the group consisting of the user, an entity mining the token, and a third-party appointed by the user.

15. The non-transitory computer-readable medium of claim 14, wherein the weight is:
indicative of a trust level reflecting a reputation, of the generating party, for generating accurate tags; and
used in performing the clustering.

16. The non-transitory computer-readable medium of claim 11, wherein the aggregate profile comprises data describing at least one of a need of the user, a capability of the user, a reputation of the user in a corresponding community, or a usage statistic associated with the user.

17. The non-transitory computer-readable medium of claim 11, wherein the aggregate profile is:
generated, at least in part, by an entity selected from the group comprising a wallet associated with the user; an aggregating entity associated with the user; and an automated component;
stored in at least one of a wallet associated with the user, a public database, an enterprise gateway server, or an encrypted database; and
based on input from at least one of the user or an administrator.

18. The non-transitory computer-readable medium of claim 11, wherein:
the first set of one or more shared categories is associated with the tag;
the second set of one or more shared categories is associated with the aggregate profile; and
performing the clustering comprises determining a fit score reflecting a likelihood that a given token user, belonging to the second set of one or more shared categories, would access a given token, belonging to the first set of one or more shared categories.

19. The non-transitory computer-readable medium of claim 11, wherein the clustering is performed using an algorithm selected from the group consisting of a machine learning algorithm, an artificial intelligence algorithm, and a maximum likelihood assessment.

20. The non-transitory computer-readable medium of claim 11, wherein:
the action transfers the token from a first blockchain to a second blockchain; and
the second blockchain is a level-two (L2) blockchain that is selected based on at least one of an optimization or a cost estimate.

* * * * *